US009437078B2

(12) United States Patent
Keech

(10) Patent No.: US 9,437,078 B2
(45) **Date of Patent: *Sep. 6, 2016**

(54) METHOD FOR PARI-MUTUEL WAGERING

(71) Applicant: AmTote International, Inc., Hunt Valley, MD (US)

(72) Inventor: Steven Keech, Towson, MD (US)

(73) Assignee: Amtote International, Inc., Hunt Valley, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/829,291

(22) Filed: Aug. 18, 2015

(65) Prior Publication Data

US 2015/0364009 A1 Dec. 17, 2015

Related U.S. Application Data

(63) Continuation-in-part of application No. 14/685,171, filed on Apr. 13, 2015.

(51) Int. Cl.

| | |
|---|---|
| ***G06F 17/00*** | (2006.01) |
| ***G06F 19/00*** | (2011.01) |
| ***G07F 17/32*** | (2006.01) |

(52) U.S. Cl.

CPC ....... *G07F 17/3258* (2013.01); *G07F 17/3225* (2013.01); *G07F 17/3288* (2013.01)

(58) Field of Classification Search

CPC ............. G07F 17/3244; G07F 17/326; G07F 17/3288; G07F 17/323; G07F 17/3225; G07F 17/3258

See application file for complete search history.

(56) References Cited

U.S. PATENT DOCUMENTS

| | | | | |
|---|---|---|---|---|
| 2,179,698 | A | 11/1939 | Levy | |
| 2,182,875 | A | 12/1939 | Levy | |
| 5,411,258 | A | 5/1995 | Wilson et al. | |
| 5,830,068 | A | 11/1998 | Brenner et al. | |
| 5,846,132 | A | 12/1998 | Junkin | |
| 6,358,150 | B1 | 3/2002 | Mir et al. | |
| 6,383,074 | B1 | 5/2002 | Boggs | |
| 6,450,887 | B1 | 9/2002 | Mir et al. | |
| 6,666,769 | B2 * | 12/2003 | Stronach ................ | G06Q 50/34 463/40 |
| 6,736,725 | B2 | 5/2004 | Burns et al. | |
| 7,899,726 | B2 * | 3/2011 | Harris .................... | G06Q 20/40 455/403 |
| 8,636,571 | B2 | 1/2014 | Miller | |
| 8,814,700 | B2 | 8/2014 | Vlazny et al. | |
| 2002/0058548 | A1 * | 5/2002 | Stronach ................ | G06Q 50/34 463/25 |
| 2002/0142816 | A1 * | 10/2002 | Stronach ................ | G06Q 50/34 463/6 |
| 2003/0033405 | A1 * | 2/2003 | Perdon ................... | G06Q 30/02 709/224 |

(Continued)

*Primary Examiner* — Milap Shah

(74) *Attorney, Agent, or Firm* — Larry J. Guffey, Esq.; Pamela K. Riewerts, Esq.; Oliver & Grimsley, LLC

(57) ABSTRACT

An improved method for allowing players to make pari-mutuel wagers on previously-run, order-of-finish contests (PROOFCs) includes the steps of enabling the operator of a pari-mutuel wagering enterprise to: (1) access the database of race conditions pertaining to each of the PROOFCs and assemble a specified collection of PROOFCs upon which a player may elect to wager or not wager on a specific PROOFC, (2) select the number of contestants and the race conditions applicable to each of the PROOFCs so as to yield a wagering experience for the player (with sufficiently variable results and an acceptable financial return on the player's wagers) that makes it likely the player will again use this improved method of wagering, and wherein the wagering is conducted such that whether a player's selection is determined to be a winner depends on the performance of the selected contestant.

30 Claims, 43 Drawing Sheets

(56) References Cited

U.S. PATENT DOCUMENTS

2003/0125822 A1* 7/2003 LaNeve .............. G07F 17/3288 700/91
2004/0104845 A1* 6/2004 McCarthy .......... A63B 24/0021 342/463
2004/0229671 A1* 11/2004 Stronach ................ G06Q 50/34 463/6
2004/0229698 A1* 11/2004 Lind ....................... A63F 13/12 463/42
2004/0235542 A1* 11/2004 Stronach ................ G06Q 30/06 463/6
2005/0003893 A1* 1/2005 Hogwood ........... G07F 17/3288 463/42
2005/0116410 A1* 6/2005 Vlazny ............... G07F 17/3288 273/139
2005/0208995 A1* 9/2005 Marshall ................. A63F 13/12 463/25
2006/0121979 A1* 6/2006 Kennard ................. G07F 17/32 463/25
2006/0252530 A1* 11/2006 Oberberger ............. G07F 17/32 463/29
2006/0258432 A1* 11/2006 Packer ................ G07F 17/3288 463/16
2008/0153583 A1* 6/2008 Huntley .................. G07F 17/32 463/25
2008/0248846 A1* 10/2008 Stronach ................. G07F 17/32 463/6
2010/0029372 A1 2/2010 Bullock
2010/0144428 A1* 6/2010 Fontaine ................ G06Q 50/34 463/28
2012/0322540 A1* 12/2012 Shechtman ......... G07F 17/3288 463/25
2013/0045794 A1 2/2013 Vlazny et al.
2014/0066188 A1 3/2014 Brooks et al.
2014/0066189 A1 3/2014 Brooks et al.
2014/0155142 A1* 6/2014 Conroy ............... G07F 17/3288 463/25
2015/0213684 A1* 7/2015 Daruty ................ G07F 17/3258 463/6

* cited by examiner

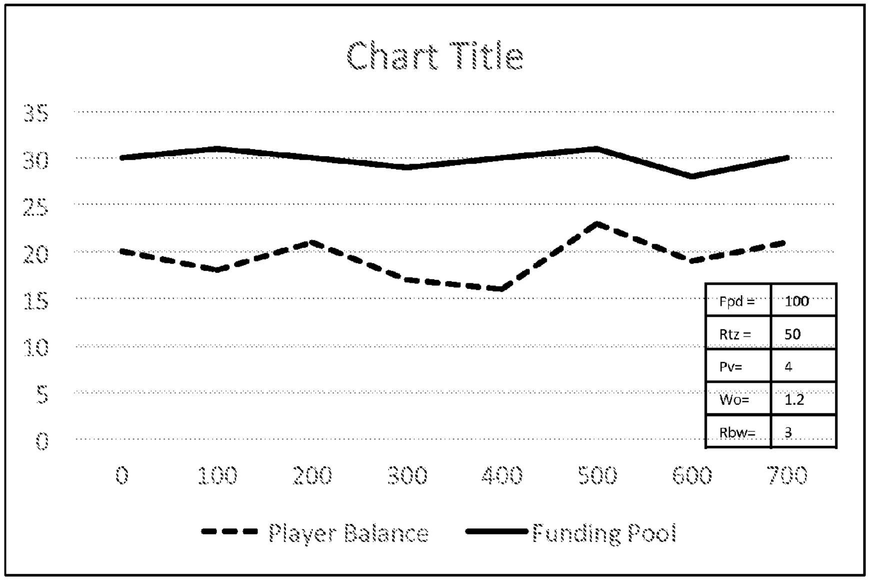

| | |
|---|---|
| Fpd = | 100 |
| Rtz = | 50 |
| Pv= | 4 |
| Wo= | 1.2 |
| Rbw= | 3 |

| pool | Percent of Coin | Min Pay | Funding rate | Begin balance | coin |
|---|---|---|---|---|---|
| Win | 40 | 1.00 | 3% | 1000 | 1 |
| Place | | | | | |
| Show | 30 | .80 | 2% | 1000 | 2 |
| Exacta | 50 | 2.50 | 1% | 1000 | 1 |
| Quenelle | | | | | |
| Trifecta | 60 | 5.00 | 5% | 2000 | 2 |
| Trio | | | | | |
| Pick 2 | 90 | 10.00 | 10% | 5000 | 3 |
| Pick 3 | | | | | |
| Pick 4 | | | | | |
| Pick 5 | | | | | |
| Pick 6 | | | | | |
| Place Pick all | | | | | |
| Triple Trio | | | | | |
| Quiente Plus | | | | | |
| Funding Pool | 1 | | | | |
| Take Out | 9 | | | | |

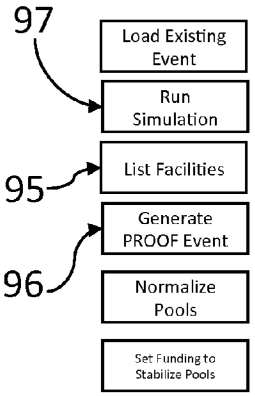

Event Variables

| | |
|---|---|
| Simulation Length in wagering rounds | 700 |
| Contests per Play | 2 |
| Average Wager | 0.60 |
| Maximum Wager | 0.90 |
| Minimum Wager | 0.30 |
| Cycle funding level | 20.00 |
| Use Handicapping tool | Yes |
| Funding Pool Value | 10,000 |
| Desired Pay variability | Yes |
| Desired plays per cycle | Yes |

| Number of Contestants | Number of contests | Number used | % of Number used |
|---|---|---|---|
| 6 | 120 | 50 | 14% |
| 7 | 135 | 50 | 14% |
| 8 | 98 | 50 | 14% |
| 9 | 300 | 50 | 14% |
| 10 | 297 | 50 | 14% |
| 11 | 135 | 50 | 14% |
| 12 | 127 | 50 | 14% |

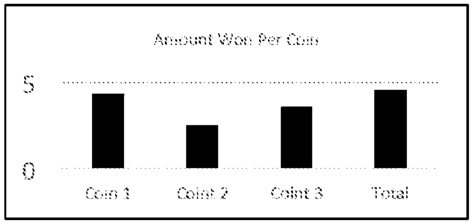

FIG. 8A

| Facility | 6F Dirt Claiming | 6F Dirt ALW Optional Claiming | 5.5F Dirt Claiming | 6F Dirt Starter ALW | 8f Turf winner of One | 8F Turf Maiden | All Except | All |
| --- | --- | --- | --- | --- | --- | --- | --- | --- |
| GG | | | | | X | X | X | |
| LRL | X | X | X | X | X | X | | X |
| GP | X | X | X | X | | | | |
| PIM | | | | | | | | |
| SA | X | | | | X | | | |
| HM | .9 | .9 | .9 | .9 | .5 | 1 | | |

Cancel

Accept

FIG. 8B

FIG. 8C

Illustrative Table Of The Type Of Individual Contest Information That Is Used To Construct An Event

| *i* | Date | $cb_i$ | 1 st | 2 nd | 3 rd | 4 th | 5 th | 6 th | 7 th | 8 th | 9 th | 10 th | 11 th | 12 th | 13 th | BETMIX OVERALL | % $twp_{Win}$ | % $twp_{Exacta}$ | % $twp_{Show}$ | % $twp_{Tri}$ |
|---|---|---|---|---|---|---|---|---|---|---|---|---|---|---|---|---|---|---|---|---|
| **1** | 130303 | 11 | 5 | 9 | 6 | 7 | 4 | 8 | 3 | 10 | 1 | 11 | 2 | | | 9,4,5,7 | 20 | 5 | 25 | 2 |
| **2** | 140125 | 11 | 7 | 9 | 11 | 4 | 3 | 2 | 6 | 5 | 8 | 1 | 10 | | | 1,2,7,6 | 20 | 5 | 25 | 2 |
| **3** | 140208 | 11 | 5 | 3 | 6 | 9 | 10 | 4 | 1 | 7 | 2 | 8 | 11 | | | 6,1,9,5 | 20 | 5 | 25 | 2 |
| **4** | 140209 | 11 | 8 | 2 | 7 | 9 | 1 | 4 | 3 | 11 | 10 | 5 | 6 | | | 3,2,8,6 | 20 | 5 | 25 | 2 |
| **5** | 141213 | 6 | 2 | 3 | 6 | 4 | 5 | 1 | | | | | | | | 4,2,3,6 | 33 | 17 | 100 | 17 |
| **6** | 141227 | 8 | 6 | 1 | 4 | 5 | 2 | 3 | 8 | 7 | | | | | | 1,8,2,4 | 25 | 8 | 50 | 4 |
| **7** | 150103 | 10 | 9 | 4 | 8 | 5 | 1 | 6 | 2 | 10 | 7 | 3 | | | | 8,6,4,9 | 20 | 5 | 33 | 2 |
| **8** | 150110 | 10 | 3 | 1 | 2 | 8 | 4 | 7 | 5 | 9 | 6 | 10 | | | | 3,8,5,4 | 20 | 5 | 33 | 2 |
| **9** | 150124 | 10 | 7 | 4 | 3 | 6 | 10 | 8 | 5 | 1 | 2 | 9 | | | | 3,8,4,7 | 20 | 5 | 33 | 2 |
| **10** | 150124 | 11 | 4 | 8 | 3 | 7 | 10 | 2 | 5 | 6 | 1 | 9 | 11 | | | 5,11,10,7 | 20 | 5 | 25 | 2 |
| **11** | 140516 | 11 | 4 | 10 | 9 | 1 | 2 | 6 | 7 | 3 | 8 | 5 | 11 | | | 1,4,6,2 | 20 | 5 | 25 | 2 |
| **12** | 140517 | 10 | 9 | 6 | 7 | 3 | 5 | 8 | 1 | 4 | 10 | 2 | | | | 8,1,7,3 | 20 | 5 | 33 | 2 |
| **13** | 140517 | 10 | 3 | 10 | 8 | 2 | 4 | 9 | 1 | 7 | 5 | 6 | | | | 9,3,8,1 | 20 | 5 | 33 | 2 |
| **14** | 131101 | 13 | 5 | 12 | 10 | 6 | 9 | 2 | 1 | 4 | 8 | 7 | 3 | 13 | 11 | 2,12,7,6 | 17 | 3 | 20 | 1 |
| **15** | 131101 | 13 | 4 | 2 | 5 | 8 | 3 | 13 | 7 | 11 | 9 | 10 | 12 | 6 | 1 | 7,6,10,5 | 17 | 3 | 20 | 1 |
| **16** | 131101 | 11 | 11 | 5 | 10 | 9 | 7 | 2 | 1 | 6 | 3 | 8 | 4 | | | 1,2,3,9 | 20 | 5 | 25 | 2 |
| **17** | 131102 | 12 | 11 | 9 | 4 | 7 | 12 | 8 | 10 | 5 | 2 | 1 | 6 | 3 | | 2,8,9,11 | 17 | 3 | 25 | 1 |
| | | | | | | | | | | | | | | | | | | | | |
| | | | | | | | | | | | | | | | | **pm** | **0** | **0** | **3** | 0 |
| | | | | | | | | | | | | | | | | **mj** | **1** | **1** | **1** | 1 |
| | | | | | | | | | | | | | | | | **r** | **1** | **2** | **1** | 3 |

Illustrative Table Of The Type Of Results Provided By Our Simulation Of The Individual Contests That Comprise A Proposed Event

| | | | | | | | | | | | | i | 0.25 | 0.4 | 0.12 | 1 | 2 | | | | | | | |
|---|---|---|---|---|---|---|---|---|---|---|---|---|---|---|---|---|---|---|---|---|---|---|---|---|
| | Results | | | Selections | | | | goal success | | | | | | | | | | | | | B = 20.00 | $Fp_0$ = 1.00 | | |
| i | 1st | 2nd | 3rd | 1st | 2nd | 3rd | 1st | Win | Exacta | Show | trifecta | Pick 2 | Win Pool | Exacta Pool | Show Pool | Trifecta Pool | Pick 2 Pool | Number of winning wagers | $ Winning wager in this round | [illegible] | Balance | [illegible] | [illegible] | [illegible] |
| 1 | 1 | 9 | 8 | 8 | 5 | 9 | 1 | 0 | 0 | 1 | 0 | 0 | 0.17 | 0.11 | 0.09 | 0.19 | 0.29 | 1 | 1 | 0.12 | 19.22 | 1.05 | 0.78 | 0 |
| 2 | 4 | 11 | 6 | 8 | 2 | 3 | 2 | 0 | 0 | 0 | 0 | 0 | 0.34 | 0.22 | 0.06 | 0.38 | 0.58 | 0 | 0 | 0 | 18.32 | 1.1 | 0.9 | |
| 3 | 4 | 8 | 6 | 8 | 1 | 6 | 8 | 0 | 0 | 1 | 0 | 0 | 0.51 | 0.33 | 0.15 | 0.57 | 0.87 | 1 | 1 | 0.15 | 17.57 | 1.15 | 0.75 | 1 |
| 4 | 6 | 8 | 4 | 2 | 5 | 9 | 8 | 0 | 0 | 0 | 0 | 0 | 0.68 | 0.44 | 0.09 | 0.76 | 1.16 | 0 | 0 | 0 | 16.67 | 1.2 | 0.9 | |
| 5 | 7 | 5 | 2 | 7 | 3 | 2 | 6 | 1 | 0 | 1 | 0 | 0 | 0.85 | 0.55 | 0.18 | 0.95 | 1.45 | 2 | 1 | 1.03 | 16.8 | 1.25 | 0.13 | 1 |
| 6 | 6 | 1 | 3 | 3 | 6 | 2 | 4 | 0 | 0 | 0 | 0 | 0 | 0.17 | 0.66 | 0.09 | 1.14 | 1.74 | 0 | 0 | 0 | 15.9 | 1.3 | 0.9 | |
| 7 | 1 | 2 | 5 | 2 | 4 | 1 | 8 | 0 | 0 | 1 | 0 | 0 | 0.34 | 0.77 | 0.18 | 1.33 | 2.03 | 1 | 1 | 0.18 | 15.18 | 1.35 | 0.72 | 1 |
| 8 | 8 | 3 | 9 | 8 | 3 | 4 | 4 | 1 | 1 | 0 | 0 | 0 | 0.51 | 0.88 | 0.09 | 1.52 | 2.32 | 2 | 1 | 1.39 | 15.67 | 1.4 | 0.49 | 0 |
| 9 | 8 | 10 | 4 | 2 | 6 | 8 | 3 | 0 | 0 | 1 | 0 | 0 | 0.17 | 0.11 | 0.18 | 1.71 | 2.61 | 1 | 1 | 0.18 | 14.95 | 1.45 | 0.72 | 0 |
| 10 | 4 | 1 | 3 | 4 | 3 | 1 | 6 | 1 | 0 | 1 | 0 | 0 | 0.34 | 0.22 | 0.09 | 1.9 | 2.9 | 2 | 1 | 0.46 | 14.51 | 1.5 | 0.44 | 0 |
| 11 | 3 | 6 | 7 | 2 | 7 | 9 | 3 | 0 | 0 | 0 | 0 | 0 | 0.17 | 0.33 | 0.06 | 2.09 | 3.19 | 0 | 0 | 0 | 13.61 | 1.55 | 0.9 | |
| 12 | 9 | 11 | 6 | 1 | 0 | 0 | 7 | 0 | 0 | 0 | 0 | 0 | 0.34 | 0.44 | 0.15 | 2.28 | 3.48 | 0 | 0 | 0 | 12.71 | 1.6 | 0.9 | |
| 13 | 2 | 9 | 7 | 6 | 2 | 9 | 7 | 0 | 0 | 1 | 0 | 0 | 0.51 | 0.55 | 0.24 | 2.47 | 3.77 | 1 | 1 | 0.24 | 12.05 | 1.65 | 0.66 | 2 |
| 14 | 4 | 5 | 1 | 1 | 5 | 2 | 4 | 0 | 0 | 0 | 0 | 0 | 0.68 | 0.66 | 0.09 | 2.66 | 4.06 | 0 | 0 | 0 | 11.15 | 1.7 | 0.9 | |
| 15 | 5 | 1 | 2 | 5 | 3 | 1 | 1 | 1 | 0 | 1 | 0 | 0 | 0.85 | 0.77 | 0.18 | 2.85 | 4.35 | 2 | 1 | 1.03 | 11.28 | 1.75 | 0.13 | 1 |
| 16 | 2 | 3 | 11 | 2 | 1 | 0 | 1 | 1 | 0 | 0 | 0 | 0 | 0.17 | 0.88 | 0.09 | 3.04 | 4.64 | 1 | 1 | 0.25 | 10.63 | 1.8 | 0.65 | 0 |
| 17 | 6 | 1 | 2 | 7 | 6 | 1 | 3 | 0 | 0 | 1 | 0 | 0 | 0.09 | 0.99 | 0.18 | 3.23 | 4.93 | 1 | 1 | 0.18 | 9.91 | 1.85 | 0.72 | 0 |
| 18 | 7 | 1 | 4 | 5 | 6 | 2 | 6 | 0 | 0 | 0 | 0 | 0 | 0.26 | 1.1 | 0.09 | 3.42 | 5.22 | 0 | 0 | 0 | 9.01 | 1.9 | 0.9 | |
| 19 | 7 | 3 | 5 | 4 | 2 | 7 | 1 | 0 | 0 | 1 | 0 | 0 | 0.43 | 1.21 | 0.18 | 3.61 | 5.51 | 1 | 1 | 0.18 | 8.29 | 1.95 | 0.72 | 1 |

FIG. 8E

Illustrative Table Of The Type Of Results Provided By Our Simulation Of The Individual Contests That Comprise A Proposed Event

| | | | | | | | | | | | | *i* | 0.25 | 0.4 | 0.12 | 1 | 2 | | | | | | |
|---|---|---|---|---|---|---|---|---|---|---|---|---|---|---|---|---|---|---|---|---|---|---|---|
| | Results | | | Selections | | | | pool success | | | | | | | | | | | | B = 20.00 | $Fp_0$ = 1.00 | | |
| *i* | 1st | 2nd | 3rd | 1st | 2nd | 3rd | 1st | Win | Exacta | Show | trifecta | Pick 2 | Win Pool | Exacta Pool | Show Pool | Trifecta Pool | Pick 2 Pool | Number of winning wagers | win amt | Balance | fp | px | tbw |
| 20 | 1 | 3 | 4 | 2 | 5 | 1 | 8 | 0 | 0 | 1 | 0 | 0 | 0.6 | 1.32 | 0.09 | 3.8 | 5.8 | 1 | 0.12 | 7.51 | 2 | 0.78 | 0 |
| 21 | 11 | 5 | 4 | 4 | 5 | 1 | 1 | 0 | 0 | 0 | 0 | 0 | 0.77 | 1.43 | 0.06 | 3.99 | 6.09 | 0 | 0 | 6.61 | 2.05 | 0.9 | |
| 22 | 1 | 5 | 6 | 2 | 1 | 1 | 1 | 0 | 0 | 1 | 0 | 0 | 0.94 | 1.54 | 0.15 | 4.18 | 6.38 | 1 | 0.15 | 5.86 | 2.1 | 0.75 | 1 |
| 23 | 1 | 3 | 2 | 1 | 3 | 2 | 3 | 1 | 1 | 1 | 1 | 0 | 1.11 | 1.65 | 0.09 | 4.37 | 6.67 | 4 | 7.35 | 12.21 | 2.15 | 6.35 | 0 |
| 24 | 1 | 4 | 8 | 1 | 5 | 3 | 3 | 1 | 0 | 0 | 0 | 0 | 0.17 | 0.11 | 0.06 | 0.19 | 6.96 | 1 | 0.25 | 11.56 | 2.2 | 0.65 | 0 |
| 25 | 8 | 10 | 4 | 1 | 0 | 0 | 6 | 0 | 0 | 0 | 0 | 0 | 0.09 | 0.22 | 0.15 | 0.38 | 7.25 | 0 | 0 | 10.66 | 2.25 | 0.9 | |
| 26 | 9 | 7 | 6 | 9 | 6 | 1 | 6 | 1 | 0 | 0 | 0 | 1 | 0.26 | 0.33 | 0.24 | 0.57 | 7.54 | 2 | 7.8 | 17.56 | 2.3 | 6.9 | 1 |
| 27 | 1 | 9 | 8 | 1 | 2 | 9 | 5 | 1 | 0 | 1 | 0 | 0 | 0.17 | 0.44 | 0.33 | 0.76 | 0.29 | 2 | 0.58 | 17.24 | 2.35 | 0.32 | 0 |
| 28 | 3 | 8 | 5 | 1 | 4 | 5 | 3 | 0 | 0 | 1 | 0 | 0 | 0.09 | 0.55 | 0.09 | 0.95 | 0.58 | 1 | 0.12 | 16.46 | 2.4 | 0.78 | 0 |
| 29 | 7 | 2 | 1 | 1 | 7 | 4 | 2 | 0 | 0 | 0 | 0 | 0 | 0.26 | 0.66 | 0.06 | 1.14 | 0.87 | 0 | 0 | 15.56 | 2.45 | 0.9 | |
| 30 | 4 | 5 | 1 | 4 | 1 | 6 | 1 | 1 | 0 | 0 | 0 | 1 | 0.43 | 0.77 | 0.15 | 1.33 | 1.16 | 2 | 2.43 | 17.09 | 2.5 | 1.53 | 1 |
| 31 | 5 | 2 | 1 | 1 | 5 | 2 | 3 | 0 | 0 | 1 | 0 | 0 | 0.17 | 0.88 | 0.24 | 1.52 | -0.55 | 1 | 0.24 | 16.43 | 1.66 | 0.66 | 0 |
| 32 | 2 | 1 | 4 | 1 | 2 | 3 | 2 | 0 | 0 | 0 | 0 | 0 | 0.34 | 0.99 | 0.09 | 1.71 | -0.26 | 0 | 0 | 15.53 | 1.71 | 0.9 | |
| 33 | 2 | 3 | 1 | 2 | 4 | 3 | 1 | 1 | 0 | 1 | 0 | 1 | 0.51 | 1.1 | 0.18 | 1.9 | 0.03 | 3 | 2.69 | 17.32 | 0.02 | 1.79 | 1 |
| 34 | 6 | 9 | 3 | 6 | 3 | 1 | 3 | 1 | 0 | 0 | 0 | 0 | 0.17 | 1.21 | 0.09 | 2.09 | -1.68 | 1 | 0.25 | 16.67 | 0.07 | 0.65 | 0 |
| 35 | 1 | 8 | 9 | 8 | 6 | 7 | 1 | 0 | 0 | 0 | 0 | 0 | 0.09 | 1.32 | 0.18 | 2.28 | -1.39 | 0 | 0 | 15.77 | 0.12 | 0.9 | |
| 36 | 4 | 1 | 2 | 2 | 1 | 3 | 5 | 0 | 0 | 0 | 0 | 0 | 0.26 | 1.43 | 0.27 | 2.47 | -1.1 | 0 | 0 | 14.87 | 0.17 | 0.9 | |
| 37 | 1 | 6 | 8 | 6 | 2 | 1 | 3 | 0 | 0 | 1 | 0 | 0 | 0.43 | 1.54 | 0.36 | 2.66 | -0.81 | 1 | 0.36 | 14.33 | 0.22 | 0.54 | 2 |
| 38 | 1 | 5 | 4 | 4 | 5 | 1 | 9 | 0 | 0 | 1 | 0 | 0 | 0.6 | 1.65 | 0.09 | 2.85 | -0.52 | 1 | 0.12 | 13.55 | 0.27 | 0.78 | 0 |
| 39 | 8 | 4 | 3 | 6 | 8 | 1 | 1 | 0 | 0 | 0 | 0 | 0 | 0.77 | 1.76 | 0.06 | 3.04 | -0.23 | 0 | 0 | 12.65 | 0.32 | 0.9 | |
| 40 | 3 | 1 | 7 | 7 | 6 | 1 | 3 | 0 | 0 | 1 | 0 | 0 | 0.94 | 1.87 | 0.15 | 3.23 | 0.06 | 1 | 0.15 | 11.9 | 0.37 | 0.75 | 1 |

FIG. 8F

| Cbi | ncj | P(cbi) | win | exacta | show | tri | Pick 2 |
|---|---|---|---|---|---|---|---|
| 6 | 153 | 17.6% | 26.1% | 9.7% | 59.3% | 6.6% | 3.2% |
| 7 | 139 | 16.0% | 20.6% | 5.7% | 35.4% | 2.7% | 2.9% |
| 8 | 135 | 15.5% | 17.3% | 3.8% | 33.2% | 1.3% | 2.8% |
| 9 | 137 | 15.7% | 17.2% | 3.8% | 25.8% | 1.4% | 2.8% |
| 10 | 130 | 14.9% | 14.9% | 2.7% | 21.9% | 1.1% | 2.7% |
| 11 | 104 | 11.9% | 13.5% | 2.3% | 17.8% | 1.1% | 2.2% |
| 12 | 53 | 6.1% | 11.9% | 1.7% | 17.6% | 1.0% | 1.1% |
| 13 | 20 | 2.3% | 10.7% | 1.4% | 13.7% | 1.0% | 0.4% |
| nc | 871 | | | | | | |

FIG. 8G

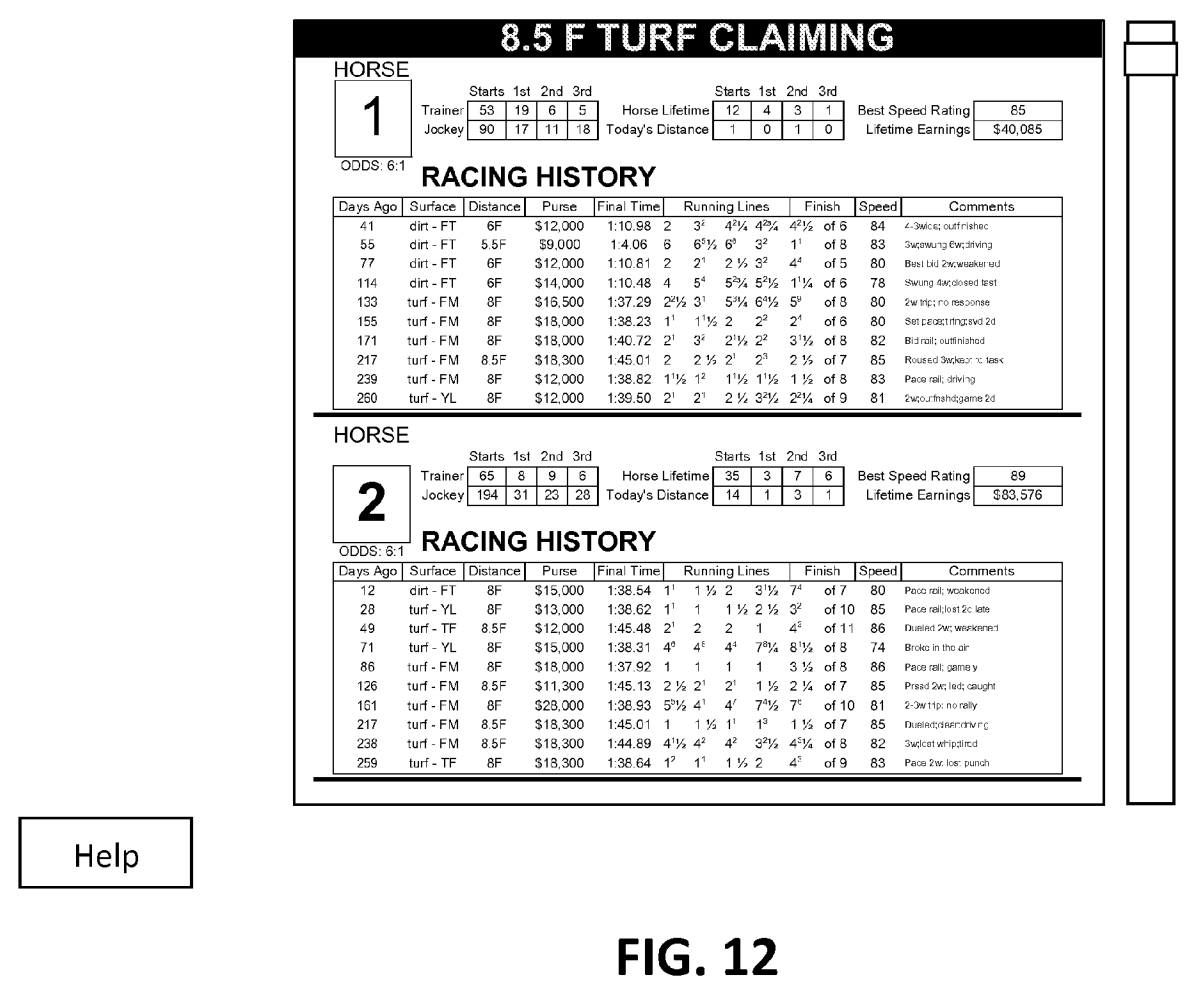

8.5 F TURF CLAIMING

HORSE

1

ODDS: 6:1

| | Starts | 1st | 2nd | 3rd |
|---|---|---|---|---|
| Trainer | 53 | 19 | 6 | 5 |
| Jockey | 90 | 17 | 11 | 18 |

| | Starts | 1st | 2nd | 3rd |
|---|---|---|---|---|
| Horse Lifetime | 12 | 4 | 3 | 1 |
| Today's Distance | 1 | 0 | 1 | 0 |

| | |
|---|---|
| Best Speed Rating | 85 |
| Lifetime Earnings | $40,085 |

RACING HISTORY

| Days Ago | Surface | Distance | Purse | Final Time | Running Lines | Finish | Speed | Comments |
|---|---|---|---|---|---|---|---|---|
| 41 | dirt - FT | 6F | $12,000 | 1:10.98 | 2 $3^{2}$ $4^{2\frac{1}{4}}$ $4^{2\frac{3}{4}}$ | $4^{2\frac{1}{2}}$ of 6 | 84 | 4-3wide; outfinished |
| 55 | dirt - FT | 5.5F | $9,000 | 1:4.06 | 6 $6^{5\frac{1}{2}}$ $6^{6}$ $3^{2}$ | $1^{1}$ of 8 | 83 | 3w;swung 6w;driving |
| 77 | dirt - FT | 6F | $12,000 | 1:10.81 | 2 $2^{1}$ 2 ½ $3^{2}$ | $4^{4}$ of 5 | 80 | Best bid 2w;weakened |
| 114 | dirt - FT | 6F | $14,000 | 1:10.48 | 4 $5^{4}$ $5^{2\frac{3}{4}}$ $5^{2\frac{1}{2}}$ | $1^{1\frac{1}{4}}$ of 6 | 78 | Swung 4w;closed fast |
| 133 | turf - FM | 8F | $16,500 | 1:37.29 | $2^{2\frac{1}{2}}$ $3^{1}$ $5^{3\frac{1}{4}}$ $6^{4\frac{1}{2}}$ | $5^{9}$ of 8 | 80 | 2w trip; no response |
| 155 | turf - FM | 8F | $18,000 | 1:38.23 | $1^{1}$ $1^{1\frac{1}{2}}$ 2 $2^{2}$ | $2^{4}$ of 6 | 80 | Set pace;tring;svd 2d |
| 171 | turf - FM | 8F | $18,000 | 1:40.72 | $2^{1}$ $3^{2}$ $2^{1\frac{1}{2}}$ $2^{2}$ | $3^{1\frac{1}{2}}$ of 8 | 82 | Bid rail; outfinished |
| 217 | turf - FM | 8.5F | $18,300 | 1:45.01 | 2 2 ½ $2^{1}$ $2^{3}$ | 2 ½ of 7 | 85 | Roused 3w;kept to task |
| 239 | turf - FM | 8F | $12,000 | 1:38.82 | $1^{1\frac{1}{2}}$ $1^{2}$ $1^{1\frac{1}{2}}$ $1^{1\frac{1}{2}}$ | 1 ½ of 8 | 83 | Pace rail; driving |
| 260 | turf - YL | 8F | $12,000 | 1:39.50 | $2^{1}$ $2^{1}$ 2 ½ $3^{2\frac{1}{2}}$ | $2^{2\frac{1}{4}}$ of 9 | 81 | 2w;outfnshd;game 2d |

HORSE

2

ODDS: 6:1

| | Starts | 1st | 2nd | 3rd |
|---|---|---|---|---|
| Trainer | 65 | 8 | 9 | 6 |
| Jockey | 194 | 31 | 23 | 28 |

| | Starts | 1st | 2nd | 3rd |
|---|---|---|---|---|
| Horse Lifetime | 35 | 3 | 7 | 6 |
| Today's Distance | 14 | 1 | 3 | 1 |

| | |
|---|---|
| Best Speed Rating | 89 |
| Lifetime Earnings | $83,576 |

RACING HISTORY

| Days Ago | Surface | Distance | Purse | Final Time | Running Lines | Finish | Speed | Comments |
|---|---|---|---|---|---|---|---|---|
| 12 | dirt - FT | 8F | $15,000 | 1:38.54 | $1^{1}$ 1 ½ 2 $3^{1\frac{1}{2}}$ | $7^{4}$ of 7 | 80 | Pace rail; weakened |
| 28 | turf - YL | 8F | $13,000 | 1:38.62 | $1^{1}$ 1 1 ½ 2 ½ | $3^{2}$ of 10 | 85 | Pace rail;lost 2c late |
| 49 | turf - TF | 8.5F | $12,000 | 1:45.48 | $2^{1}$ 2 2 1 | $4^{3}$ of 11 | 86 | Dueled 2w; weakened |
| 71 | turf - YL | 8F | $15,000 | 1:38.31 | $4^{6}$ $4^{6}$ $4^{4}$ $7^{8\frac{1}{4}}$ | $8^{1\frac{1}{2}}$ of 8 | 74 | Broke in the air |
| 86 | turf - FM | 8F | $18,000 | 1:37.92 | 1 1 1 1 | 3 ½ of 8 | 86 | Pace rail; gamely |
| 126 | turf - FM | 8.5F | $11,300 | 1:45.13 | 2 ½ $2^{1}$ $2^{1}$ 1 ½ | 2 ¼ of 7 | 85 | Prssd 2w; led; caught |
| 161 | turf - FM | 8F | $28,000 | 1:38.93 | $5^{5\frac{1}{2}}$ $4^{1}$ $4^{7}$ $7^{4\frac{1}{2}}$ | $7^{6}$ of 10 | 81 | 2-3w trip: no rally |
| 217 | turf - FM | 8.5F | $18,300 | 1:45.01 | 1 1 ½ $1^{1}$ $1^{3}$ | 1 ½ of 7 | 85 | Dueled;clear;driving |
| 238 | turf - FM | 8.5F | $18,300 | 1:44.89 | $4^{1\frac{1}{2}}$ $4^{2}$ $4^{2}$ $3^{2\frac{1}{2}}$ | $4^{3\frac{1}{4}}$ of 8 | 82 | 3w;lost whip;tired |
| 259 | turf - TF | 8F | $18,300 | 1:38.64 | $1^{2}$ $1^{1}$ 1 ½ 2 | $4^{3}$ of 9 | 83 | Pace 2w; lost punch |

Help

FIG. 12

METHOD FOR PARI-MUTUEL WAGERING

CROSS-REFERENCE TO RELATED APPLICATION

This is a Continuation-In-Part Patent Application and claims the benefit of Regular patent application Ser. No. 14/685,171, filed Apr. 13, 2015 by the present inventor. The teachings of this earlier filed application are incorporated herein by reference to the extent that they do not conflict with the teaching herein.

BACKGROUND OF THE INVENTION

1. Field of the Invention

The present invention generally relates to networked type, amusement devices. More specifically, the invention is directed to improved methods and devices that provide for pari-mutuel wagering.

2. Description of the Related Art

Pari-mutuel wagering is a betting system wherein all the amounts of money wagered by a group of players/system users on each of the possible outcomes of a contest e.g., which horse from among a field of horses will win a specific horse race) are placed together in a pool; taxes and the "house take" are removed (e.g., 14.25%) so as to yield a payoff amount that is shared among those users who correctly picked the winner of the contest. By the use of a totalisator or tote which keeps track of all the bets, instantaneously computes the sum of the bets made on any one of the possible outcomes in a contest, and displays this information, one is able to know when placing one's bet the various odds, depending on which outcome one bets, for winning some multiple of one's original bet—these odds often impact the wager that a user will make and add to the excitement of such games.

Thus, for the example of a horse race, how much one wins relative to one's own winning bet depends on the payoff amount and the sum of the amounts that the other winning users also wagered. From knowing how much has been wagered on each horse in the race and thus the total amount wagered at the time of one placing his or her bet, one can get an idea of how much one might win if the percentages of money being wagered on the different horses stay the same until the start of the race when no further bets are accepted and the winning odds for the various horses are then determined.

Consider a hypothetical race with eight horses/runners, numbered 1-8, and where the amount of money bet in pari-mutuel wagering on each horse to win is as follows at the start of the race; with this information, the calculations for the odds of winning some multiple of one's original bet can be made as shown below:

| Runners | $ Wagered | Odds Calculations | Odds |
|---|---|---|---|
| 1 | $ 6,000 | $88,152/$6,000 | 14.69 |
| 2 | $ 14,000 | $88,152/$14,000 | 6.30 |
| 3 | $ 2,400 | $88,152/$2,400 | 36.73 |
| 4 | $ 11,000 | $88,152/$11,000 | 8.01 |
| 5 | $ 2,400 | $88,152/$2,400 | 4.01 |
| 6 | $ 9,400 | $88,152/$9,400 | 9.38 |
| 7 | $ 30,000 | $88,152/$30,000 | 2.94 |
| 8 | $ 8,000 | $88,152/$8,000 | 11.02 |
| Pool: | $102,800 | | |

Payout = Pool − Take = Pool − 0.1425 × Pool = 0.8575 × Pool = $88,152.00

Pari-mutuel betting differs from "fixed-odds" betting in that the final payout is not determined until the pool is closed in "fixed odds" betting, the odds are often being offered by a bookmaker who is responsible for making the required payouts to the winning users from monies that the bookmaker presumably collects from those users who placed non-winning bets on the same race with the bookmaker. If these monies are insufficient to make the required wining payouts, the bookmaker is expected to make up the balance of any needed funds from the bookmaker's own surplus funds. Pari-mutuel wagering is frequently state-regulated, and is offered in many places where "fixed odds" betting or gambling is otherwise illegal.

Modern pari-mutuel betting was made possible by the invention of the totalisator or tote. It should be noted that the totalisator was developed out of one's frustration with the prior methods used to conduct racetrack wagering—i.e., on Apr. 26, 1927, Harry Straus was at a racetrack in Maryland where he had a winning $10 bet on a horse that showed 12-1 at the start of the race. The horse won, but the expected payout of $120 didn't happen as the "final odds," posted after the race, were less than 4-1.

Disappointed with this experience, Straus decided to rectify such situations by inventing a totalisator that would eliminate the time-lag in calculating and presenting the pari-mutuel odds on a horse race, while also issuing betting tickets, and showing a race's payouts. Pimlico Race Course, home of the "Preakness," the middle jewel of horse racing's "Triple Crown," installed a partial totalisator in 1930, and Arlington Park installed the United States' first complete totalisator in 1933. This began a long and continuous program of improvement and enhancement in the practice of pari-mutuel wagering.

The pari-mutuel, wagering industry has advanced the practice of wagering to meet the demands of its customers by developing new wagers, cash accepting machines, self-service wagering machines and advanced deposit wagering—first using the telephone and eventually using the internet. The pari-mutuel industry also evolved to address issues with the supply of wagering opportunities by providing interstate simulcast wagering in the late 1970's, and then intrastate simulcast wagering in the early 1980's. Each advancement occurred as a result of customer demand, business needs, restructuring within the industry, changes in the expectations of consumers based on the developments in parallel industries and the entrant of new competitors in the wagering entertainment market.

More recently, consumers' desire for fast paced, graphically-engaging, wagering capabilities, coupled with business issues within the horse racing industry (i.e., the decline of wagering revenues and a desire to find a means to monetize the vast digital assets repository of horse racing images and information from prior races) has driven the industry to introduce new, pari-mutuel wagering, methods and systems that enable one to wager on previously-run racing contests (i.e., order-of-finish contests). A challenging aspect of this introduction was the requirement that these new, pari-mutuel wagering, methods and systems provide unbiased results to all participants while simulating their wagering interactions so as to yield the types of excitement/entertainment levels as experienced during live racing contests.

These challenges were not initially addressed in great detail when wagering on historical racing was first introduced more than fifty years ago in various "play for fun," charity-based environments. See examples such as "Armchair Racing Inc." and "A Nite at the Races," which both attempted to provide a turnkey form of "historical is racing," including instruction on how to arrange the pari-mutuel pricing of such charity-based, wagering pools.

The racing industry's early attempts at "historical racing" quickly led to the incorporation of a totalisator for establishing and handling the necessary pari-mutuel, wagering pools and their subsequent payouts. The industry's versions of such games quickly became known in the industry as "instant wagering" or "historical race wagering." Many of the methods and apparatuses or systems associated with these new or improved forms of pari-mutuel wagering were patent protected, see, e.g., U.S. Pat. Nos. 2,182,875, 2,179, 698, 5,411,258, 5,830,068, 5,846,132, 6,383,074, 6, 358, 150, 6,450,887, 6,736,725, 8,814,700, and 8,636,571, or are seeking patent protection, see, e.g., U.S. Patent Publications Numbers (USPPN) 2010/0029372, 2013/0045794, 2014/0066188 and 2014/0066189.

The systems currently associated with "instant wagering" often include the following components that are connected to a totalisator or racetrack tote system via a high speed network: (1) a video server with a database that has video images of gaming contests stored therein, (2) a game server that includes a computer, (3) a number of game or wagering terminals or "instant racing" terminals, each of which is configured to be an effective, simulated, self-service, racetrack terminal and may include the following elements: a money acceptor, a printer, a document reader, a sound card, a credit/debit card reader, and a user interface comprising a touch activated, color display, (4) an administrative terminal that can be programmed to control the actions of the system, and (5) a high-speed gateway to the racetrack tote system.

With such apparatus and systems, it still remained a challenge as to how to create viable pari-mutuel wagering pools from a number of players sitting in front of their individual gaming terminals. One couldn't depend on them all watching the same historical race and methodically placing their wagers—such a method would be too time consuming and the resulting pools would probably not be sufficiently large to attract the players' attention or interest.

The solution to this challenge was to let the users each effectively have their own individual, historical races to contemplate and upon which to eventually place a wager without having them tied into the actions of other users who also had to be allowed the time to place their wagers before a race could start. Thus, players using their terminals and wagering on their own game effectively compete against each other for "progressive" pools which are formed for each of the types of bets that can be made by any and all of the players who are playing at essentially the same time. A player who "hits" or wins his wager receives the "progressive" pool's payout.

Each of these "progressive" pools are formed by accumulating the currency from the wagers of the prior players (i.e., prior in the sense that another player may have hit a "Bet" button only a few seconds before one places his/her own "Bet") who did not select the right horse/s necessary to win their wagers. To arrive at the exact funding going into these "progressive" pools, one must still make the standard deductions for taxes and "take out," plus deduct the monies necessary to fund a "seed" pool or "pool fund". This "seed" pool is used to fund to some stated, minimum level each of the "progressive" pools after a player "wins"—otherwise, such a "progressive" pool would be empty except for the next player's wager in those situations when the immediately prior player was a winner.

Using the example of a trifecta (i.e., player places a wager on the horses that will finish first, second and third in exact order) game, when a system user or player commits to a wager, the game server selects at random a combination of three contestants/horses as the first three finishers—a race with those first three finishers is selected from the database of prior races. After the user enters his or her selections and places the wager, the race results are shown, including the identity of the race, and a video recording of the race or its finish.

In "instant racing," the determination as to whether a player has actually won his or her wager is augmented by the inclusion of the results of a random number generator (see: Association of Racing Commissioners International, Inc.'s (ARCI)-004-155: Proprietary Wagers, Sections: A(1), A(3) and A(4)). The benefit of using the random number generator is that it ensures fairness and it gives a distribution of outcomes around the average outcomes over time that have both positive and negative variability, which helps to provide the excitement levels that the typical pari-mutuel wager is seeking Despite these recent developments in "instant racing," there still exists the opportunity to further improve this form of pari-mutuel wagering so that its participants are provided with the reported greater excitement and entertainment levels that are experienced during live racing contests.

SUMMARY OF THE INVENTION

Recognizing the need for improved forms of pari-mutuel wagering that will provide its users or participants with greater levels of excitement and entertainment, the present invention is generally directed to providing such improved methods, devices and systems.

In a preferred embodiment, the present invention is an improved method for allowing a plurality of players to make pari-mutuel wagers on previously-run, order-of-finish contests (PROOFCs), wherein the improvements are upon the basic method that is of the type which includes the following steps of: (a) accessing a system for pari-mutuel wagering on PROOFCs, wherein this system includes a networked totalisator with totalisator control software, a number of networked wagering terminals with terminal control software, and a database of information pertaining to the PROOFCs, (b) providing to each of the players an individual PROOFC on which is the player may wager, (c) establishing a pari-mutuel pool on which the players may wager, (d) receiving from each of the players the contestant selection choices and wager input information for the player that pertain to the one of the PROOFCs upon which the player has chosen to wager, (e) displaying to each of the players the contest results and the payouts applicable to the one of the PROOFCs upon which the player wagered, and (f) dispensing from the pari-mutuel pool the appropriate payout to each of the players.

The present invention improves upon this method by further including the steps of: (j) modifying the totalisator and terminal control software so as to enable the operator of a pari-mutuel wagering enterprise to access the database of race conditions pertaining to each of the PROOFCs and assemble a specified collection of PROOFCs upon which the player may elect to wager or not wager on each of the PROOFCs in the collection, (k) wherein the control software modifications include the ability for the operator of a pari-mutuel wagering enterprise to select the number of contestants and the race conditions applicable to each of the PROOFCs in the collection so as to yield a wagering experience for the player, with sufficiently variable wagering results and a financial return on the wagers of the player, which makes it likely that the player will again use this improved method of wagering on PROOFCs, and (l) wherein the control software modifications further include that the operation of the wagering is conducted such that whether a player's selection, of a specific contestant as part of a given type of wager on a selected PROOFC, is determined to be a winner actually depends on the finishing place of the specific contestant in the selected PROOFC and the nature of the given type of wager.

In a first variant of this preferred embodiment, this improved method further includes the step of: (m) modifying the totalisator and terminal control software so as to enable a player to configure the interface of the terminal being used by the player so as to enhance the enjoyment that the player experiences while wagering on the PROOFCs. These enjoyment enhancements are achieved by configuring the control software modification so as to enable selecting: (i) between a "traditional" or a "graphically-entertaining" interface, (ii) whether to optionally: view the information pertaining to a specific PROOFC, handicap a specific PROOFC on which the player is going to wager, and, when the player chooses not to handicap, whether to utilize any one of a plurality of automated contestant selection techniques that are provided to the player, and (iii) additional, optional pools upon which the player may elect to wager.

In a third variant of this preferred embodiment, this improved method further includes the step of: (n) modifying the totalisator control software so as to randomize the order of the sequence in which the specified collection of PROOFCs are offered to the player for wagering.

In a fourth variant of this preferred embodiment, this improved method further includes the step of: (o) modifying the control software so as to include the ability for the operator of a pari-mutuel wagering enterprise to mathematically model both the predicted financial return on the wagers of a player and the predicted variability in the wagering results of the player in utilizing a specified collection of PROOFCs that the operator has assembled and is considering for use on this system for pari-mutuel wagering on PROOFCs.

In a fifth variant of this preferred embodiment, the present invention may take the form of an instruction-storing, non-transitory, computer-readable medium; and wherein these instructions are seen to enable a system (that includes a networked totalisator, a plurality of networked wagering terminals with screen interfaces, a database of race conditions pertaining to PROOFCs) to provide improved pari-mutuel, wagering services on PROOFCs when the instructions on the medium include the steps of enabling this system to: (a) provide a system operator with the ability to: (i) access the database of race conditions pertaining to the PROOFCs and assemble a specified collection of PROOFCs upon which any one of a plurality of players may elect to wager or not wager on each of the PROOFCs in the collection, (ii) select the number of contestants and the race conditions applicable to each of the PROOFCs in the collection so as to yield a wagering experience for the player (with sufficiently variable wagering results and a financial return on the wagers of the player) which makes it likely that the player will again use this improved wagering service, (b) establish a terminal-specified, pari-mutuel pool on which each of the players may wager, (c) receive from each of the players the contestant selection choices and wagers of a player, (d) provide that the operation of the wagering is conducted such that whether a player's selection, of a specific contestant as part of a given type of wager on a selected PROOFC, is determined to be a winner actually depends on the finishing place of the specific contestant/s in the selected PROOFC and the nature of the given type of wager, and (e) display to each of the players the pertinent PROOFC results and the appropriate payouts applicable to the player's contestant selection choices.

Thus, there has been summarized above (rather broadly and understanding that there are other preferred embodiments which have not been summarized above) the present invention in order that the detailed description that follows may be better understood and appreciated.

BRIEF DESCRIPTION OF THE DRAWINGS

FIG. 8A is a schematic representation of an "event" creation user interface which is part of the totalisator's new control software that enables one to use a database of previously-run, order-of-finish contests to assemble a sequence of contests and pools into an "event."

FIG. 8B is a schematic representation of a facilities selection screenshot that aids an "event" creator in selecting the racing facility and contests' conditions one wishes to draw upon to create an "event."

FIG. 8C is an illustrative table that indicates the type of individual contest information that is used, according to the present invention, to construct an "event."

FIGS. 8E-8F illustrate part of the spreadsheet calculations that represent the output of the event simulation which uses the input data illustrated in FIG. 8C and whose results went into the drawing of FIG. 8D.

FIG. 8G is a table that displays, for our simulation of the proposed event whose partial results are shown in FIG. 8D, the outcome of the present invention's calculations for the theoretical probabilities of successfully picking a winner in each of the five types of wagers that are being made on various contests that are differentiated based on the number of contestants in each of the contests.

FIG. 12 is a schematic representation of a screenshot that is seen on a player's or user's game terminal screen to indicate a prior race's past performance information according to a preferred embodiment of the present invention.

DESCRIPTION OF THE PREFERRED EMBODIMENT

Figure 1:
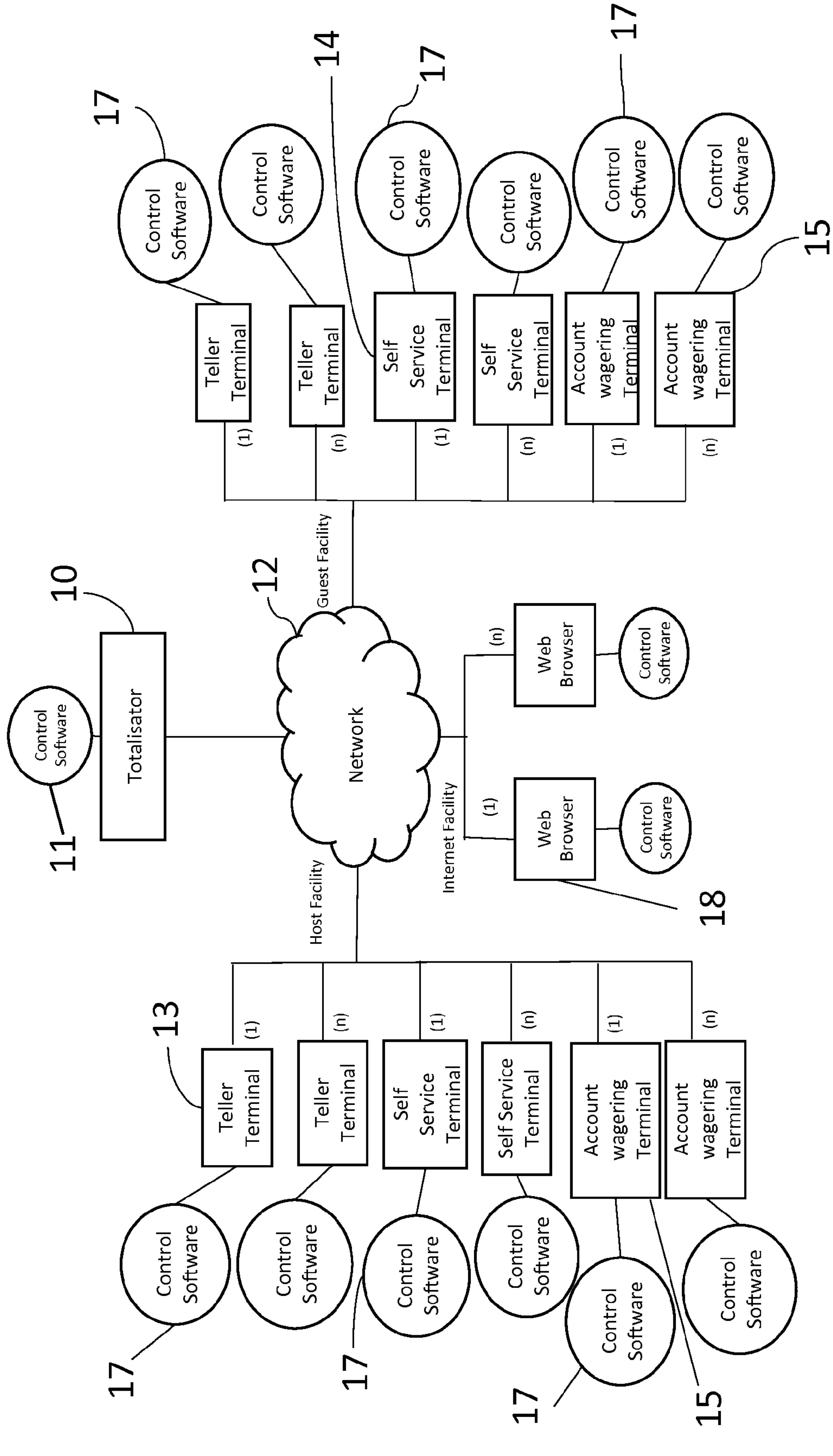
FIG. 1 is a block diagram illustrating the general architecture of the system of the present invention.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The improvements to the current art of pari-mutuel wagering that are incorporated into the present invention enable its users to enjoy greater levels of excitement and entertainment in their wagering activities. This is achieved in great part because of the present invention's ability to enable its game or wagering terminals to be modified and configured by their users so as to provide alternative and customized types of terminal interfaces and wagering experiences so that they better suit the wagering preferences of their users. Additionally, the present invention allows its users to experience racetrack experiences that are more varied and life-like than those available with the present "instant racing" technology.

Key, innovative features of the present invention that, in part, yield its improvements to the existing, pari-mutuel wagering experience include: (1) improved graphical representations of the outcomes of the contests wagered upon by using novel animations and sounds while clearly communicating the outcome of one's wager/s in a deterministic manner, (2) a means for accessing a database of previously run contests that allows one in the pari-mutuel, wagering industry (i.e., the licensee or operator of a pari-mutuel wagering enterprise) to assemble a collection or list of such contests into a "race program or day" or "event (a collection of "order of finish" contests that are placed in a predefined sequence with a number of associated pari-mutuel pools that are associated with a particular terminal (i.e., terminal-specified, pari-mutuel pool) or facility or pari-mutuel licensee that is hosting the pools that will be formed on these contests)" or "deck of races," (3) the ability for one in the pari-mutuel, wagering industry to offer their customers or players an "event" made of numerous contests upon which the player may wager or elect to not wager until the player identifies a contest upon which the player has a greater interest in wagering, (4) alterations to the control software and data structures of a totalisator to enable it to support and make possible new types of previously-run, order of finish contests (PROOFCs) in an entertaining, secure, unbiased and reliable manner, and (5) further control software modifications that yield the operation of this improved wagering being conducted such that whether a player's selection, of a specific contestant as part of a given type of wager on a selected PROOFC, is determined to be a winner actually depends on the finishing place of the specific contestant in the selected PROOFC and the nature of the given type of wager.

Shown in FIG. 1 is a block diagram that illustrates, according to the present invention, the general architecture of a pari-mutuel wagering system for PROOFCs. Being an improvement on the current art of pari-mutuel wagering, the present invention also relies on the presence of a fully functional, totalisator or totalisator system 10. Such system includes the totalisator's central control software 11 that allows the totalisator to connect over a network 12 to a number of facilities (host, guest & internet) that may include wagering terminals (teller 12, self-service 14, account wagering 15 & web browser 16) whose operations are controlled by their respective terminal control software 17 that allows this hardware to work with the totalisator to create a previously-run, order of finish, pari-mutuel wagering system.

Figure 2:
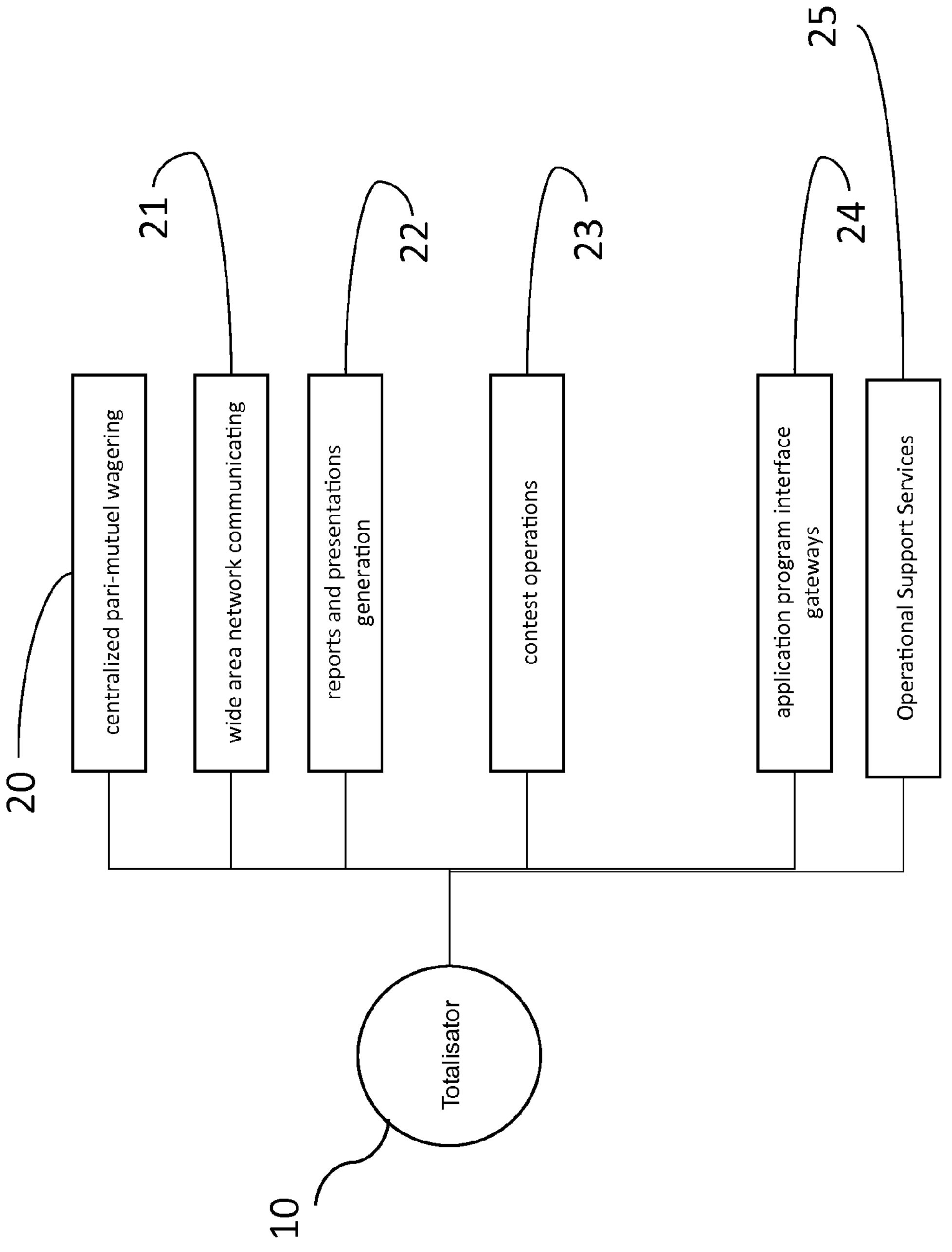
FIG. 2 is a block diagram illustrating the general functions of the totalisator of the present invention.

Because of the importance of a totalisator to such a system, it is advisable to provide a more detailed description of it so that the enhancements to it that have been achieved by the present invention can be better understood. See FIG. 2 for a block diagram that illustrates the functions/components of the enhanced totalisator of the present invention. The totalisator's components may be grouped according to the functions they perform, which include: (a) centralized pari-mutuel wagering 20, (b) wide area network communicating 21, (c) report and presentation generation 22, (d) operation of contests 23 at a host facility (where an actual race is conducted) and/or guest-at or guest facility (i.e., where a player or user is at a facility that is not conducting an actual race), (e) providing for application program interface gateways 24, and (f) operational support services 25. This networked totalisator essentially provides the ability for one to operate a pari-mutuel wagering business that allows players or users to place wagers on contests which are conducted at a number of distant facilities.

The totalisator is configured and its control software is written so as to allow these various functions to include the following tasks:

centralized pari-mutuel wagering 20: (a) receiving and validating each individual wager placed on a race or order of finish contest, (b) totaling all the wagers into pools, (c) applying appropriate commission rates, (d) calculating the payout of each wager based on the outcome of the contest, (e) providing operational management of the receipt and payment for each automated and manual wagering terminal used in the wagering process, (f) ensuring that each winning wager is paid correctly and only once, (g) ensuring that wagers or monies received after the close of the wagering period are excluded from the wagering pools, (h) tracking winning wagers and applying appropriate tax regulations to the winnings, and doing this all in a manner as governed by local, state or provincial, federal, or international laws and regulations and industry practices;

wide area network communication 21: (a) connecting the host facility, which includes information displays, printers, wagering terminals, operations user interfaces devices, transaction concentrators, order of finish contest officiating user interface devices, and a number of specialized peripheral processing devices, (b) connecting guest facilities that are wagering on a contest conducted at a host facility, through the use of video and wagering information transmission and presentation, which includes information displays, printers, wagering terminals, operations user interfaces devices, transaction concentrators and specialized peripheral processing devices, and (c) connecting a plurality of pari-mutuel wagering systems through the use of numerous industry standards for the transmission and receipt of wagers for the inclusion in pari-mutuel pools formed on the conduct of a contest at a host facility;

report and presentation generation 22: (a) the storage of racing and wagering information in a manner that allows for the retrieval of this information so as to enable the conduct of pari-mutuel wagering that ensures the fidelity of all the detailed information inputted, processed and outputted as a result of the utilization of the centralized, pari-mutuel wagering function, wherein the storage mechanisms utilized may be a combination of proprietary data storage technology and industry standard database management systems, (b) the selection, filtering and rendering of reports used in the conduct, operations, management and regulation of pari-mutuel wagering, and (c) the mathematical, logical and statistical manipulation of the inputted and stored information, and wherein the reports generated from the totalisator are numerous, but can generally be grouped into five general areas: (1) the cash handling and accounting aspects of pari-mutuel wagering, which include, but are not limited to, teller and self-service device cash flows and cash drawer management (i.e. debits and credits for draws, returns, wagers sold, winning wagers cashed, vouchers sold, credit vouchers cashed), cash can retrieval from self-service units, advanced deposit wagering accounts cash flow (i.e. debits and credits for deposits, withdrawals, adjustments, wagers sold, and winning wagers) and money room settlement cash flow shifts between facilities as a result of the respective pari-mutuel wagers and winning amounts among such facilities, (2) teller management for either human or automated tellers which include but are not limited to, teller productivity, teller sign-in and sign-out activities, teller profiles and privileges, teller information and security hierarchies reporting, (3) pari-mutuel pool management and winning dividend (price) calculations which include but are not limited to utilization of pool totals for gross and net (post commissions) calculation modes, rounding and breakage calculation reporting carry-over pools jackpot and associated seed pools accounting, identification and valuation of winning tickets, pool progression tracking, local and system wide guest and host pool reporting, and price calculation reporting, (4) intra facility accounting which includes but is not limited to detailed and summarized reporting for wagering account balances, terminal or virtual/online machine sales, pool liabilities, outstanding unpaid winning tickets and credit vouchers, parlay wagers accounting, and bet reports, and (5) the generation of the reports necessary to review, validate and monitor the configuration of the totalisator which include, but are not limited to, commission structures, terminal definitions and privileges, Inter Tote System Protocol (ITSP) links to other guest or host totalisators, user credentials and privileges, and the wagering "community" structures that allow a facility or logical grouping of facilities to select the desired custom behaviors, functionality, and accounting characteristics of their specific devices/interfaces, operation of contests 23: (a) entering and managing information for each participant and betting interest which is part of the contest which is transmitted to the terminals so that the user can view this information which can include past performance information, (b) enabling, managing and disabling wagering for a particular contest, (c) configuring, and managing available, pari-mutuel wagering pools of a contest, (d) monitoring and controlling the plurality of terminals and other devices (e.g., video recording) at the host facility; and (e) recording the outcomes of races or order of finish contests;

application program interface gateway 24: (a) receiving native format transactions from the centralized pari-mutuel wagering functions and reformatting them into industry standard formats, (b) sending, receiving and managing connections with applications foreign to the totalisator, including, but not limited to, wager processing systems, banking systems, web browser user interfaces, wagering terminals, reporting databases and regulatory monitoring systems, and (c) providing access control to the functionality of the centralized pari-mutuel wagering functions; and operational support services 25: (a) configuring the underlying databases, (b) monitoring all incoming and outgoing communication links, pool transfers, and information streams, (c) configuring and managing the commissions and distributions applicable to each pool available for a wager on a particular contest, (d) controlling and monitoring of remote wagering facilities to wagering pools, and (e) monitoring and managing access to the totalisator system by remote facilities, foreign systems and system users.

Returning now to FIG. 1, a block diagram for the general architecture of a pari-mutuel wagering system for PROOFC, we next direct our attention to the terminals utilized by such a system.

Figure 3:
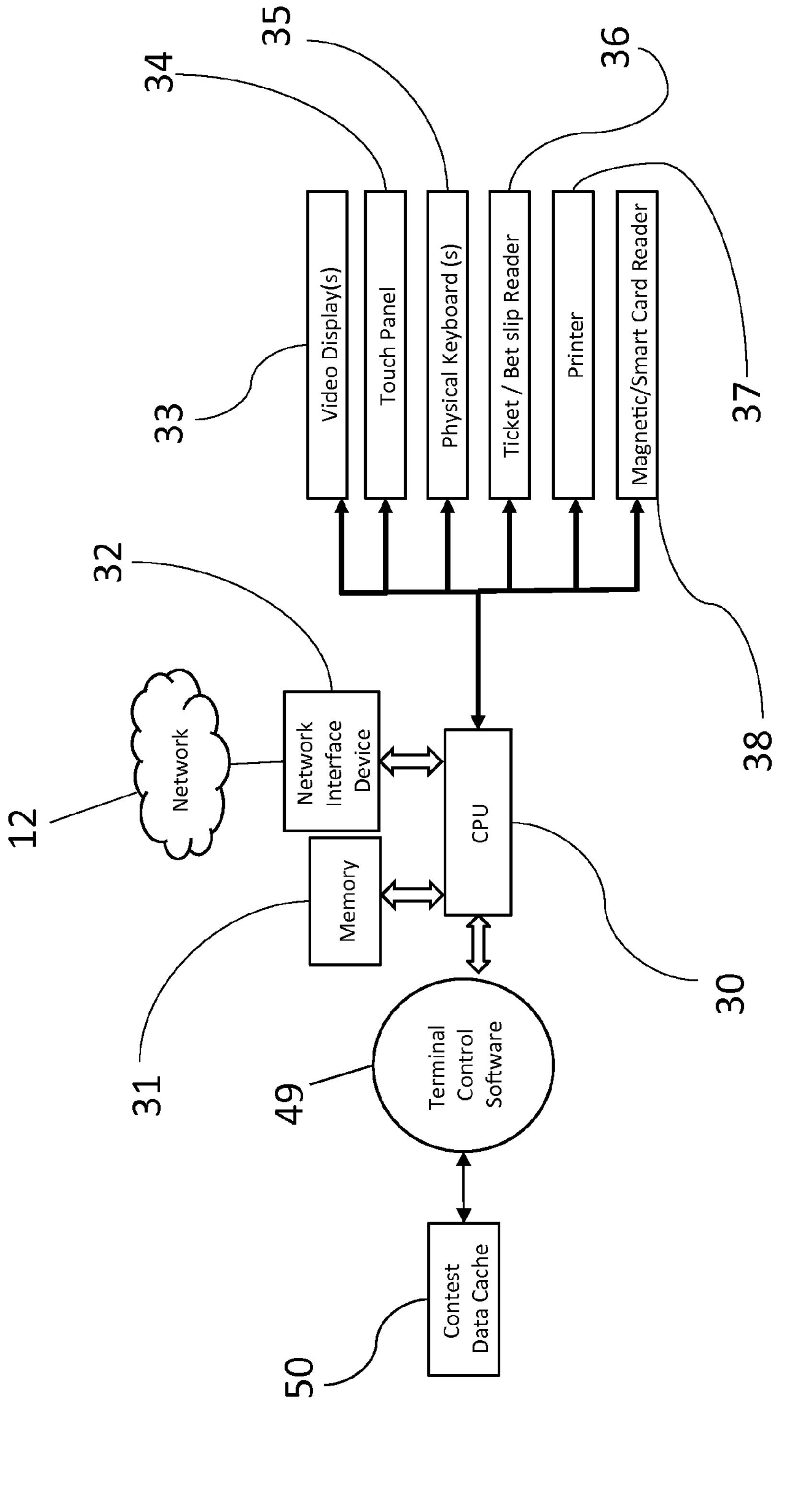
FIG. 3 is a block diagram illustrating the general architecture of the teller terminal used by the present invention.
Figure 4:
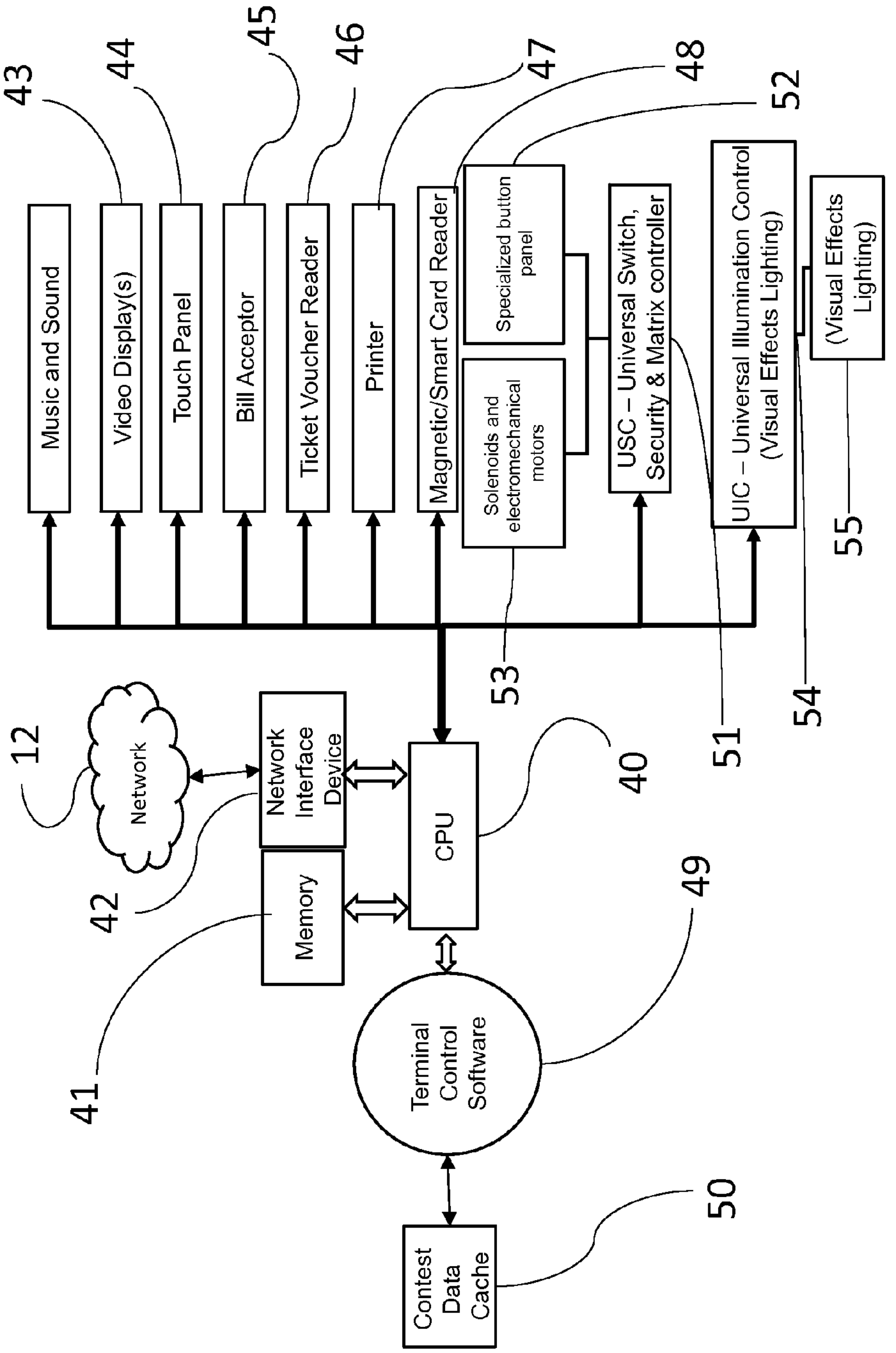
FIG. 4 is a block diagram illustrating the general architecture of the self-service terminal used by the present invention.
Figure 5:
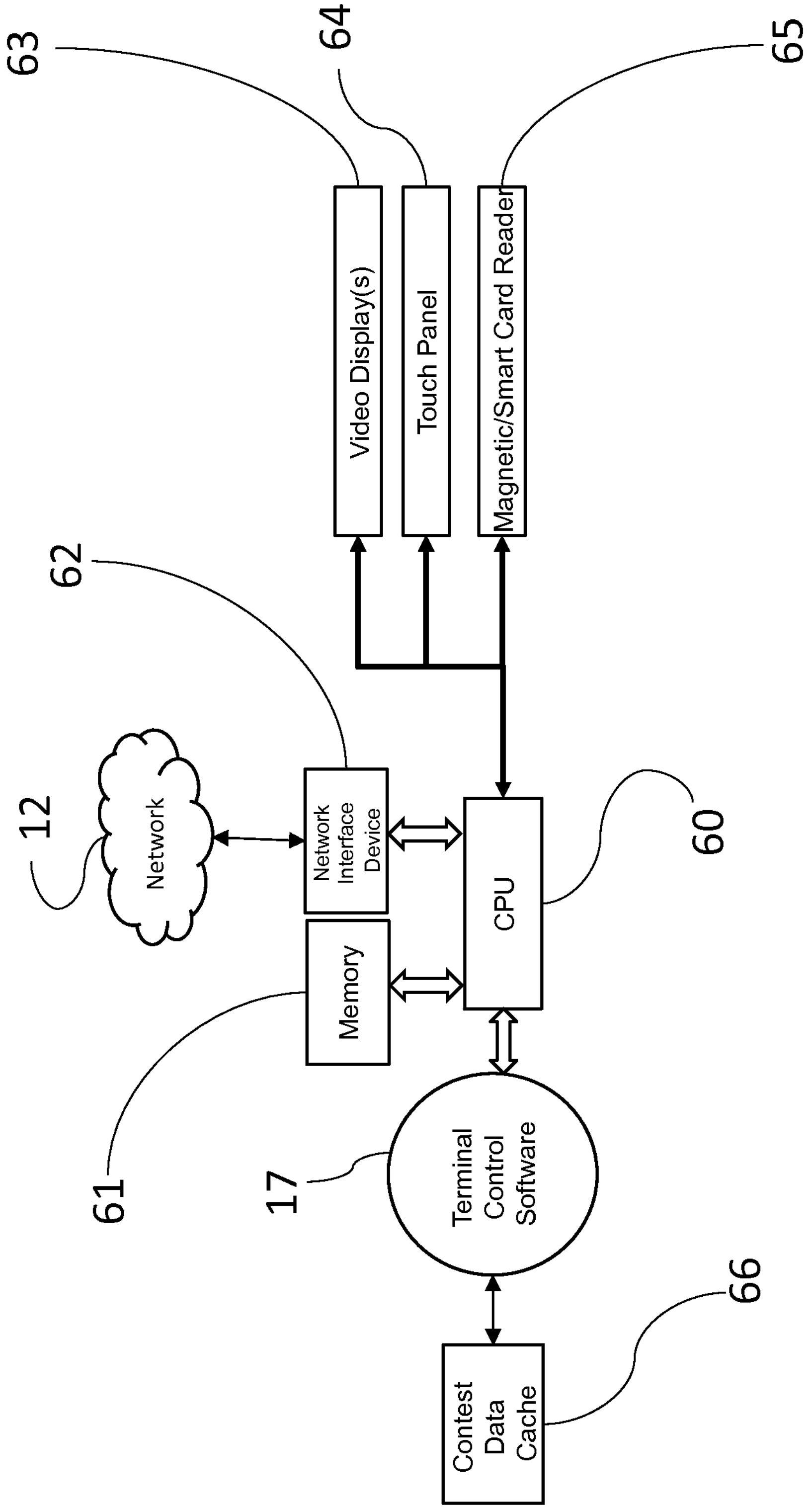
FIG. 5 is a block diagram illustrating the general architecture of the account wagering terminal used by the present invention.
Figure 6:
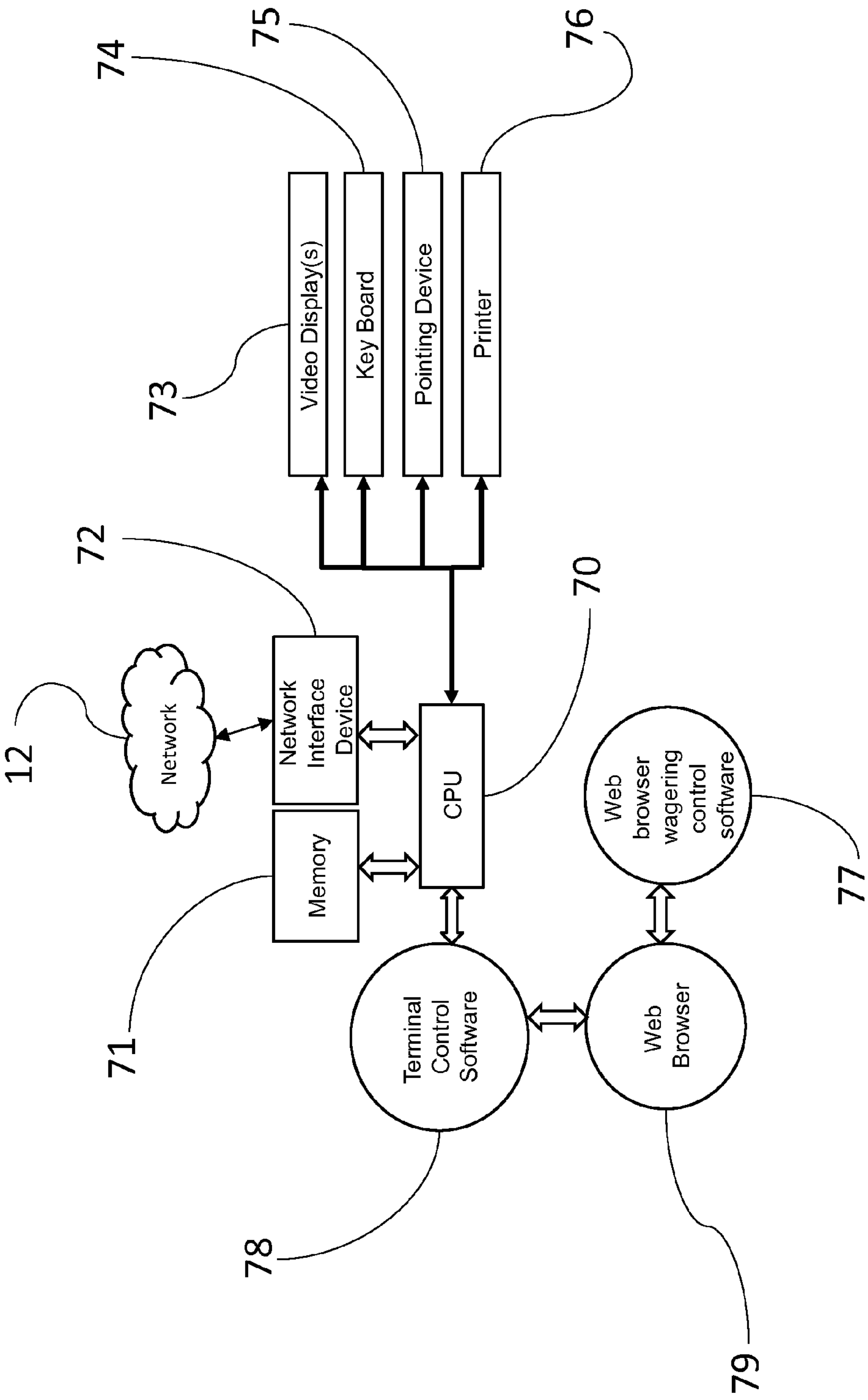
FIG. 6 is a block diagram illustrating general architecture of the browser based terminal used by the present invention.

Shown in FIGS. 3-6 are block diagrams that illustrate the general architecture of the respective teller (i.e., one who is typically an employee of the facility and is tasked with assisting players or users to place their wagers) 13, self-service 14, account wagering 15 and web browser 16 terminals that have been configured for use by the present invention. These respective terminals include:

teller 13, FIG. 3: a CPU 30, memory 31, a network interface device 32, video displays for viewing by the teller and the customer 33, touch panels 34 to allow both teller and customer to interact with the terminal, physical key boards 35 to allow both teller and customer to interact with the terminal, a reader or document reader 36 that allows for insertion of wagering tickets, vouchers and a wager bet slip that allows the customer to mark on a provided document one's desired bets and amounts, a printer 37 that produces wagering tickets, vouchers, temporary account information, receipt of customer deposits, wagering contest information and other reports for use by the teller regarding terminal configuration and totalisator configuration, a card reading device 38 that reads various cards which include but are not limited to, proprietary customer tracking cards, credit cards, banking cards, and proprietary account cards, terminal control software 17 that allows the functioning of the terminal and enables the terminal to interact with the customer, teller and the totalisator through the network 12 to which it is connected; this hardware and its control software allows the teller to (a) place all manner of wagers on all provided contests, (b) determine if tickets are winners or losers, (c) conduct all manner of administrative function required to conduct pari-mutuel wagering including the capture of customer personal identifying information, (d) read customers' tickets or vouchers or bet slips, (e) produce a wagering voucher or account voucher, and (f) read a banking, credit proprietary account or customer tracking card;

self-service 14, FIG. 4: a CPU 40, memory 41, a network interface device 42, video displays 43, touch panels 44 to allow the customer to interact with the terminal, a currency acceptor 45, a reader 46 (that allows for insertion of wagering tickets and vouchers), a printer 47 (that produces wagering tickets and vouchers), a card reading device 48 (that reads various cards which include proprietary customer tracking cards, credit cards, banking cards, and account cards), terminal control software 49 that allows the traditional functioning of the terminal and the PROOFC enhancements that add the additional functionality for the terminal which enables the present invention including the new types of interactions with the totalisator's control software, contest data cache 50 that stores the relevant portions of the enhanced contest information data structure, a Universal Switch, Security & Matrix controller 51 that allows for interaction with a specialized button panel 52 that provides a subset of user interface functionality available through the touch interface, as well as interacting with solenoids and electromechanical motors 53, a Universal Illumination Control 54 that controls the terminal's special effects lighting 55. The addition of the Universal Switch, Security & Matrix controller 51 and the Universal Illumination Control 54 is an improvement over the current "instant racing" in that they allow for the customized circuit boards that were created to allow for the integration of the button panels, lighting, solenoids and other electromechanical motors into the terminal control software. This hardware and its control software allows this self-service terminal to: (a) place all manner of wagers on all provided contests, (b) determine if tickets are winners or losers, (c) establish a balance on the terminal to use in placing wagers, by inserting winning tickets, betting vouchers or accessing a is wagering account stored on the totalisator, (d) read tickets, bet slips or vouchers, (e) produce a wagering voucher, or deposit receipt, and (e) read a banking, credit proprietary account or customer tracking card.

account wagering (self-service) 15, FIG. 5: a CPU 60, memory 61, a network interface device 62, video displays 63, touch panels 64 to allow the customer to interact with the terminal, a card reading device 65 (that reads various cards which include proprietary customer tracking cards, credit cards, banking cards, and account cards), terminal control software 17 that allows the traditional functioning of the terminal and the PROOFC enhancements that add the additional functionality for the terminal which enables the present invention including the new types of interactions with the totalisator's control software, contest data cache 66 that stores the relevant portions of the enhanced contest information data structure. This hardware and its control software allows this self-service terminal to: (a) place all manner of wagers on all provided contests, (b) establish a balance on the terminal to use in placing wagers, by accessing a wagering account stored on the totalisator, (c) read a banking, credit proprietary account or customer tracking card.

web browser, 16, FIG. 6: within a web-browser enabled, personal computer or smart device or phone: a CPU 70, memory 71, a network interface device 72, video displays for viewing by the customer 73, key board 74 to allow the customer to interact with the terminal, pointing device 75 to allow the customer to interact with the terminal, access to a printer 76 that allows the customer to produce hardcopy of any reports provided by the web browser wagering control software 77, terminal control software 78 that allows the functioning of the terminal and enables the terminal to interact with the customer, a web browser 79 that allows the terminal to interact across the internet using industry standard protocols and conventions, a web browser wagering control software 17 that enables the customer to interact with the totalisator through the network 12; this hardware and its control software enables this web browser terminal to allow a user, player or customer to: (a) place all manner of wagers on all provided contests, (b) select and receive video stream of the contest live or as a replay, (c) access past performance information and present it on the display, (d) conduct administrative functions for one's wagering account, such as changes to personal identifying information and correspondence delivery locations, and (e) read established banking information that will enable the customer to fund one's account through the use of one of the many forms of electronic fund transfer whether bank account based or credit card based.

The present invention's improvement on the current form of pari-mutuel wagering is made possible, in large part, by the creation of new or modified control software for both the totalisator and its terminals. This terminal control software is especially unique in that, for interchangeability purposes, it has been configured and written in such a robust manner that it allows these terminals to be operated in a number of different ways, including: (a) by a 3$^{rd}$ party or teller who acts on the instructions of a player or user who is placing a wager, (b) solely by a user, (c) account wagering, and (d) as a web browser version operating on a user owned device or a 3$^{rd}$ party provided device connected through a private or public network.

Figure 7A:
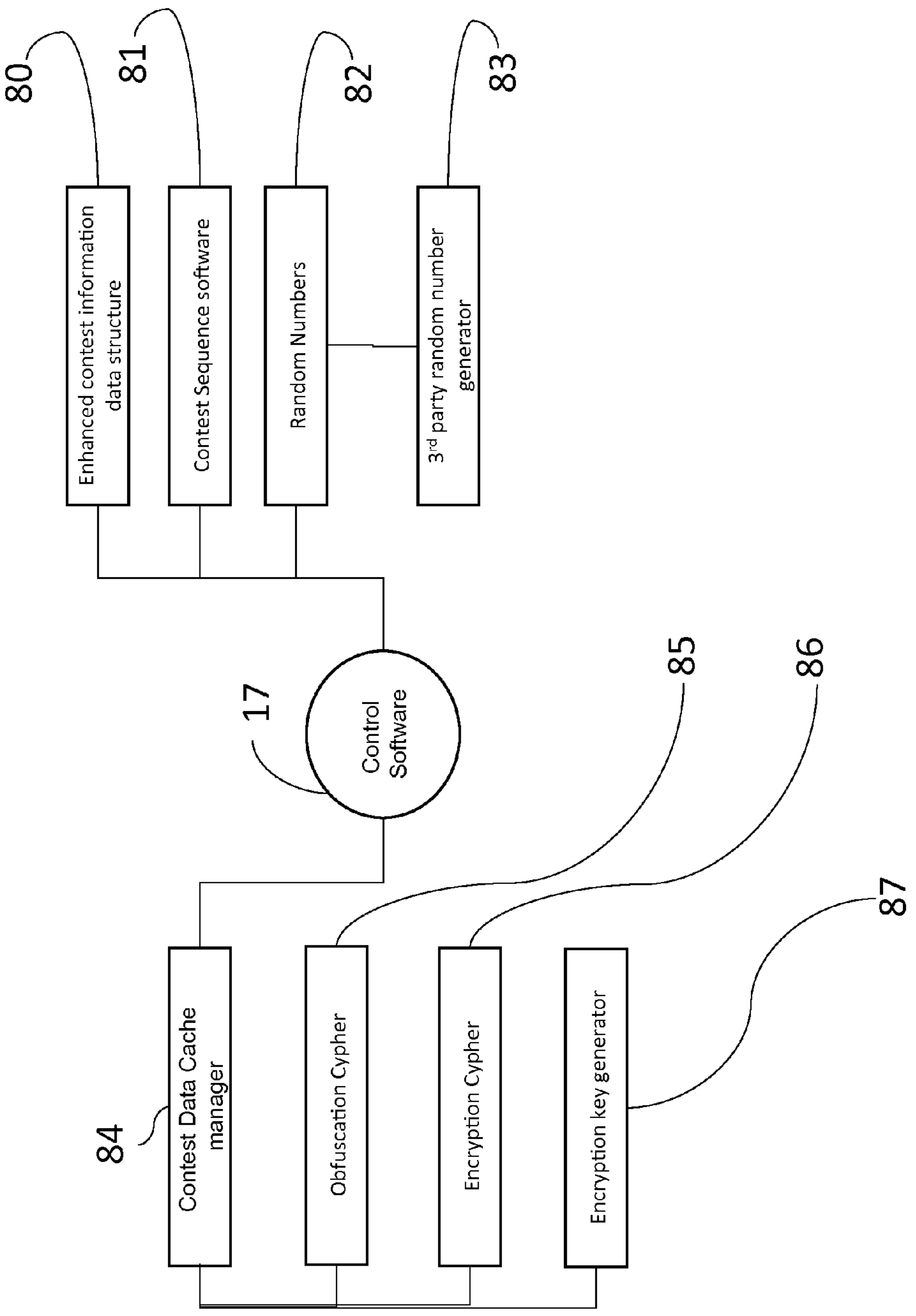
FIG. 7A is a block diagram illustrating the general architecture of the totalisator's control software according to the present invention.

A block diagram of the general architecture of the totalisator's new control software 17 is shown in FIG. 7A. The new parts of this control software are made up of: an enhanced contest data structure, which contains all the pertinent information for the various contests (e.g., when & where they were run, contestants, race conditions) 80, contest sequence software 81, a sequenced list of random numbers 82, a third party, hardware-based, random number generator 83, and a manager of the contest data cache 84. The contest data cache manager contains an obfuscation cypher 85 that is used to generate the contest identifier in a manner that is predictably reproducible, but yields an obfuscated version that has scrubbed all identifying markings from the file that would let a user know the "where and when" the contest was run. The data cache manager also includes an encryption cypher that uses an encryption key to encrypt the data file 86 and a third party encryption key generator that generates a unique key for each file encrypted 87.

Figure 7B:
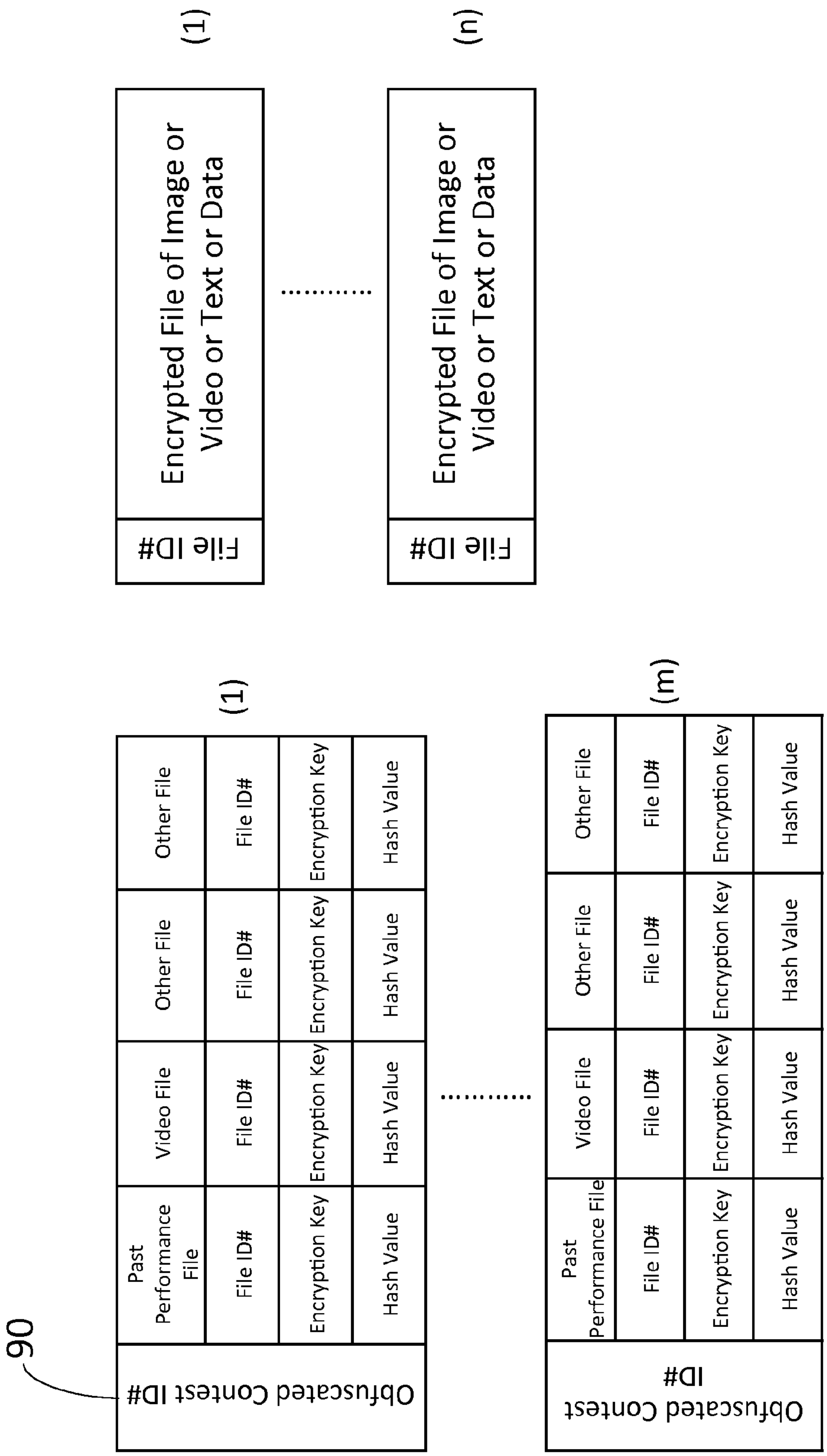
FIG. 7B is a block diagram illustrating the basic architecture of the totalisator's contest data cache that is created in a preferred embodiment of the present invention.
Figure 7C:
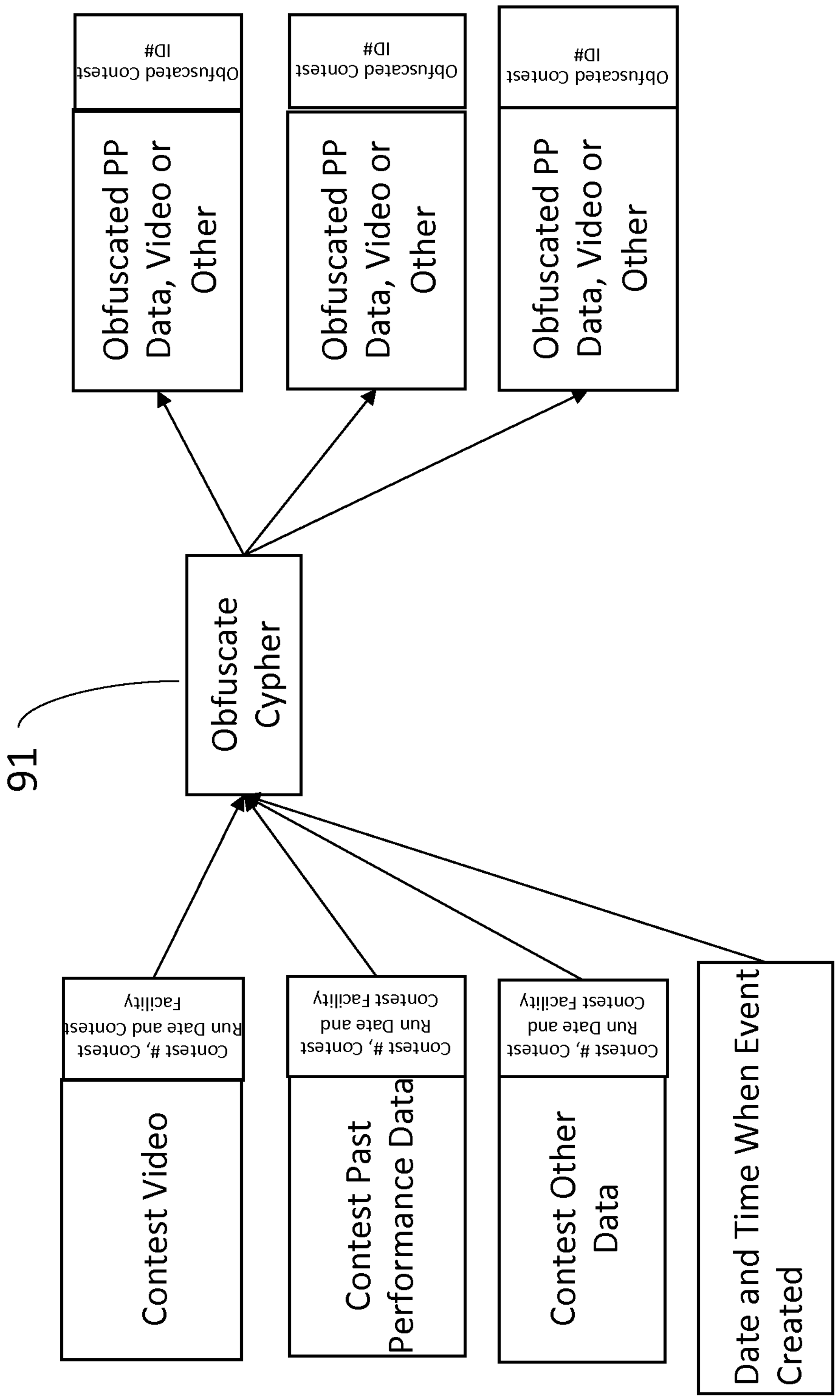
FIG. 7C is a block diagram illustrating the technique for creation of an obfuscated contest identification number for each contest that is stored in the totalisator's contest data cache.

The basic architecture of the contest data cache in a preferred embodiment of the present invention is shown in FIG. 7B. Each contest that is stored in the data cache is accessed via an obfuscated contest identification number 90. The technique for creation of this identification number is shown in FIG. 7C where the data storage elements of a contest are renamed by passing the data storage elements through an Obfuscate Cypher 91 that combines the date and the time the contest was created with the contest number, facility and date of the individual contest that generates a number that does not identify the underlying contests.

Figure 7D:
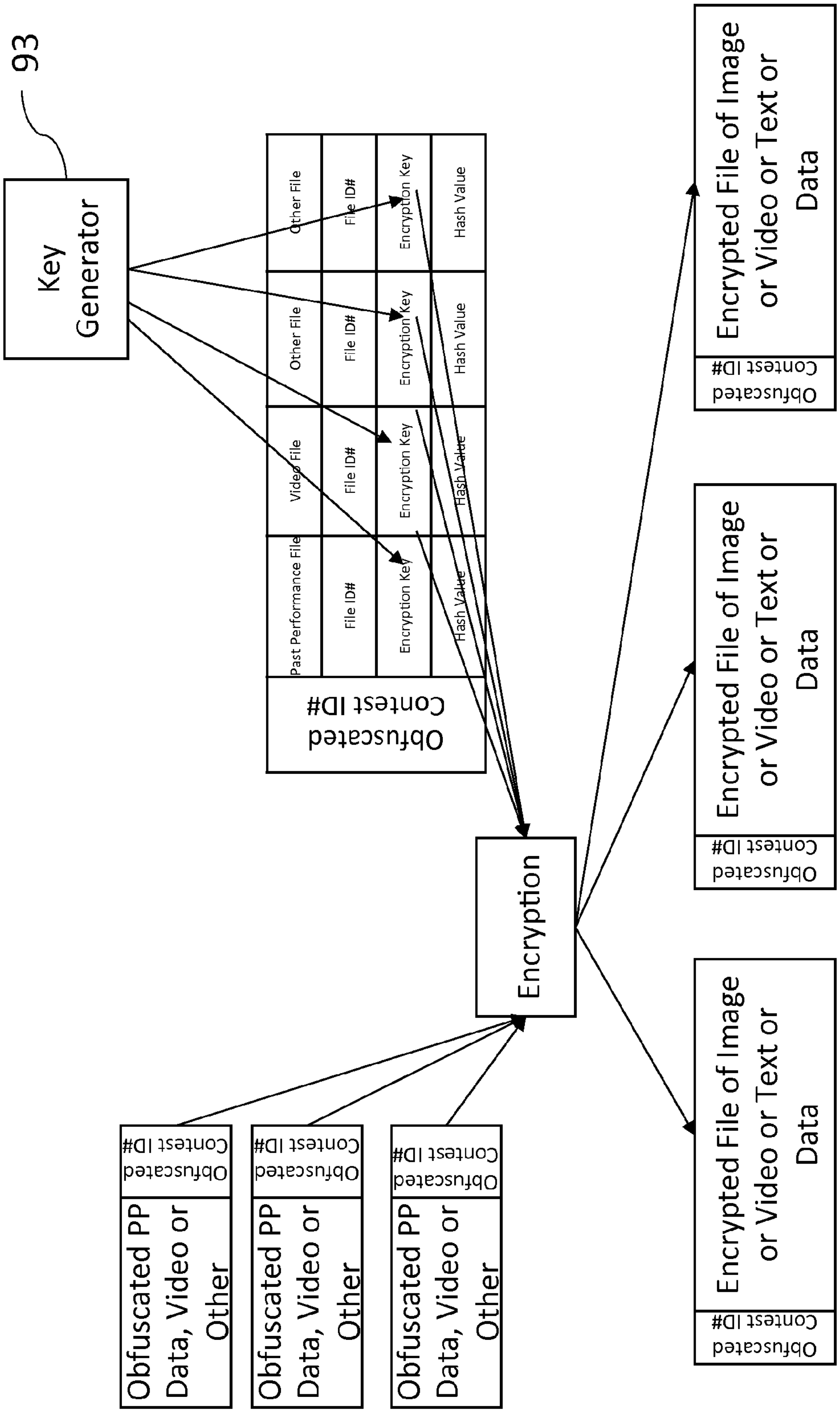
FIG. 7D is a block diagram illustrating the present invention's method of encrypting the obfuscated data elements using a unique key for each storage element and with the encrypted key then being stored within the enhanced contest data structure.
Figure 7E:
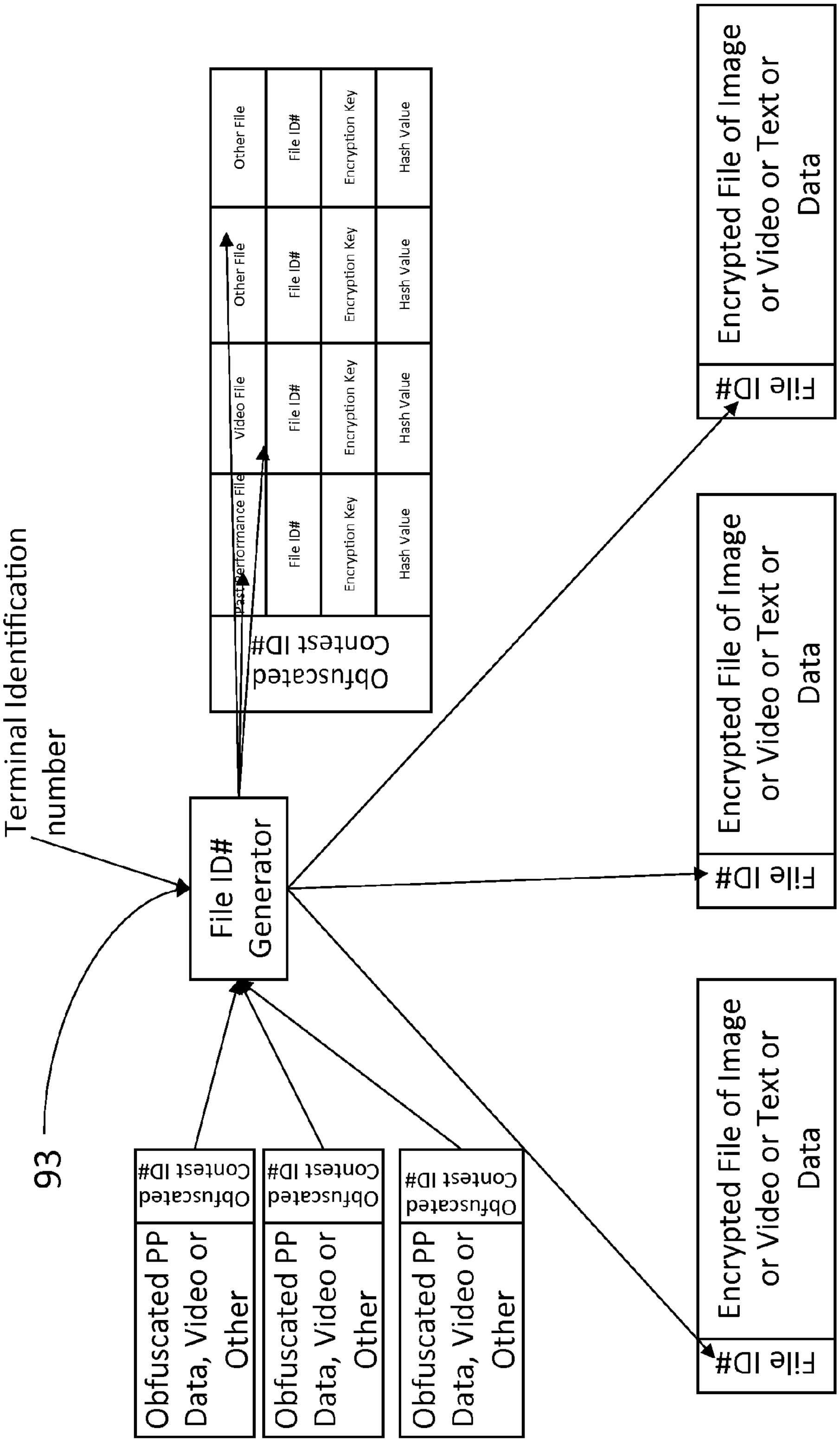
FIG. 7E is a block diagram illustrating the further securing the obfuscated contest identification number, once the enhanced contest data structure is placed on a particular terminal by creating a file access number that is unique to the terminal as a result of renaming each data storage element with the file identification number generator.

Each data storage element is then encrypted as is detailed in FIG. 7D where the obfuscated data elements are encrypted using a unique key 92 for each storage element and with the encrypted key then being stored within the enhanced contest data structure. Once the enhanced contest data structure is placed on a particular terminal, the obfuscated contest identification number is further secured by creating a file access number that is unique to the terminal, by renaming each data storage element with the file identification number generator 93 that uses the terminal identification number and the obfuscated contest identification number. See FIG. 7E.

Figure 7F:
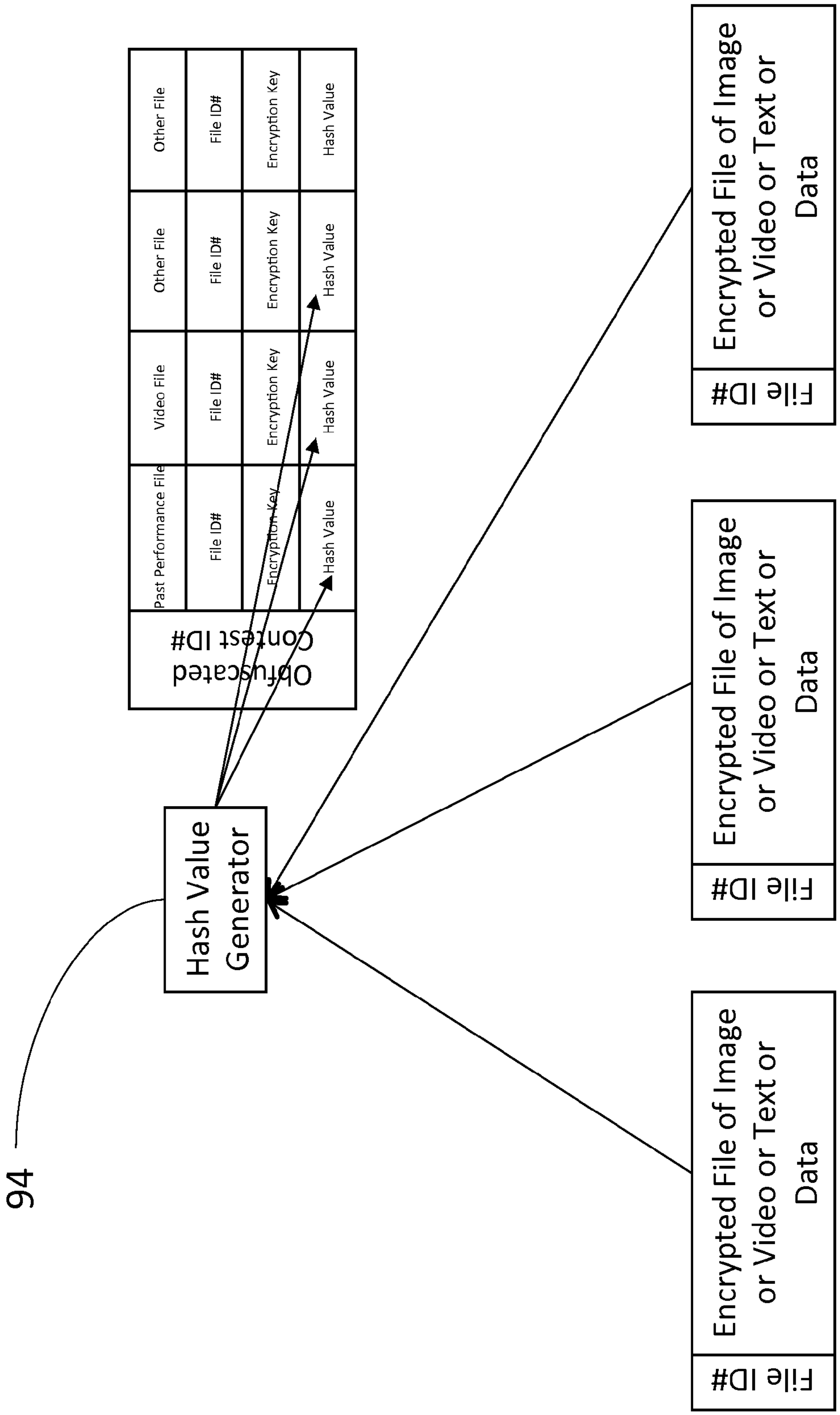
FIG. 7F is a block diagram illustrating the generation of a hash key for each of the data storage elements placed on each terminal by using a hash value generator to generate a hash value for each data storage element and placing it in the enhanced contest data structure.

The final step in creating the contest data cache is generating a hash key for each of the data storage elements placed on each terminal by using the process pictured in FIG. 7F. The hash value generator 94 generates a hash for each data storage element and places that hash value in the enhanced contest data structure.

The new parts of the totalisator's control software are added, in part, to allow it to enable wagering on new types of PROOFCs. Recall that we previously defined an "event" as a collection of PROOFCs that are placed in a predefined sequence with a number of associated pari-mutuel pools; wherein each of these "events" is associated with a particular facility or pari-mutuel licensee who is hosting the pools that will be formed on these PROOFCs. The enhancements to the totalisator's control software include the means for creating these new types of "events."

This involves writing its software so that it can accomplish the following additional tasks: (a) with the use of an especially configured user interface on a display screen that enables one to use a database of PROOFCs to assemble a sequence of contests and pools into an event, selecting the PROOFCs, each with a given number of participants or contestants and established race conditions, from a given number of races conducted at various facilities that will be included in the sequence, (b) storing the pertinent information for the selected PROOFCs, (c) is sequencing the PROOFCs with the use of specialized contest sequence software (which, in an expanded version, includes the ability to simulate or mathematically model the wagering performance of a proposed "event" to ensure that its sequence of contests will yield an experience for a player that provides enough excitement (i.e., variability in results) and financial return on the player's wagers so that the player is likely to be a repeating player of the present invention's improved form of pari-mutuel wagering), and (d) establishing the wagering pools that will be offered on each of the contests to form an "event."

The above process differs greatly in required level of human interactions as compared to that required yet-to-be-run contests (YTBRCs), where:

for PROOFCs: only one human interaction over the life of an "event"—its sequence can be set and reused time and again or added to or subtracted from as one sees fit on an as-needed basis—one creating a sequence can focus only on the desires of the users of the wagering system—one can select the contests: with a given number of participants, from a given number of facilities, and from a given number of race conditions, and then select the wagering pools that will be offered on each of the contests to form an "event;"

for YTBRCs: continued interactions thorough-out and leading up to a race day as the conditions (e.g., length of race, etc.) for a proposed race are posted and contestants sign up to compete—if a sufficient number of contestants sign up, the race is set and then grouped with other such "set" races to create an "event"—one creating the proposed race conditions and the eventual grouping of "set" races needs to balance the desires of the players or users of the wagering system with the desires of the contestants who will compete in the "event."

The present invention's required task of creating an "event" of sequenced PROOFCs is made easier by the inclusion in the totalisator's new control software of the provision for a user interface that enables one (e.g., an employee of a pari-mutuel wagering enterprise) to use a database of PROOFCs to assemble and then simulate or mathematically model the wagering experience of such an assemblage of PROOFCs (i.e., an "event"). Meanwhile, the wagering in the present invention is uniquely configured to allow the wagers on these PROOFCs to involve many different types of mandatory and optional bets (e.g., win, exacts, show, trifecta) and can include more than one contest in a wager (e.g., a 'Pick2" bet). The actual process of placing a wager we refer to as a "round of wagering" (i.e., the action of a player pushing the "Bet" key on his/her terminal screen).

The purpose of this simulation is to assess the predicted financial outcomes using a proposed "event" in order to determine if it is a viable "event" that should be okayed for use in the system. This effective mathematical modeling of the average player's or user's expected or predicted wagering experience during a proposed "event" and the financial stability of the event's pari-mutuel pool is a critical step in determining if the proposed "event" will provide an acceptable experience for its players and the one conducing the wagering (note: for PROOFCs, the pace of contest wagering is significantly faster that for YTBRCs which can cause errors in "event" construction to be exacerbated to the point of sometimes having devastating financial implications to the entity or enterprise conducting the wagering).

By pressing, in FIG. 8A, this interface's facilities key 95, a facilities selection screen is presented and one can begin to select the racing facility and contests' conditions (e.g., # of contestants, distance of race, surface for the race, class of the race (e.g., a grade 1-3 race where the horses are more likely to run true to form than in a claiming or allowance race)) one wishes to draw upon to create an "event" and also edit a handicapping modifier for each of the conditions presented, see FIG. 8B.

The task of creating an "event" also entails identifying and selecting the types of pools to be formed on the contests in an "event," and the minimum payouts for a winning wager. As is well known in the industry, these payouts are impacted by regulatory oversight and by the "take out" from the pool, where "take out," from the player's perspective, is the portion of a wager that is not entered into the pool for calculating pay outs, but is a fee paid by the player to the pari-mutuel licensee or operator in order to participate in the pool. A pool funding rate or "pool fund" is also determined and subtracted from the pool, but differs from the "take out" in that all monies in the "pool fund" will eventually be repaid to the users of the system through pay out calculations.

For the purposes of creating an "event," we assume that the key factor is impacting a player's enjoyment of PROOFC wagering is the level of excitement (which depends in large part on the variability of the results) realized by the player for the cost or value of the play (i.e., the amount that the average player eventually pays in terms of his/her lost wagers for being able to participate in PROOFC wagering for a defined period of time). We try to measure and quantify this by formulating parameters that can be used to evaluate any proposed "events" that we create before putting them into service.

In creating "events," we also need to be aware of the financial viability of a proposed "event" from the perspective of the pari-mutuel licensee or operator who is to conduct the "event." To measure this, we use the financial stability of the "event's" funding pools over time.

FIG. 8C is a table that illustrates the type of information that is available (e.g., facility or venue of race, date of race, contest #, # of contestants, distance of race, surface for the race, class of the race, finishing positions of the individual contestants, BetMix's® handicap picks for the race) or can be developed (theoretical probability of winning one of the available wagers) for each of the contests that one might be considering using in an event that will have pools on the following four types of wagers: "win," "exacts," "show," and "trifecta." Of particular interest is the "probability of winning" information in the columns on the reader's far right side of this table.

There are many well-known formulas for computing such probabilities and all of these are considered to come within the scope of the present invention. The preferred embodiments for these probability formulas and the other parameters that we specifically formulated for the present invention, and used in the analysis shown below, are:

Theoretical Probability of Winning a Pool Formed on a Contest:

$$twp_{i,pool} = 1 \div \frac{((cb_i - pm_{pool}) \times hm_i)!}{om_{pool}! \times (((cb_i - pm_{pool}) \times hm_i) - r_{pool})!}$$

where i=is a particular contest within an event pool=is a pool formed on the event $cb_i$=the number of contestants participating in contest "i,"

$r_{pool}$=the number of positions that a player must pick correctly to achieve a winning result for a pool, $pm_{pool}$=a probability modifier for certain pools that allows for the fact that a contestant can finish in more that one position and count as a winning wager (e.g., a show bet will pay if the contestants runs $1^{st}$, $2^{nd}$, or $3^{rd}$)

$hm_i$=a handicapping probability modifier for contest condition i, which theoretically reduces the number of participants by taking into account the ability of a knowledgeable handicapper to reduce the field size by eliminating contestants. This factor does not impact the probability of winning if a handicapping tool is used since the actual tool outputs can be used to model the event. This takes on a value of 0 through 1, with 0 representing a completely predictable contest and 1 being a contest based on the conditions under which the contest was run. The more true to form the contests run the easier the contest is to handicap and vice versa. It should be noted that each contest will have its own handicapping modifier that will be determined by the condition of the contest, and $om_j$=an order probability modifier for pool type "j" which is equal to the number of runners required to be selected correctly and the type of bet does not require the order of finish to be exact; as in a quinella, where the player wins if the two contestants he/she picks finish in the top 2 positions in either order. It is equal to 1 if the order matters; as in an exacta, where the player must pick which contestant comes first and which contestant comes second.

Thus, for contest #1 in the table of FIG. 8C, we see that our computed theoretical probabilities for winning the respective win, exacta, show and trifecta wagers are, respectfully, 20%, 5%, 25% and 2%. As will be seen below, these computed probabilities will be critical to our assessment of a proposed event—e.g., they help to determine how the balance of a player's money will change with each succeeding round of wagers.

Other probability formulas that we use in assessing the viability of any proposed event include:

Theoretical Probability of Winning a Pool Formed on an Event with Nc Contests:

$$\overline{twp_{pool}} = \frac{\sum_{i=1}^{nc} twp_{i,pool}}{nc}$$

where:

pool=a particular pool formed on the event i=the number of contestants in the contest nc=the number of contests in the event Theoretical Probability of Winning a Multi-Leg Pool in an Event:

$$twpmlp_i = (\overline{twp_{pool}})^i$$

where:

i=is a the number of legs in multi leg contest

Figure 8D:
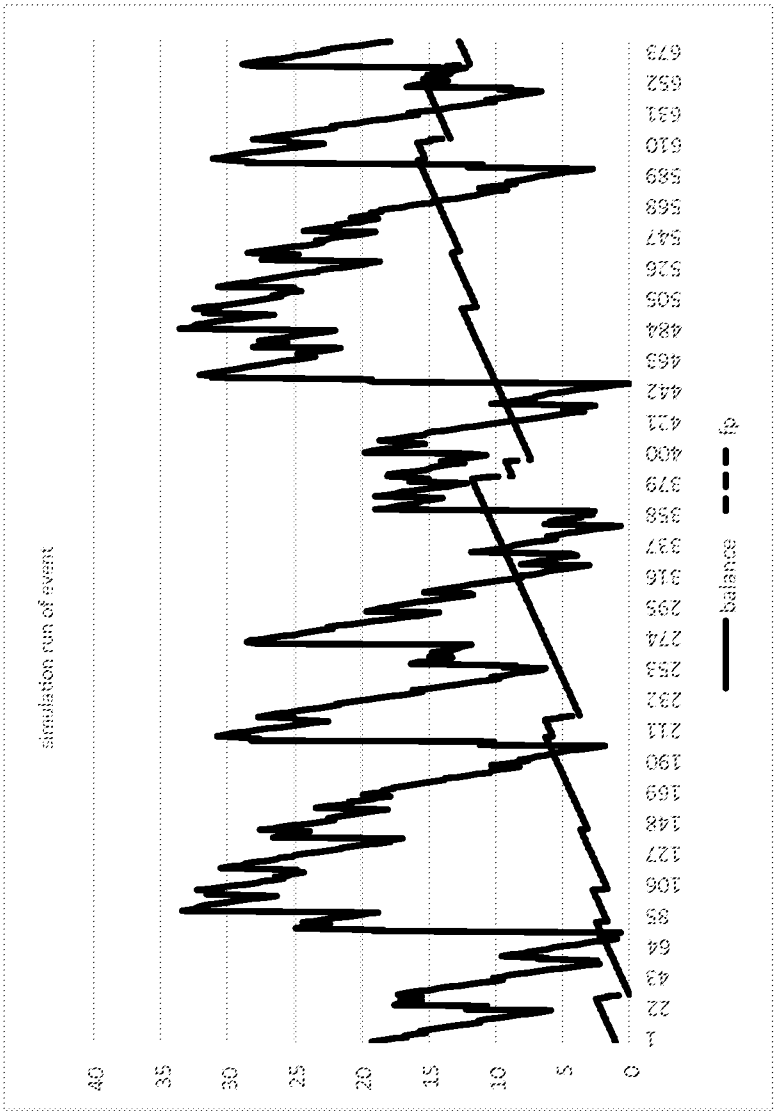
FIG. 8D is a graphical plot that shows, according to a simulation of a proposed "event" by the present invention, the changes that occur in the player's balance, B, and the amount of money in the event's funding pool, fp, after each successive round of wagering.

Theoretical Probability or Ease of Successfully Handicapping a Contest within an Event:

$$ew = \sum_{i=1}^{n} \overline{twp_i} + \sum_{j=2}^{m} twpmlp_j$$

where n=number of pools i=the average theoretical win probability of pool I for single leg pools m=the number of multi leg pools j=the number of legs in the multi leg pool FIG. 8D illustrates the output of our simulation of an event that uses 682 contests (of which the input data for the first 17 of which are shown in the table of FIG. 8C) and where one sees a plot of the changes that occur as a result of each round of wagering in the player's balance, B, and the amount of money in the event's funding pool, fp. FIGS. 8E-8F illustrate part of the spreadsheet calculations that represent the output of our simulation using the input data illustrated in FIG. 8C and whose results went into the drawing of FIG. 8D.

Many assumptions had to be made in formulating this event and its simulation. These include that the wagering pools formed on this proposed event were: win, show, exacta, trifecta, and pick 2. A "coin" is defined herein as a grouping of pools into which the terminal distributes a given portion of the balance on the terminal. Based on the number of coins selected, the user will need to select the order of finish for betting interests in one or more contests. The pools were grouped into three coins of a $0.30 value as follows, the first coin being a "win" wager ($0.18) and an "exacta" wager ($0.12), the second coin being a "show" wager ($0.10) and a "trifecta" wager ($0.20), and the third coin being a "pick 2" ($0.30). It should be noted that as there is a "pick 2" wager in each round, two contests will have to be utilized in each wagering round.

For the purpose of this example, the funding pool rate, r, is set to $(0.01) per pool wagered. The "takeout" was set to $0.00 as the take out doesn't really impact the playability or variability of the event (only the financial return to the venue conducting the event and is determined, in part, by the local regulators). The minimum payouts, l, for each of the pools was set as follows: "w"=$0.25, "exacta"=$0.40, "show"=$0.12, "trifecta"=$1.00, and "pick 2"=$2.00. The coins played per round, COW, was set to 3, so that a wager would be placed on all the pools in every round of the simulation. The initial funding pool, $Fp_o$, was set at $1.00, and the player's balance, $B_o$, was initially set to $20.00.

From FIG. 8D, it can be seen that there is a sufficient variation or variability in the player's balance (e.g., it jumps from $5.86 to $12.21 as a result of contest #23; see FIG. 8F) to generate an enjoyable play experience, and that the funding pool is building continually (i.e., it rises uniformly from $1.00 to $2.45 between contests #1 and #29). From the perspective of one who's trying to select the best contests to be used in an "event," this later result might suggest that this proposed event's funding pool rate could possibly be reduced. Ideally, the variation over time or the drift in amount of the funding pool should be approximately zero or just slightly positive because eventually all of this funding pool money needs to be returned to the player.

However, notice what happens in contest #30, the player wins his/her "win" and "pick 2" wagers and thus takes the "win" and "pick 2" pools that currently stand at $0.43 and $1.16 (note: this low amount is due to the fact that such a wager was previously won in contest #26 and thus depleted the pool), respectively. There being insufficient funds in the "pick 2" pool to pay the minimum payout of $2.00, money from the funding pool has to be used to make up the balance—the first time that the funding pool balance has actually decreased in value, as can be seen in FIG. 8D.

The equations that were used by the present invention's simulation to compute the various parameters that are used herein to assess and measure the predicted performance of a proposed event include the following:

Balance of Money in a Player's Account After Wagering in the ith Round of an Event:

$$B_i = B_{i-1} - \sum_{j=1}^{m} b_{ij} + \sum_{j=1}^{m} w_{ij}$$

where:

i=a round of wagering in a simulation run j=a pool formed on the event n=number of wagering rounds within a simulation run m=number of pools being formed on the event $b_{ij}$=amount bet in round ion pool j $w_{ij}$=winning money from round i placed in pool j Amount of Money Available in the Funding Pool After a Wagering Round:

$$fpd = fp_1 - fp_0$$

where:

$$fp_1 = fp_0 - \sum_{i=0}^{n} \sum_{j=0}^{m} (b_{ij} \times (1 - (t_j + r_j)) - w_{ij}) + \sum_{i=0}^{n} \sum_{j=0}^{m} b_{ij} \times r_j$$

$fp_0$=opening balance of the funding pool i=a round of wagering in a simulation run j=a pool formed on the event n=number of wagering rounds within a simulation run m=number of pools being formed on the event $b_{ij}$=amount bet in round i on pool j $t_j$=takeout on pool j $r_j$=funding pool contribution rate for pool j Amount of Money Won in Round i from Pool j:

$$w_{ij} = \begin{cases} 0, f(c_1, \ldots c_k) = 0 \\ l_j, f(j, c_1, \ldots c_k) = 1 \wedge p_{ij} < l_j \\ p_{ij}, f(j, c_1, \ldots c_k) = 1 \wedge p_{ij} \geq l_j \end{cases}$$

where:

i=a round of wagering in a simulation run j=a pool formed on the event l=minimum payment made on a successful wager on pool j $f(j, c_1, \ldots c_k)$=the binary result of winning or losing a bet for pool j with users' choices of $c_1$ through $c_k$ with the success algorithm as outlined by the governing body of the contest based on the pool into which the wager was played Amount of Money in the "Net Pool" for a Wager of Type j in Round i $$p_{ij} = p_{i-1j} + (b_{ij} \times (1 - (t_j + r_j)))$$

where:

$b_{ij}$=amount bet in round ion pool j $t_j$=takeout on pool j $r_j$=funding pool contribution rate for pool j Average Number of Rounds Before a Player's Balance Goes to Zero:

$$\overline{rtz} = \frac{\sum_{i=0}^{k} rtz_i}{k}$$

where:

rtz=the number of rounds before a balance of zero is reached for a cycle i within the simulation run k=the number of cycles of wagering from a set balance to zero within a simulation round Average Payout Variability:

$$\overline{pv} = \frac{\sum_{i=0}^{n} \sum_{j=0}^{m} |(w_{ij} - b_{ij} \times (1 - (t_j + r_j)))|}{n}$$

where:

i=a round of wagering in a simulation run j=a pool formed on the event n=number of wagering rounds within a simulation run m=number of pools being formed on the event $b_{ij}$=amount bet in round ion pool j $t_j$=takeout on pool j $r_j$=funding pool contribution rate for pool j $w_{ij}$=winning money from round i place in pool j Number of Wins Per Round:

$$wo_{ij} = \begin{Bmatrix} 0, f(c_1, \ldots c_k) = 0 \\ 1, f(j, c_1, \ldots c_k) = 1 \end{Bmatrix}$$

Where:

i=round of wagering j=pool $f(j, c_1, \ldots c_k)$=the binary result of winning or losing a bet for pool j with users' choices of $c_1$ through $c_k$ with the success algorithm as outlined by the governing body of the contest based on the pool wagered into Average Number of Wins Per Round:

$$\overline{wo} = \frac{\sum_{i=0}^{n} \sum_{j=0}^{m} wo_{ij}}{n}$$

Where:

k=a cycle with within a simulation run i=round of wagering within a cycle j=pool n=number of wagering rounds m=number of pools being formed on the event Average Number of Rounds Between Wins:

$$\overline{rbw} = \frac{\sum_{i=0}^{n} rbw_i}{n}$$

where:

rbw=an observation of the count of the number of rounds between winning wagers i=a single observation of rounds between winning wagers within a simulation run n=the number of rounds with at least one winning wager Additionally, we define the following parameters that we also use to assess the simulation of a proposed event in terms of its playability:

$\overline{rtz}$—the average number of rounds required to move from a given, initial balance to a balance of zero, wpr—the average number of wagers won per round, i.e., the "jolt,"

rbw—the average number of rounds between winning wagers, i.e., the "distance."

Returning to our examination of the results for our simulation of the proposed event (for which some of its representative input data is shown in FIG. 8C) for which we've shown some of its output results in FIGS. 8D-8F, it can be seen the average of the number of rounds played before the player's balance goes to zero, rtz, is 253, which, assuming that a player plays on average approximately 10 rounds per minute, equates to approximately 25 minutes of playing time. If the targeted duration of the typical event is about 20 minutes for a balance of $20.00, the results of this simulation suggest that some of the contests that went into the event could have been selected so that they had a greater handicapping difficulty. Assuming three $0.30 wagers per round, the preferred embodiments of this present invention would like to the contests selected to go into their "events" so that the absolute value of the monetary change in a player's balance, |ΔB/round|, is in the range of $0.05-$0.20/round wagered at the $0.90 level. If one is wagering at the level of $0.30/round, |ΔB/round| is in the range of $0.02-$0.07/round. Alternatively, we can say that for preferred embodiments of the present invention that the absolute value of the monetary change in a player's balance, |ΔB/round|, for a round wagered at the level of $X is in the range of 6%-25% of X per round wagered.

The average variability of the payout, $\overline{pv}$, was $1.18 on a wager of $0.90, which gives a good "ride," as the swing in the balance is not too much, but is noticeable. For preferred embodiments of the present invention, one would like to select the contests that go into its "events" so that the average variability of the payout, $\overline{pv}$, is in the range of 50%-200% of $X per round, where X is the average amount being wagered per round.

The wins per round, wpr, is 1.49 which is showing a good "jolt" of winning money because the player is winning on more than one pool per winning round of 5 pools. Preferred values for this parameter are in the range of 0.2-0.4/(the average # of pools wagered upon per round). The number of rounds between wins or the "distance," rbw, is 0.69, which means that the frequency with which a player is winning is more than once a round on the assumed 5 wagers that the player is making per round. This "distance" could be increased by substituting other contests, that would pose for a player a greater handicapping difficulty, for some of the selected contests that are presently in the proposed event, Our simulation results also show that the theoretical ease of handicapping, ew, for this proposed event is 57%, which implies that a player can expect to achieve at least one winning wager in a round 57% of the time. This result could also be interpreted as suggesting that this proposed event could be improved upon by substituting, for some of the selected contests in the proposed event, other contests that would pose for a player a greater handicapping difficulty.

Finally, in our discussion of such simulations of proposed events, shown in FIG. 8G is a table that displays, for our simulation of the proposed "event" discussed above, the outcome of our calculations for the theoretical probabilities of successfully picking a winner in each of the five types of wagers that are being made on the various contests that are differentiated based on the number of contestants in each of the contests. This data clearly shows that one means of making a player's handicapping task more difficult would be to select contests for an "event" that have a greater number of contestants.

Once satisfied that a planned "event" will perform in a financially satisfactory manner, one selects the generate function key 96 of the interface shown in FIG. 8A to populate the enhanced contest information data structure which will form the "event," along with all relevant data required that is used by the totalisator.

The present invention's new totalisator control software is also configured to cause the storing of contest information that includes: (1) an electronic image of the past performance data that was available to a system user on the day the contest was run and presented in a manner that obfuscates the identities of the participants and the order of finish while preserving the ability of a user of this information to handicap the order of finish, (2) a video of the contest if one exists, (3) the results of the contest in a secure an unalterable format, and (4) a sequence number with a flag or other identifying indicia that will trigger a re-sequencing of the contests associated with a particular "event" or facility.

Additionally, the totalisator control software handles the ordering of presentation of PROOFCs in a unique manner. Its presentation order results from assigning a random number to each of the PROOFCs and then sorting them from largest to smallest. These random numbers are obtained from a list of previously generated and verified random numbers that are stored as part of the totalisator's control software. This list of random numbers may be added to everyday to ensure that a sufficient number of random numbers are available to sequence all the PROOFCS for all of the "events" that can be created by the present invention. The random numbers added to the list are generated by any number of industry-standard, tested and verified, 3rd party hardware-based, random number generators.

Once a list of contests is placed in order of presentation, a further random number, "x," between 1 and "n" is generated from the totalisator system, where "n" is the number of contests associated with the "event." The contest whose position from the top of the list equals the generated random number "x" is selected to be the race in the event that will trigger a re-order of the sequence of the contests in the "event."

Figure 9:
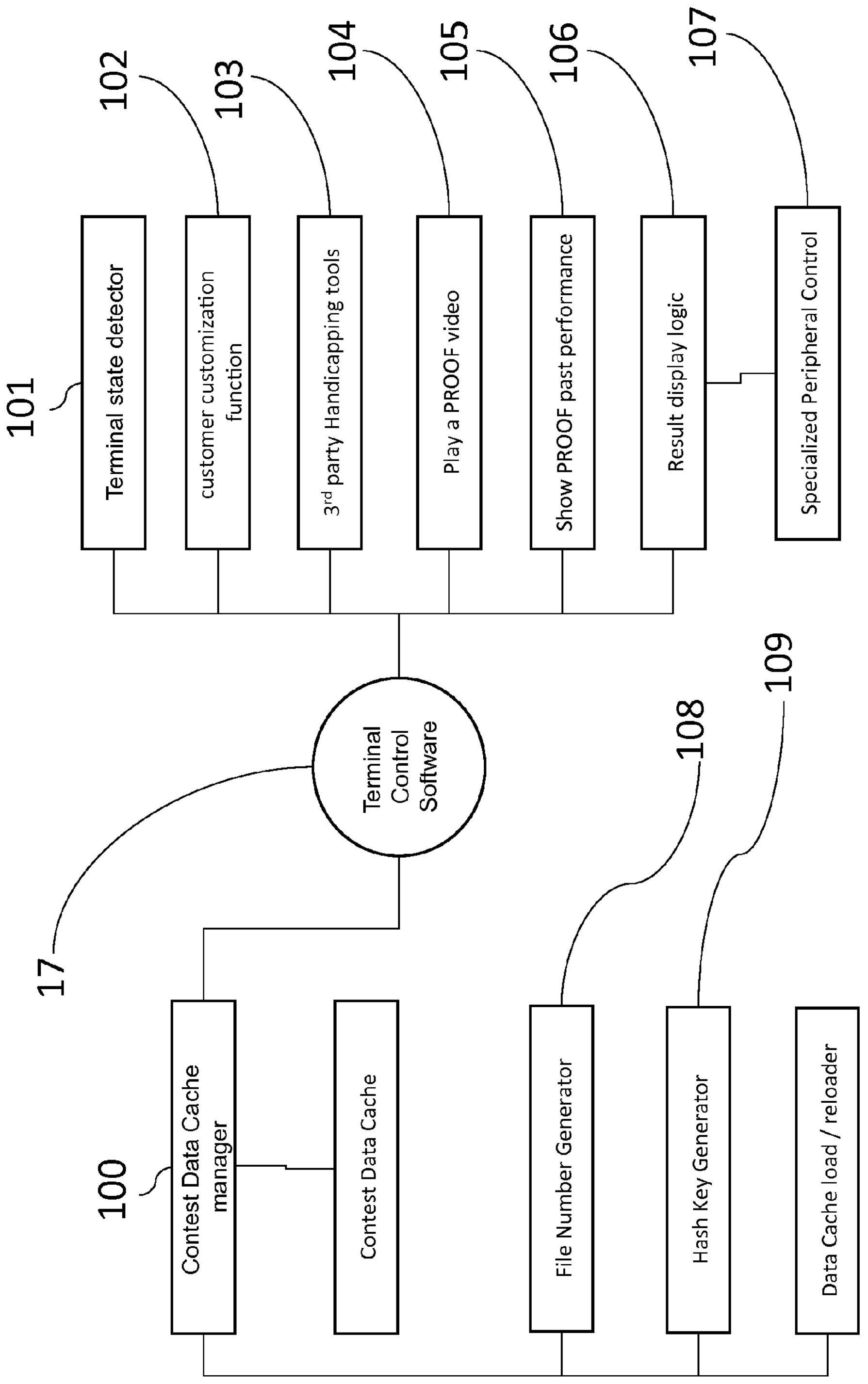
FIG. 9 is a block diagram illustrating the general architecture of the terminal control software of the present invention.

The terminal control software 17 of the present invention is an enhancement of the control software currently used in various pari-mutuel, wagering terminals. FIG. 9 shows a block diagram that generally illustrates the architecture of this software. It is seen to consist of contest data cache manager 100, a terminal state detector 101 that determines if the terminal is a teller terminal or self-service terminal, a means for customer or user customization 102, a third party handicapping tool 103, a means 104 to play a PROOFC video that is stored within the contest data cache, a means to show the PROOF past performance information 105 that is stored in the contest data cache and the programming code for the display logic 106 which allow for the operation of the specialized peripheral control elements 107 of the present invention.

The contest data cache manager has a file number generator 108 that uses an algorithm to generate a file number by which the file is accessed that is unique to the physical terminal the file is on, a hash key generator 109 that is used to generate the initial hash key for the file and to check the file upon each use by regenerating the hash key and comparing to the initial value, and a data cache load and reloader function that is used to load the data cache initially from the totalisator 10 and to reload any files that have a hash key mismatch.

The data cache manager 100 communicates through the network with the data cache manager of the totalisator's control software. The data cache manager of the totalisator's control software coordinates the use of contests on each and every terminal accessing a particular "event" such that every terminal accessing a particular "event" is coordinated as to which contest is to be presented next to the users or players wishing to wager on a particular "event." This is accomplished by broadcasting to a requesting terminal the obfuscated event "identification" that is to be presented to the user at the terminal.

When the presentation re-ordering contest is triggered, the data cache manager of the totalisator control software retrieves a sufficient number of random numbers for a particular "event." The data cache manager executes a reorder procedure and communicates its actions with the data cache managers for each terminal to ensure all terminals are synchronized with respect to the contests of a particular "event" being accessed by the customer at a terminal.

Further, the data cache manager regularly checks with the totalisator control software data cache manager as to the fidelity of the "event(s)" stored in the terminal contest data cache by validating that a calculated hash key of a file being accessed matches the hash key stored with the event in the enhanced contest data structure stored in the data cache. If the fidelity of the "event(s)" is compromised, the terminal data cache will communicate the compromise to the totalisator control software and the totalisator data cache manager will take corrective action to resolve the fidelity issue of the offending contest data cache by instructing the terminal data cache manager to take one or more corrective actions, including, but not limited to, taking the terminal out of service, no longer allowing access to the offending "event," reloading the "event" from correct copy of the "event" and/or deleting the contest in question.

Figure 10:
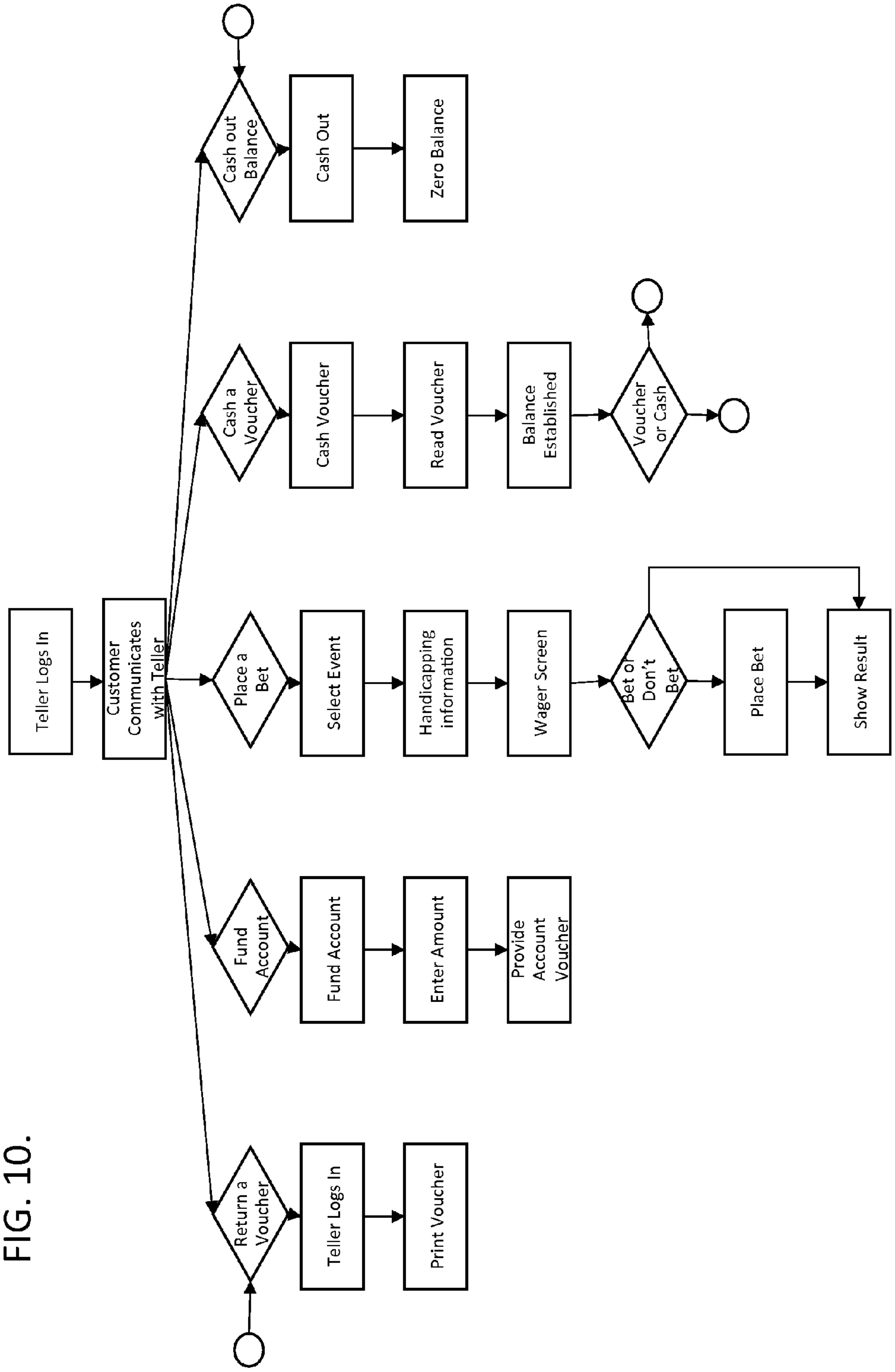
FIG. 10 is a block diagram that provides an overview of the flow of the process steps and communications that are seen on a teller's computer screen according to a preferred embodiment of the present invention.
Figure 11:
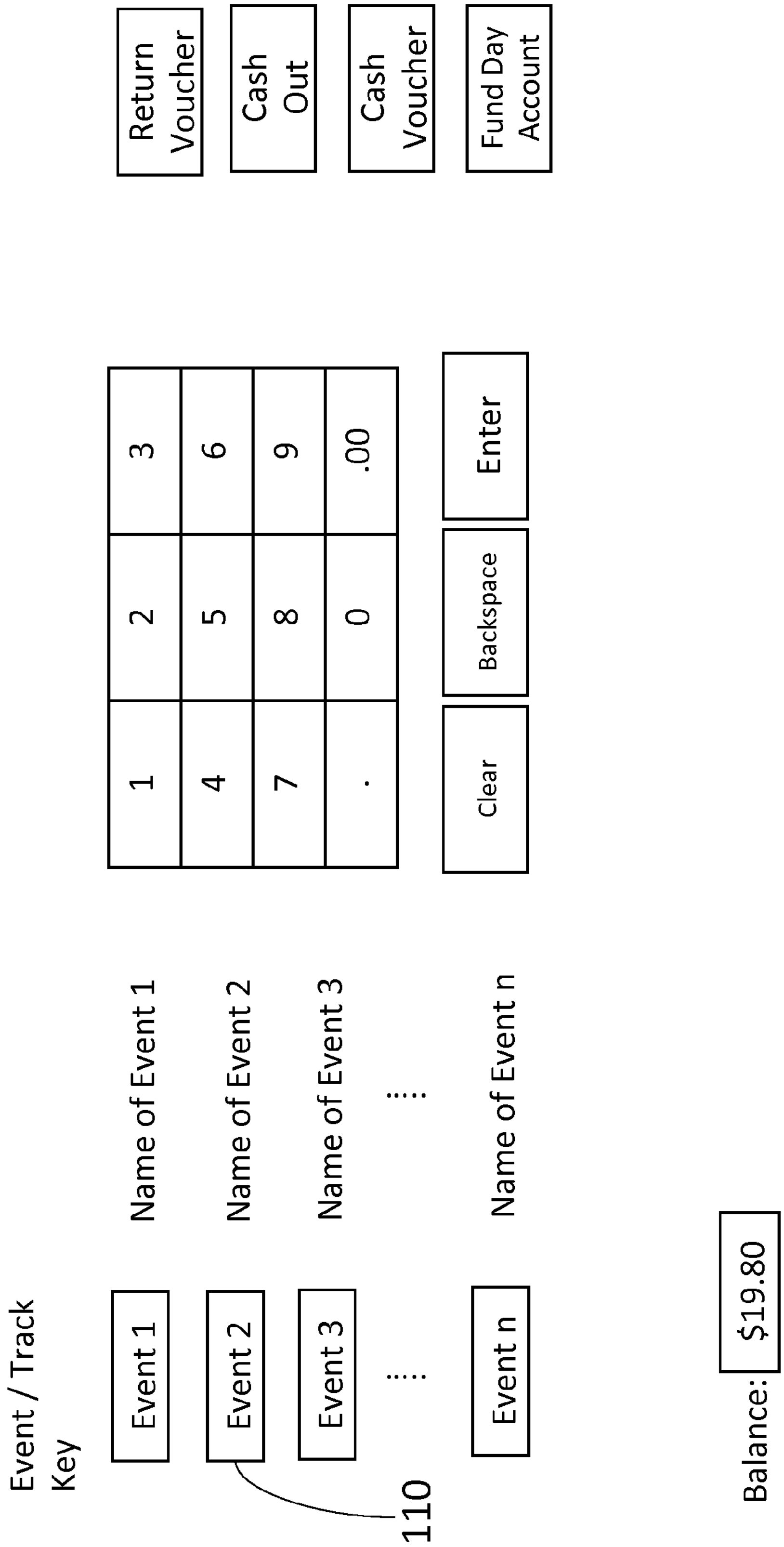
FIG. 11 is a schematic representation of the first screenshot that a teller is presented upon logging into a totalisator that has been modified according to the present invention.

FIG. 10 provides a block diagram of an overview of the flow of the process steps and communications that are seen on a teller's computer screen according to a preferred embodiment of the present invention. A user approaches the teller that is offering wagers according to the present invention and asks to place a wager on the next "previously run" contest from a stated event. The teller is presented with a teller interface, see FIG. 11, once the teller has successfully logged onto the terminal. The teller selects the event 110 through the teller's keypad. The terminal communicates to the totalisator system that retrieves the next contest data structure from the appropriate "event" from the contest data cache for the appropriate number of contests.

Figure 13:
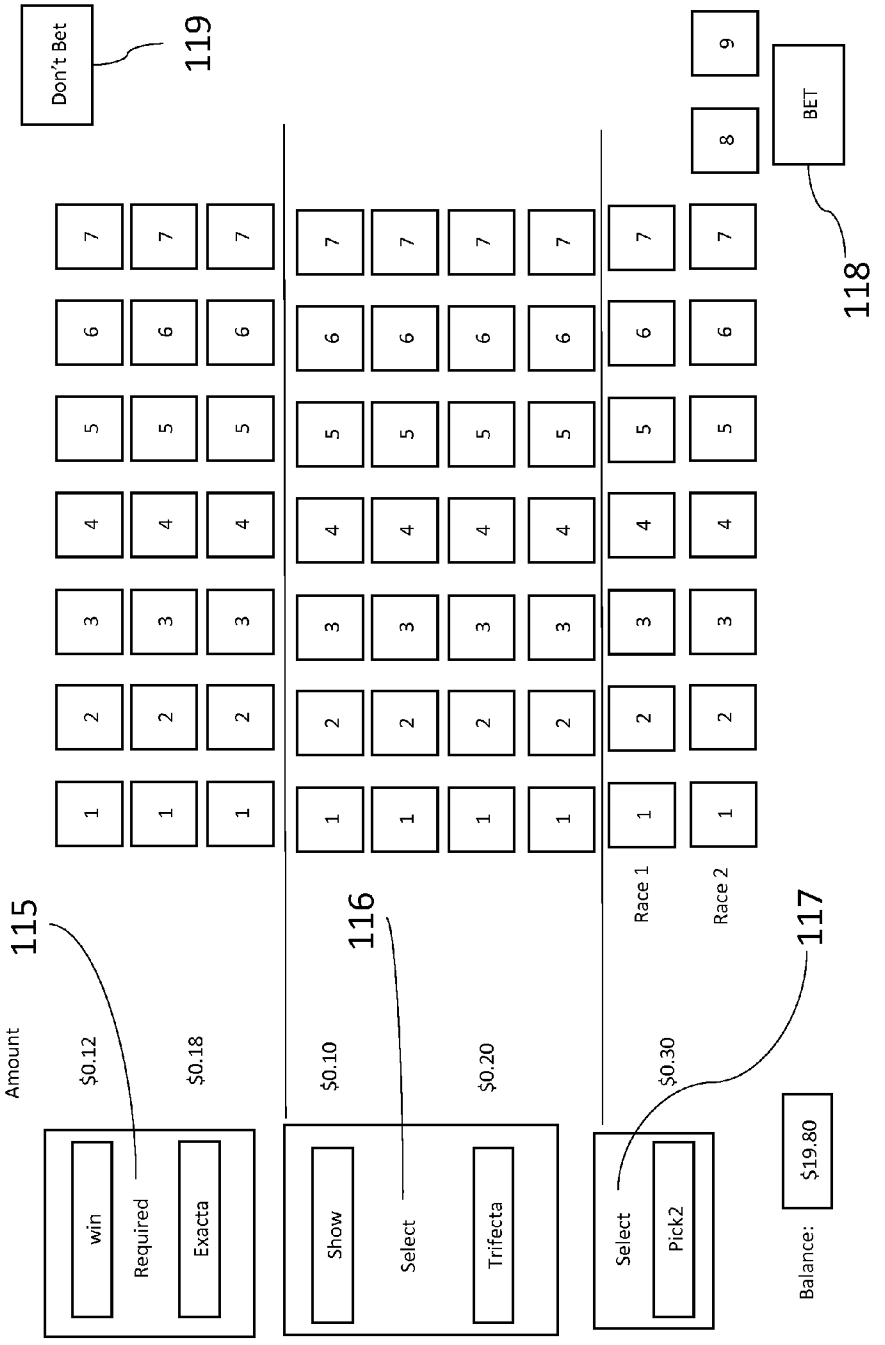
FIG. 13 is a schematic representation of the wagering interface that is seen on a terminal screen according to a preferred embodiment of the present invention, and wherein there are mandatory wagers of "win" and "exacta," along with some optional wagers.

The terminal then displays the past performance information on a screen available to the user; see FIG. 12. Next, the teller is presented with a wagering interface, a schematic representation of which is shown in FIG. 13. Once a user has viewed the handicapping information, the user instructs the teller as to the number of wagers he/she wishes to make, the order he/she thinks the contestants or "betting interests" will finish, and the teller enters the wager.

The control software of the present invention is further modified so as to make the present invention differ from "instant-racing" by allowing the user to determine if one wishes to participate in optional pools upon which one can wager, rather than having the pools predetermined in their entirety for the user (i.e., a terminal-specified, pari-mutuel pool).

The user must make a selection on the mandatory wagers for that contest. In the example in FIG. 13, the mandatory wagers are "win" and "exacta" with $0.12 going into the "win" pool and $0.18 going into the "exacta" pool 115. The user must provide the betting interest that will win and the betting interest that will come in second in this example. The total bet will be $0.30.

If the user wishes to wager more, the user can choose from optional wagers. In this example, the user can wager on the "show" and "trifecta" combination 116 for another $0.30, with $0.10 going into the "show" and $0.20 going into the "trifecta" and/or the user can wager into the "pick 2," commonly known as the "daily double," 117 which requires the user to correctly select the winning betting interest in two consecutive races. In the example, the player or user can wager $0.30 into the "pick 2" which is his/her wager from the prior race in the "win" and "exacta" pool and a subsequent race, which, in this example, will have 9, rather than 7, runners. If the user chooses to wager on the "pick 2," a second past performance image is displayed on the screen available to the user to view.

The ability to wager on multiple races simultaneously is a further enhancement over "instant racing" due, in part, to the configuration of the totalisator's control software 11 which provides a sequence of contests in an "event" which is stored in a fixed order of presentation to the user. Once the user has communicated his or her wagers to the teller, the teller presses the "bet" key 118. If the user has decided not to bet on the races presented, the teller presses the "don't bet" key 119.

This "wager on multiple races simultaneously" enhancement is achieved by combining multiple contests together into a single play, and without resorting to "instant racing's" super exotic, pari-mutuel wagers that rely on a random determination of its winners (see: ARCI-004-155: Proprietary Wagers, Sections: A(1), A(3) and A(4)). The benefit of this to everyone involved in pari-mutuel wagering (i.e., the player, the pari-mutuel licensee conducting the wagering and the regulatory body(s) responsible for the legal implementation of wagering) is the simplification of the underlying wagers by using ubiquitous wagering pools that make the wagering mechanisms of PROOFC wagers readily apparent and more understandable. See FIGS. 8E-8F.

This increased understanding of the present invention's wagering mechanisms eliminates the need for concerns that are similar to those associated with "instant racing's" perceived "random outcome" approach to PROOFC wagering, which some believe appears to be a purely random outcome result akin to a slot machine. The difficulty in determining this distinction of pari-mutuel wagering on a PROOFC versus a slot machine is a notable and repeated criticism of "instant racing."

The present invention is seen to overcome such problems because the control software modifications made herein assure that this improved method of wagering is conducted such that: whether a player's selection, of a specific contestant as part of a given type of wager on a selected PROOFC, is determined to be a winner actually depends on the finishing place of the specific contestant in the selected PROOFC and the nature of the given type of wager. See FIGS. 8E-8F. The only random element of the present invention is the sequencing of the selected collection of contests that make up the "events" upon which a player's wagers are placed.

Figure 14:
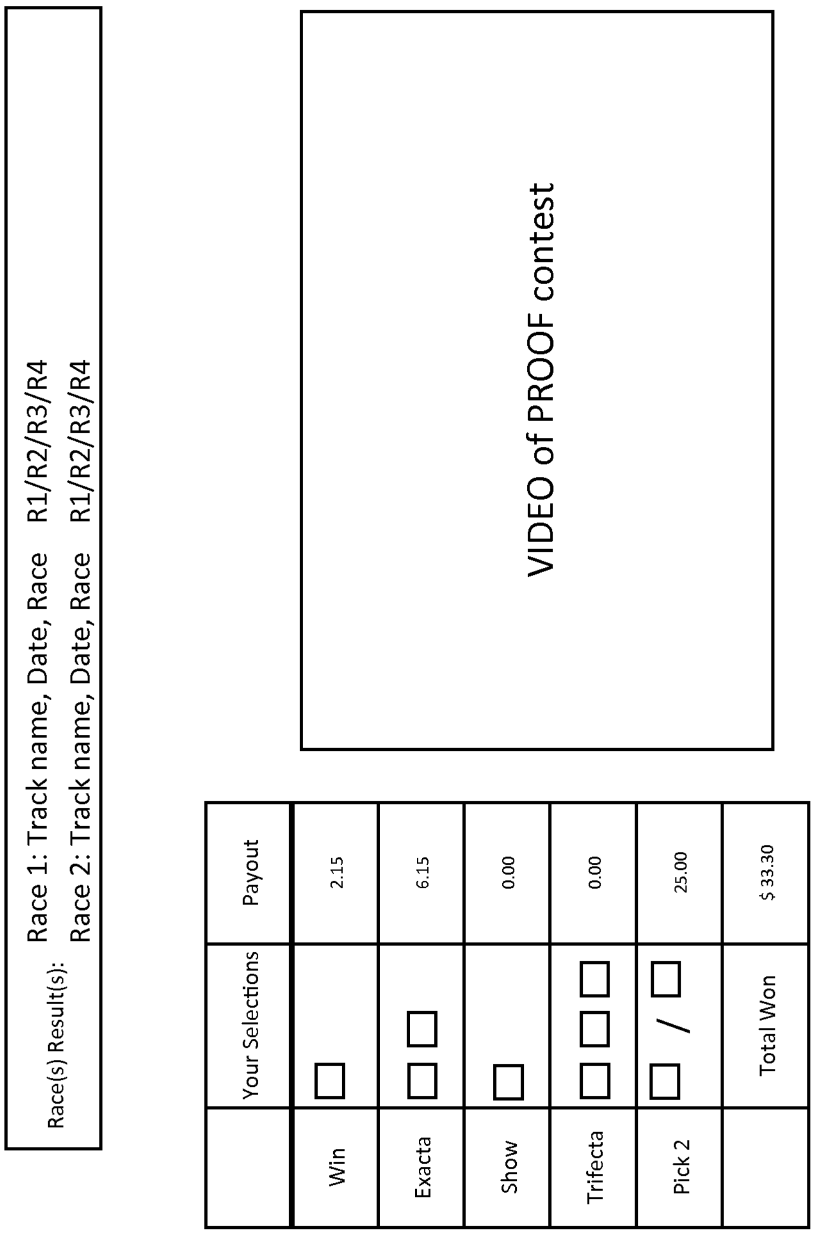
FIG. 14 is a schematic representation of the "results" interface that is seen on a player's game terminal screen according to a preferred embodiment of the present invention, and which displays the full race video and the payoff to the player.

The system of the present invention tracks all the wagers sent by the terminal with a ticket serial number for each individual wager. Each wager is processed by the totalisator and, if successfully added to the pool, is assigned a ticket serial number which is a combination of pool and runner selections. The totalisator will then close the pools, and price the pools. Next, the totalisator determines if any or all of the tickets are winners, and cashes the tickets and sends the results of the tickets back to the terminal for display to the user and to the teller, see FIG. 14, including a video of the race finish. The user can then instruct the teller to pay out the winning amount in cash, produce a voucher, or use the winnings to place a wager on the next PROOFC.

If any of the pools were not paid out, then the totalisator will apply the rules configured for the pool to either carry-over or distribute the pool, as shown in FIGS. 8E-8F. The race results images will remain on the screen for a specifiable period of time. Once the time period has expired, the user viewable screen is reset to a static image and the teller screen returns to a traditional wagering interface, FIG. 13.

If the user does not wish to use a teller to wager on PROOFCs, the user has the choice to use a self-service terminal, see FIG. 4. The addition of the Universal Switch, Security & Matrix controller and the Universal Illumination Control to this terminal are an improvement over the current "instant racing" self-service terminal in that it has customized circuit boards that were created to allow for the integration of the additional button panels, lighting, solenoids and electromechanical motors into the enhanced self-service terminal of the present invention.

Figure 15:
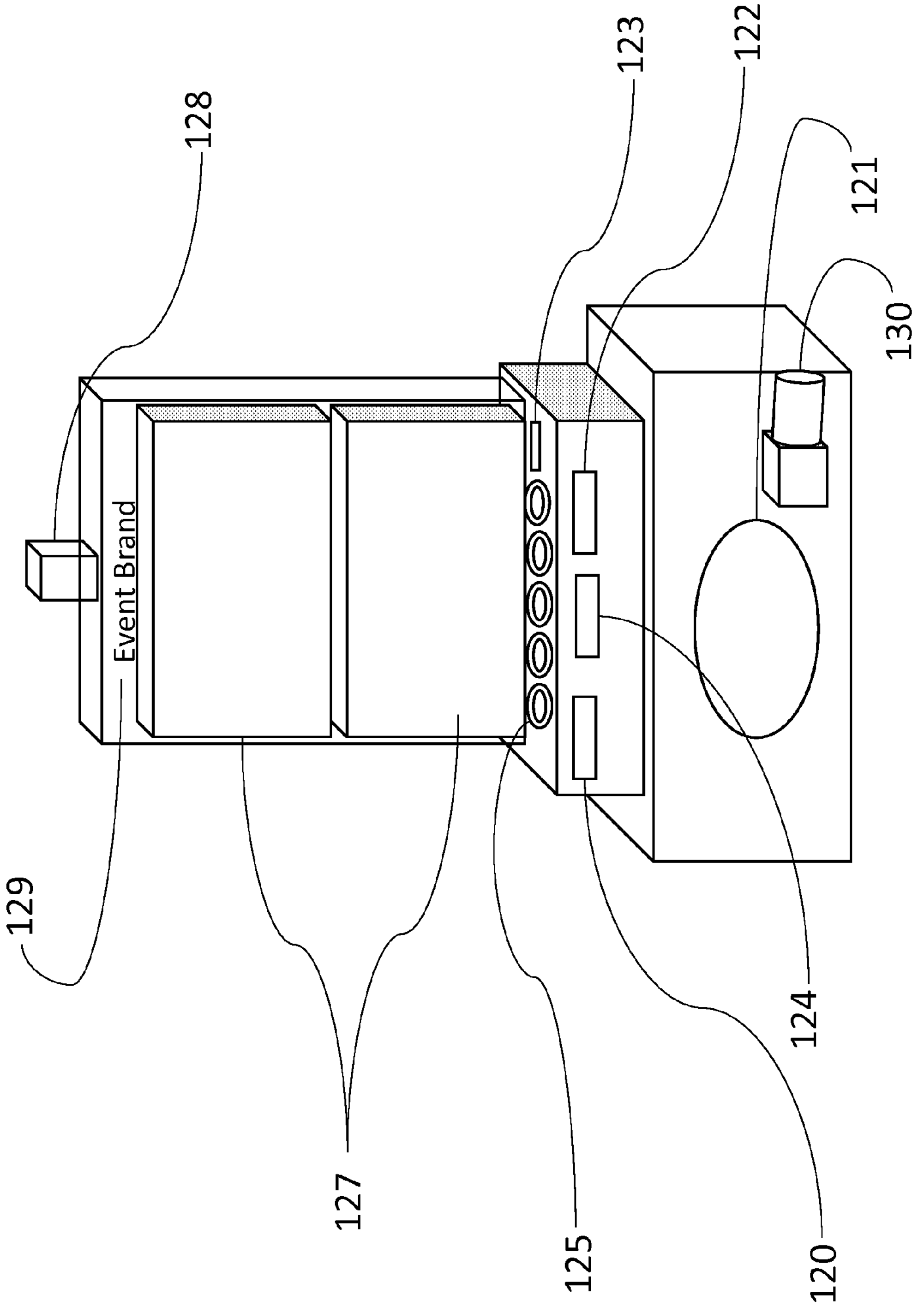
FIG. 15 is a schematic illustration of an exterior view of a preferable embodiment of the self-service terminal of the present invention.

Each terminal is clearly marked as to the type of wagering experience they represent by displaying graphics and signage denoting the contests, pools and wagers they will provide. FIG. 15 is an illustration displaying an exterior view of a preferred embodiment of the present invention's self-service terminal. It consists of a bill acceptor 120, a speaker 121, a ticket reader 122, a swipe card or dunk card reader 123, a ticket printer 124, custom button panel 125 to allow the user to interact with terminal without touching the screen, display screens 127, a specialized lighting effect mechanism 128, a sign signifying the event that can be wagered on 129, and a solenoid to drive a mechanical, special-effect mechanism 130.

The control software for all the terminals of the present invention has the ability to configure any terminal as either a teller or self-service terminal. The features for a self-service terminal are presented only when the terminal state detector has determined the terminal is a self-service terminal. These control software for the terminals of the present invention is adapted to allow the user to customize the wagering experience he or she desires through a portion of the software that is referred to as its "user customization" function.

Figure 16A:
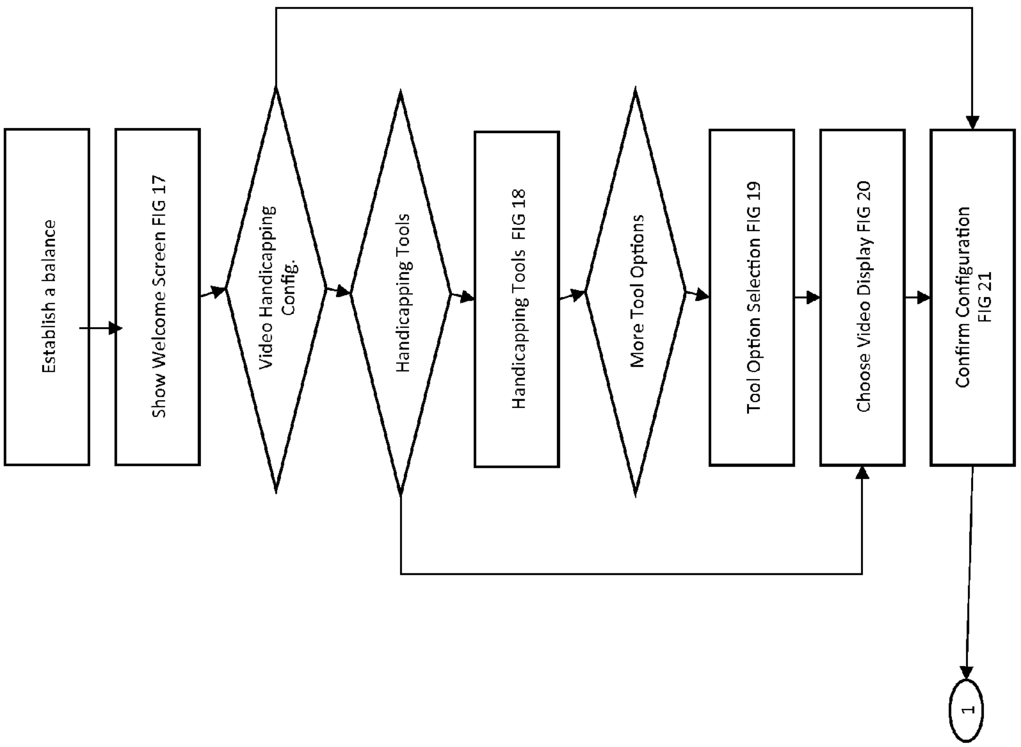
FIG. 16A is a schematic representation of the flow of the operation on a user's self-service, game terminal according to a preferred embodiment of the present invention.

This terminal's "user customization" function gives the user the options of using a "traditional" wagering interface or an alternate, "graphically-entertaining" interface. The customer customization function also enables a user to: (a) decide to view the video of the previously run event or not, (b) chose whether they want to handicap a race on which the user is going to wager using traditional styled, past performance data, (c) if the user chooses not to handicap, the user can choose between a number of automated selection techniques which include: (i) a random quick pick, (ii) morning line or opening odds, and (iii) a third party handicapping algorithm (e.g., BetMix®). FIG. 16A outlines the flow of the operation of such a terminal.

Figure 16B:
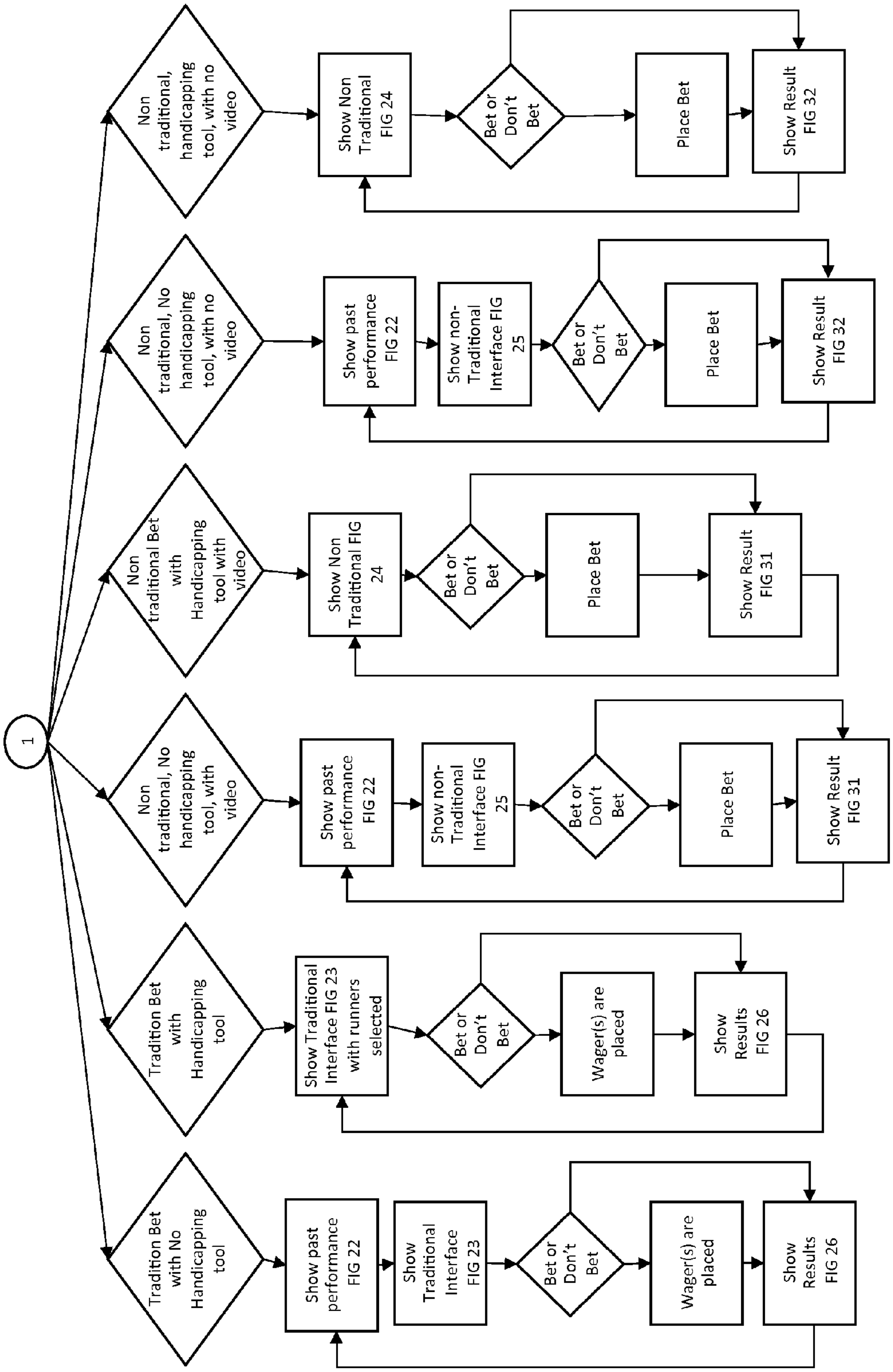
FIG. 16B is a schematic representation of the options available to a user for customizing the wagering experience that the user desires in terms of a traditional wagering interface and electing to use or not use automated handicapping tools.

Once the user has established a balance on the terminal by either inserting money, or a tote voucher or swiping an account card, the user is presented with an option screen as illustrated in FIG. 16B. The user then interacts with this screen to configure the play experience the user wishes to have for the session.

Figure 17:
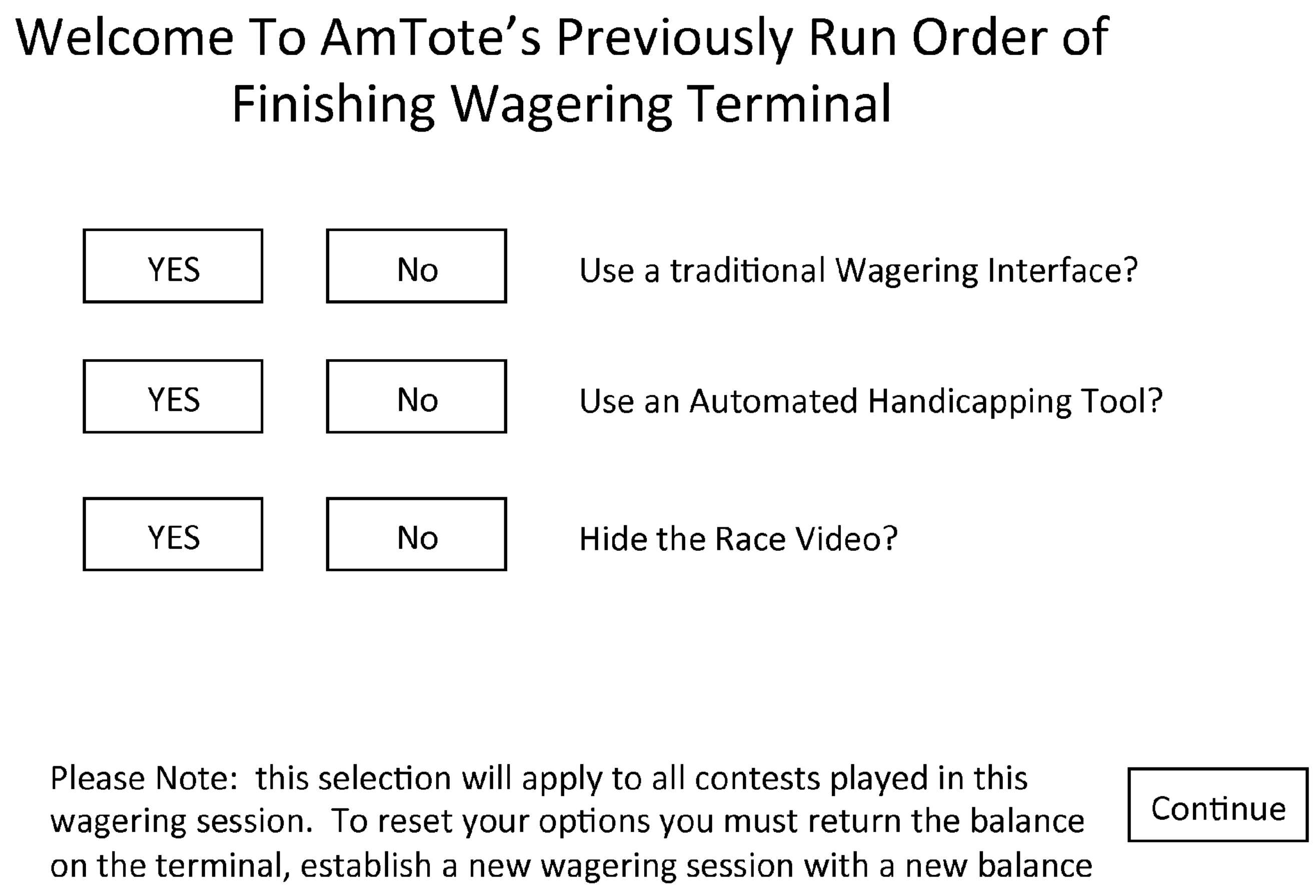
FIG. 17 is a schematic representation of a welcome screenshot that is seen on a user's self-service, game terminal according to a preferred embodiment of the present invention.
Figure 18:
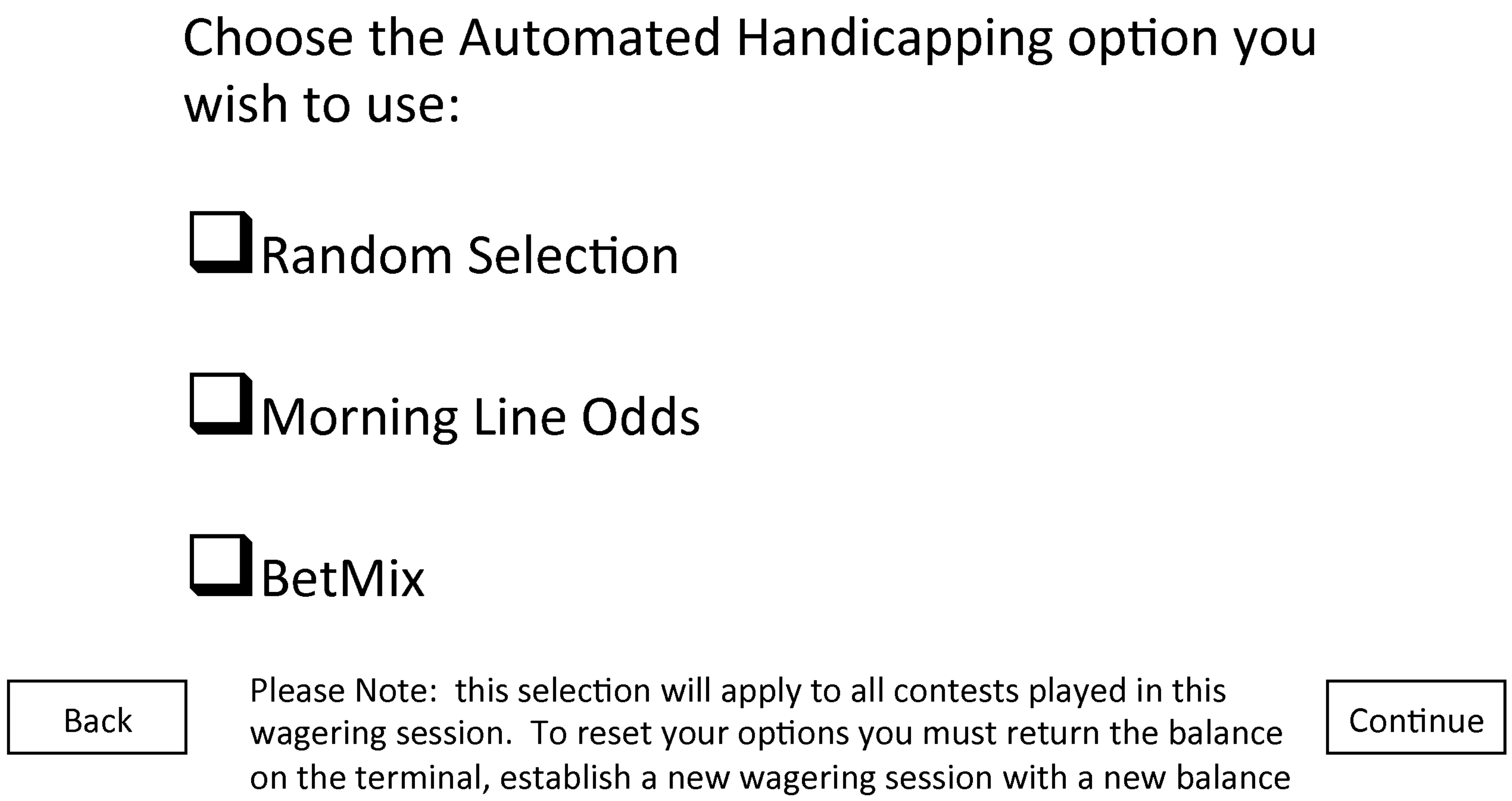
FIG. 18 is a schematic representation of a screenshot that is seen, according to a preferred embodiment of the present invention, on a user's self-service, game terminal when the user wants to utilize automated, race handicapping and has three options from which to chose to do so.
Figure 19:
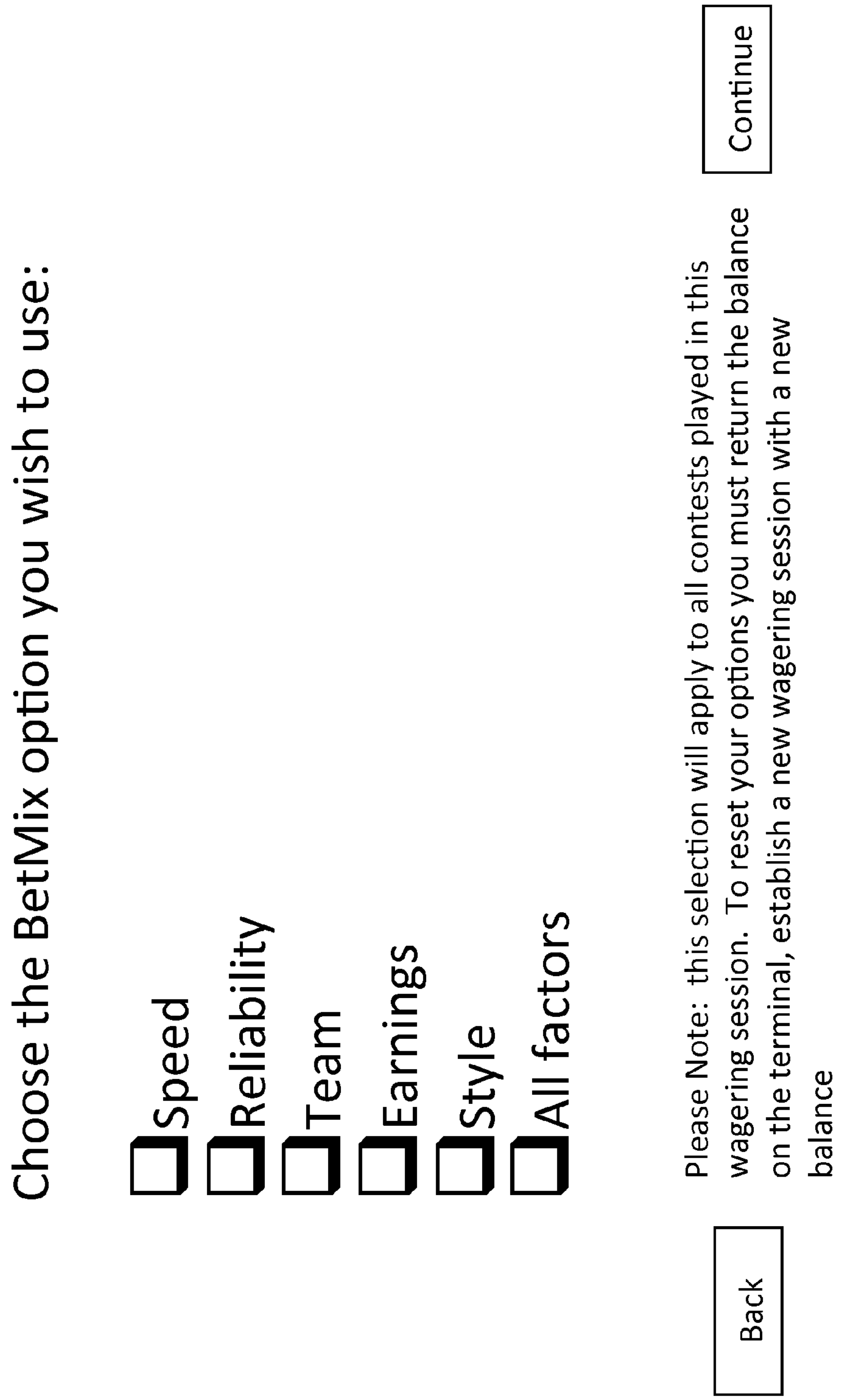
FIG. 19 is a schematic representation of a screenshot that is seen, according to a preferred embodiment of the present invention, on a user's self-service, game terminal when the user has elected to use BetMix®, an example of a third party handicapping tool, for automated handicapping and which has various factors to select so as to assist BetMix® in handicapping a race on which the user wishes to make a wager.

See FIG. 17 for a preferred embodiment for a "welcome screen" for a customizable "wagering" terminal according to the present invention. If the user has chosen to use the terminal's automated handicapping tools, then he or she can further customize their experience by selecting from the available handicapping tools, an example of which is shown in FIG. 18. If the user chooses an automated handicapping tool, still more customization options are provided to the user, see FIG. 19.

Figure 20:
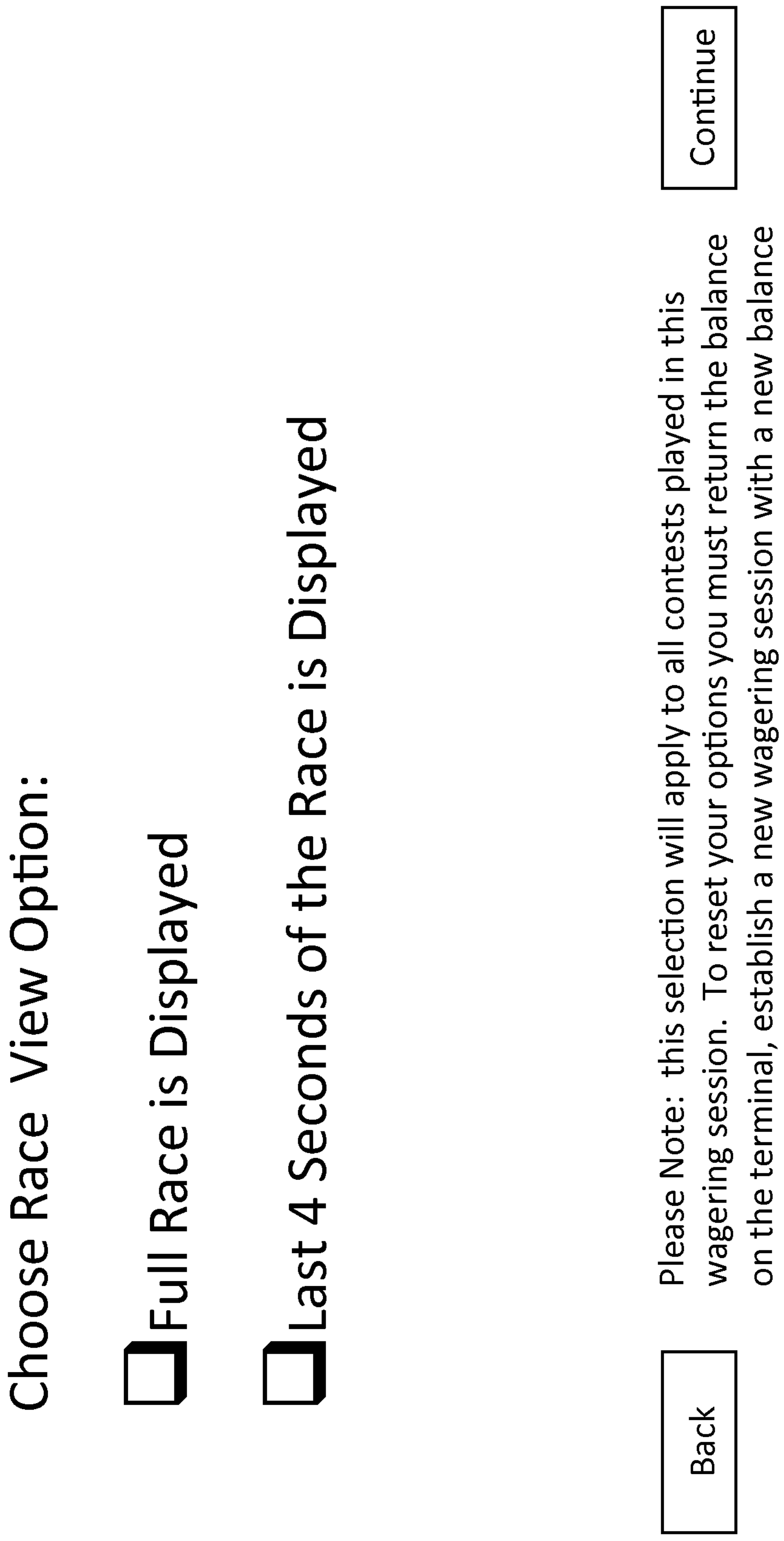
FIG. 20 is a schematic representation of a screenshot that is seen, according to a preferred embodiment of the present invention, on a user's self-service, game terminal in order to allow a user to select how much of a wagered-upon race one wishes to see when viewing the race's results.
Figure 21:
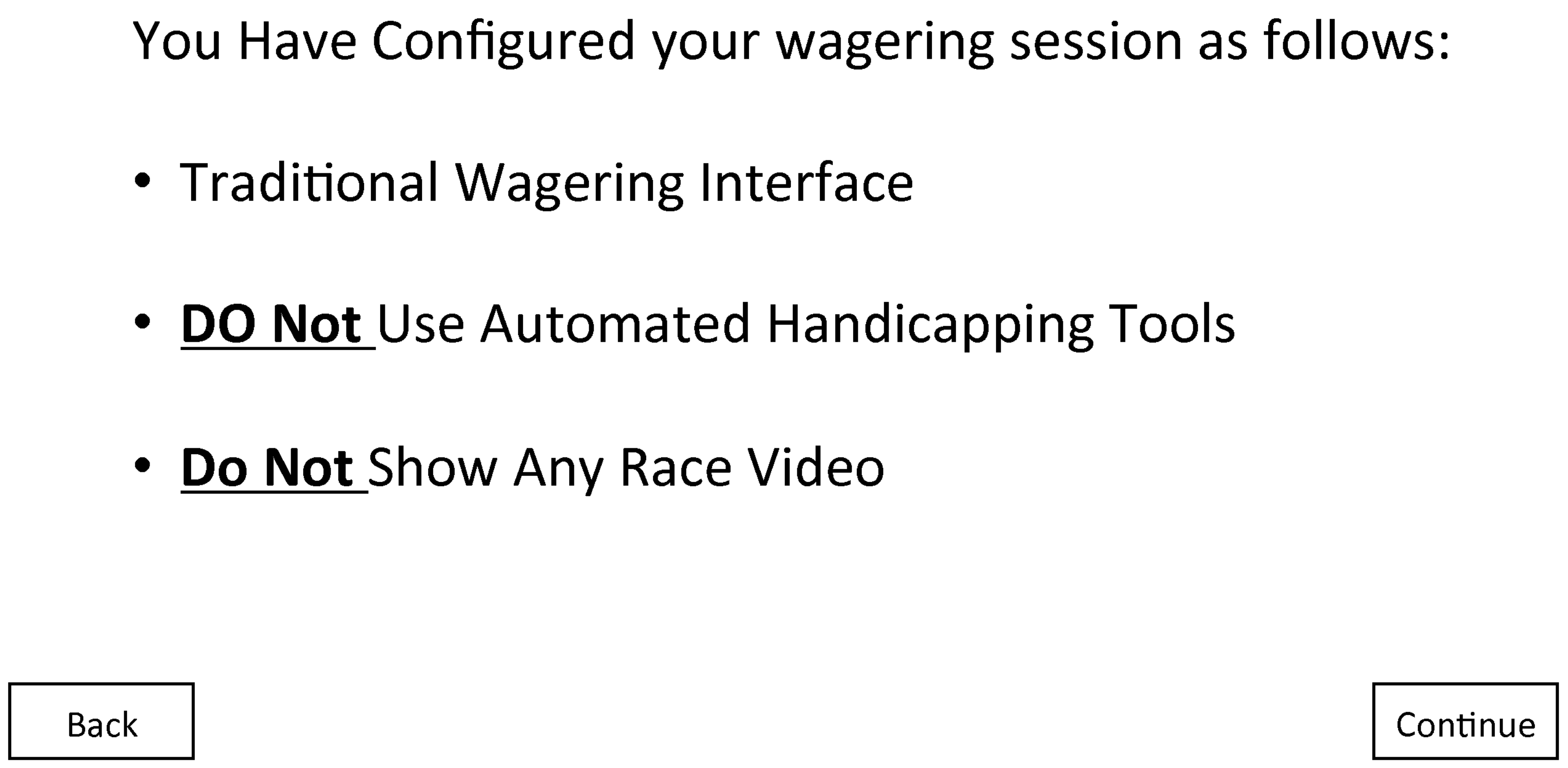
FIG. 21 is a schematic representation of a "confirming" screenshot that is seen, according to a preferred embodiment of the present invention, on a user's self-service, game terminal, when the user is asked to confirm the manner in which the user has configured the game terminal for the user's wagering session.

Selecting to view the video of a PROOFC will present the user with a screen asking the user to further customize his/her experience, see FIG. 20. Once the user has finished configuring their session, the user is presented with a summary of their choices and given the option to redo the configuration or to continue to wagering, see FIG. 21.

Figure 22:
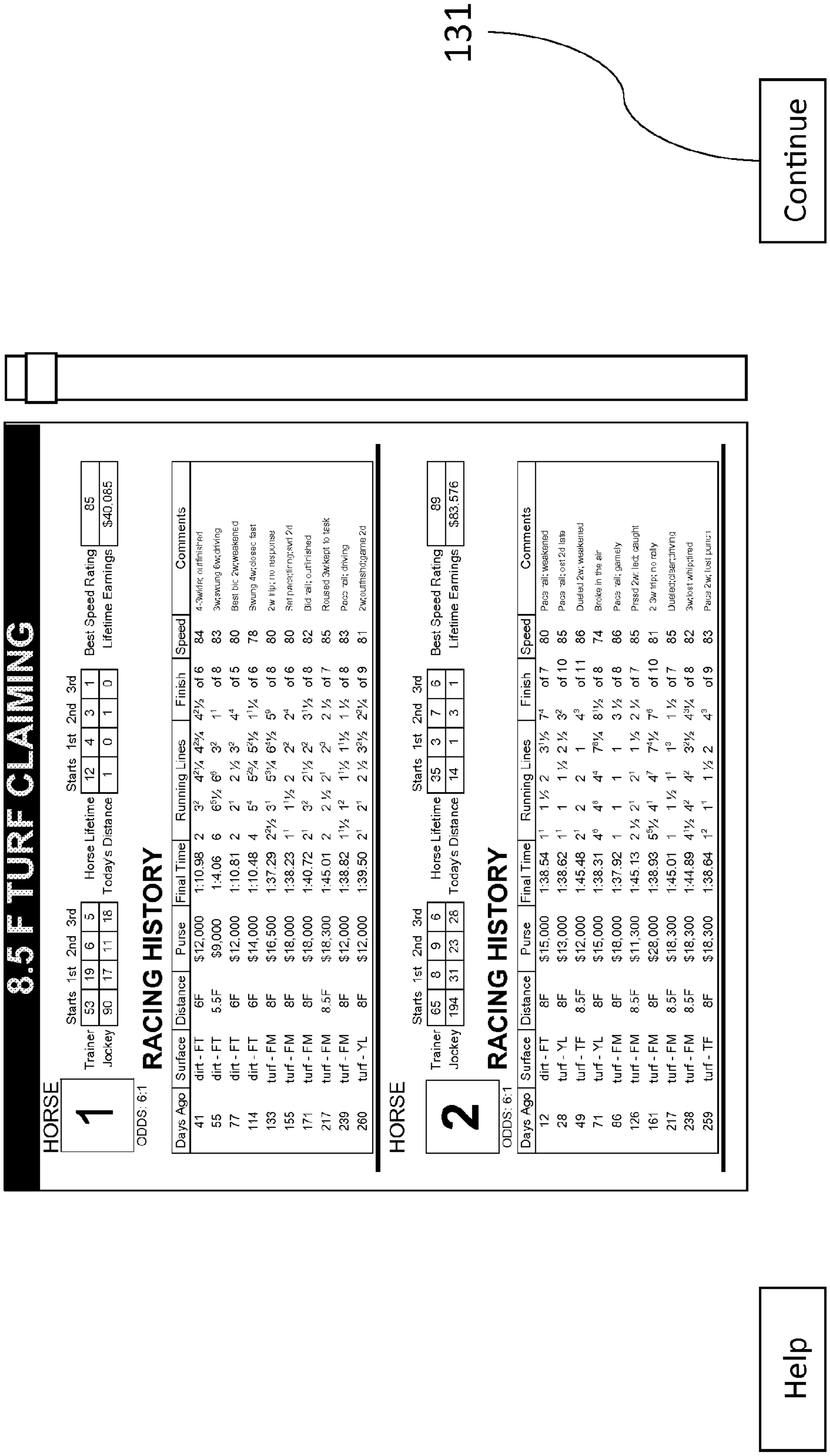
FIG. 22 is a schematic representation of a screenshot that is shown, according to a preferred embodiment of the present invention, on a user's self-service, game terminal to inform the user regarding the past performance of each of the various horses that will be running in the race on which the user may wish to place a wager.

The terminal control software of the present invention is configured so that the terminal will then contact the totalisator system and ask for the appropriate number of the next PROOFCs from the "event" that is accessed through the terminal. If the user has chosen not to use a handicapping tool, the terminal then displays the past performance information on the terminal's screen by pulling information from the contest data cache, see FIG. 22. Once the user has viewed the past performance information, the user presses the "continue" button 131 and, if the user has selected a traditional interface, then one enters the selection on a screen similar to that shown in FIG. 23 which presents a collection of buttons that allow for the selection of the wagers to be placed and the contestants who one believes will finish in the winning positions.

Figure 23:
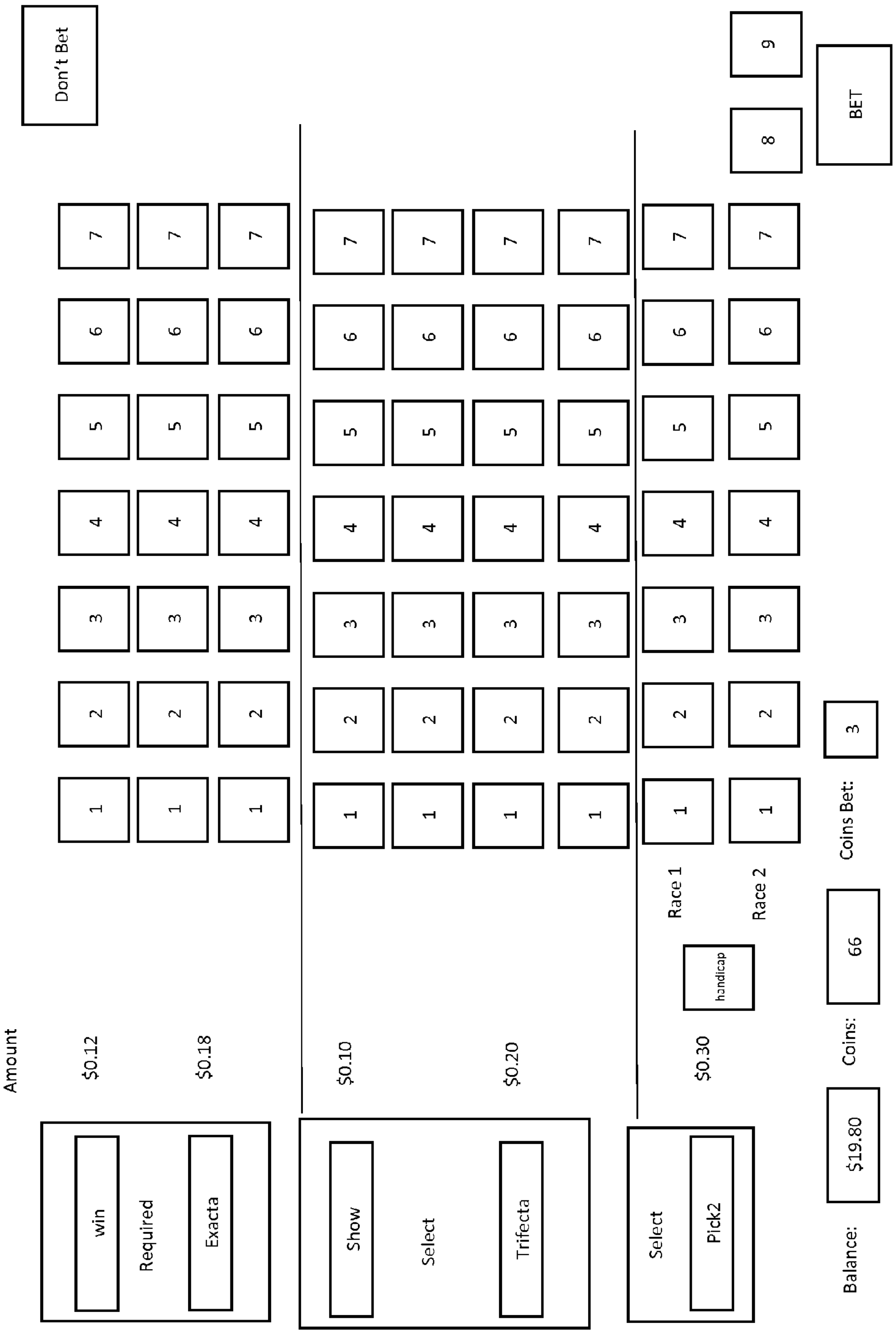
FIG. 23 is a schematic representation of a "wagering interface" screenshot that is seen, according to a preferred embodiment of the present invention and if the user has chosen a traditional interface, on a user's self-service, game terminal and utilized by a user to select the horses on which the user wishes to place various wagers.
Figure 24:
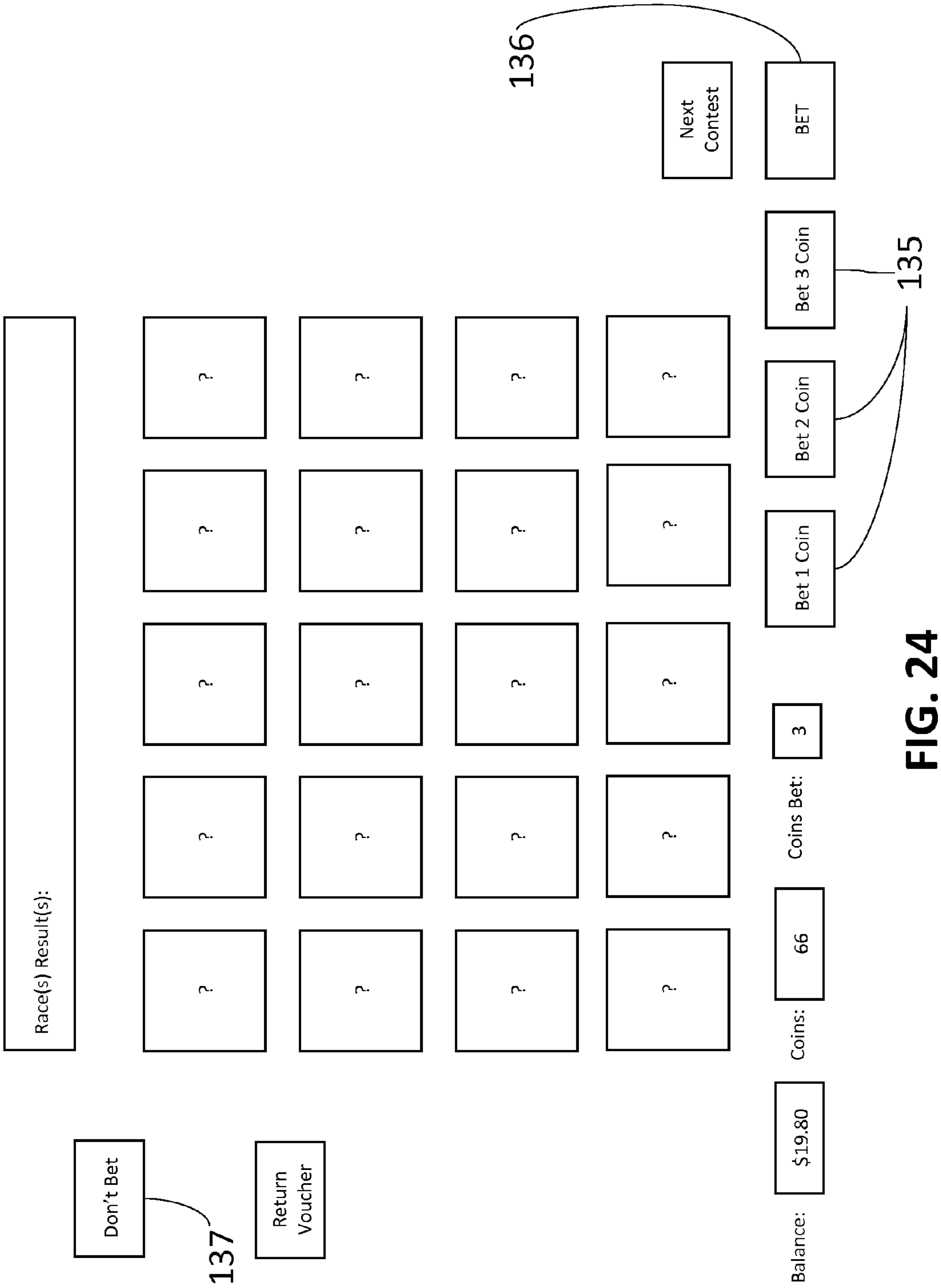
FIG. 24 is a schematic representation of a screenshot that is seen, according to a preferred embodiment of the present invention, on a user's self-service, game terminal when the user has chosen to use an alternative, non-traditional, graphical-entertaining interface as part of one's wagering session.

If the player or user has chosen to use a handicapping tool and not use the traditional interface, an alternate, graphical-entertaining interface is presented, see FIG. 24. The user selects how many "coins" the player wishes to wager 135 by selecting the matching button. A "coin" is a grouping of pools into which the terminal distributes a given portion of the balance on the terminal. The pools and portion of the monetary value is specified by the "event" associated with the self-service terminal. Each coin corresponds to a grouping of mandatory or options pools as shown in FIG. 23, then the user would press either "Bet" 136 or "Don't Bet" r3 shown in FIG. 24.

Figure 25:
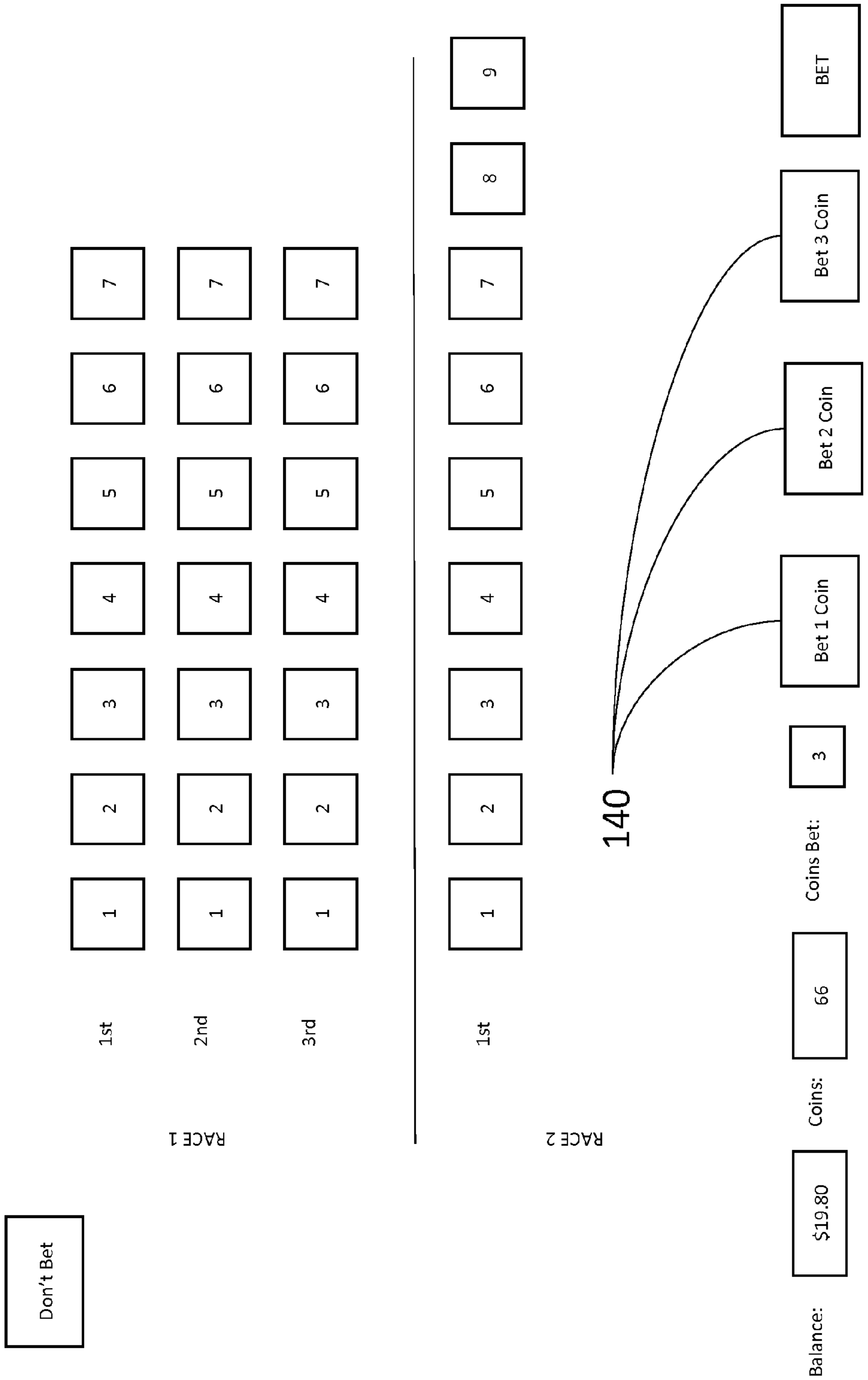
FIG. 25 is a schematic representation of a "wagering screen" that is seen, according to a preferred embodiment of the present invention when the user has not chosen to use a handicapping tool and when the user has chosen to use an alternative, non-traditional, graphical-entertaining interface as part of one's wagering session.

If the user has chosen to not use a handicapping tool and not to use the traditional interface but to instead use the alternate, graphical-entertaining interface, the user is presented a next interface which is schematically represented in FIG. 25. The user selects how many "coins" the player wishes to wager by selecting the matching buttons 140. A "coin" is a grouping of pools into which the terminal distributes a given portion of the balance on the terminal. Based on the number of coins selected, the user will need to select the order of finish for betting interests in one or more contests.

Figure 26A:
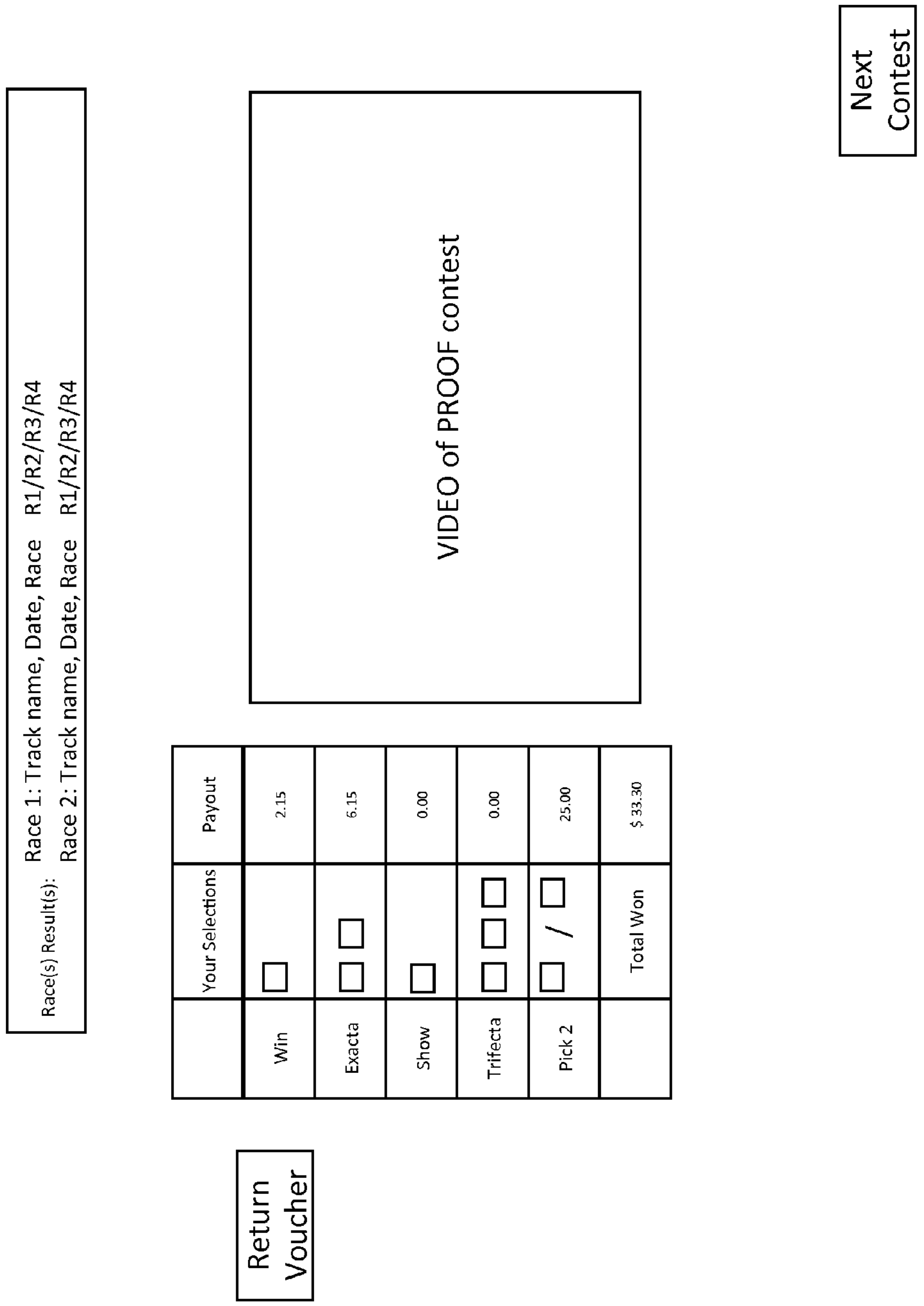
FIG. 26A is a schematic representation of an alternative, non-traditional, graphical-entertaining interface and a first type of "results" screenshot (when the user has chosen to view the race video) that contains a race video and is shown to inform a user of a race's results.
Figure 26B:
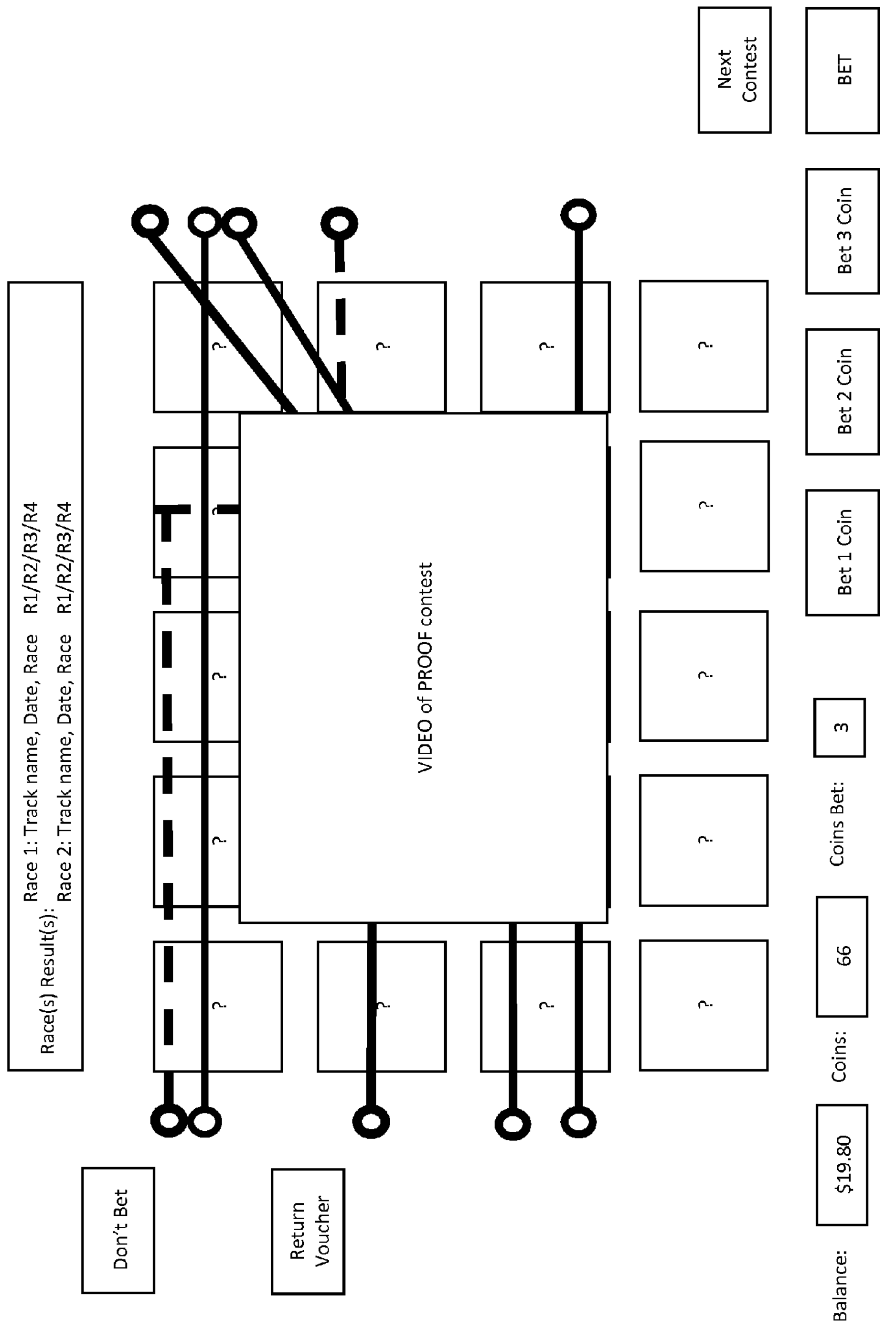
FIG. 26B is a schematic representation of an alternative, non-traditional, graphical-entertaining interface and a second type of "results" screenshot (when the user has chosen to view the race video) that includes playing an animation that simulates the randomization of a number of symbols in a number of columns accompanied by sounds and music as a way to inform a user of a race's results.
Figure 27:
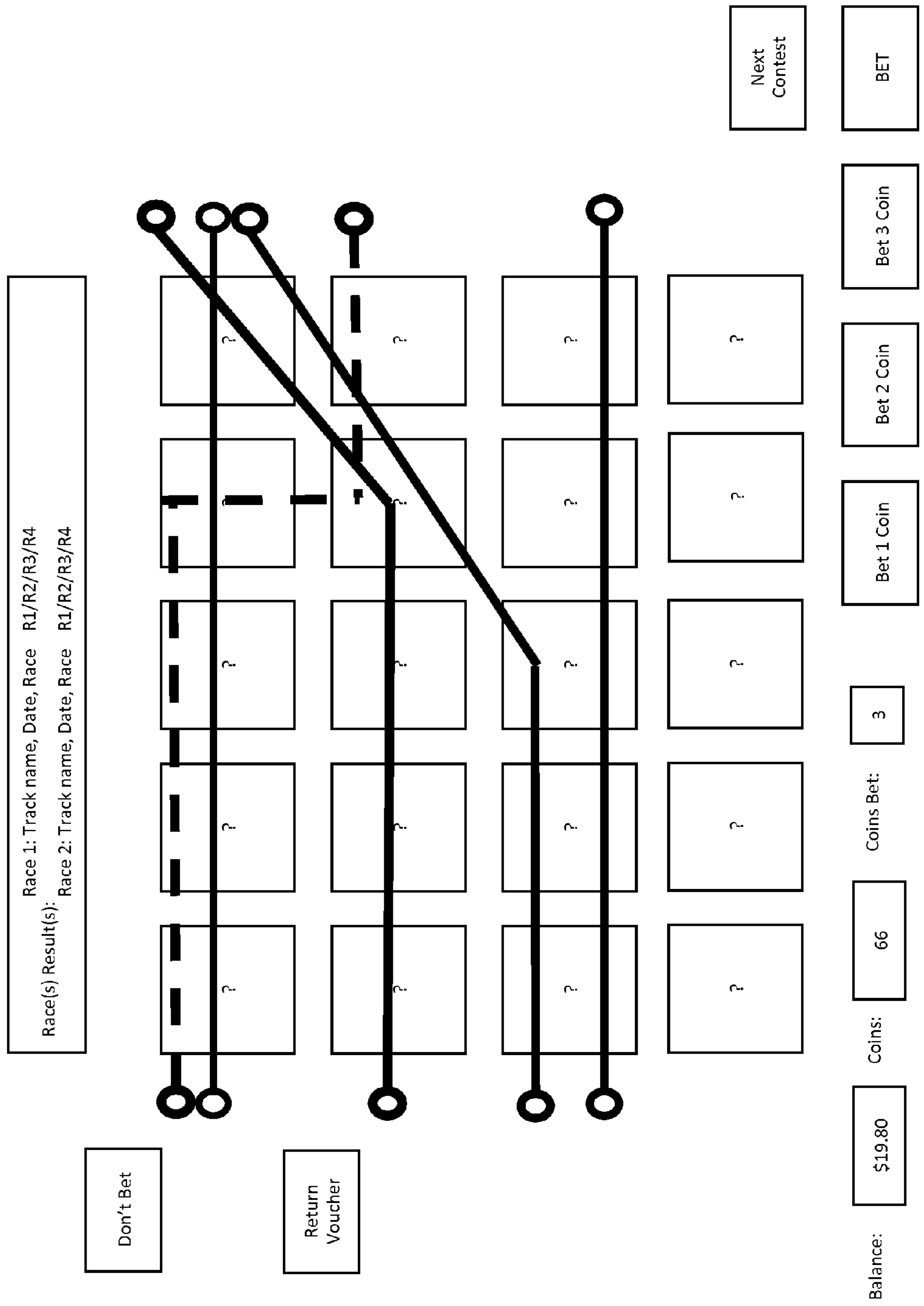
FIG. 27 is a schematic representation of an alternative, non-traditional, graphical-entertaining interface and a "results" screenshot (when the user has chosen not to view the race video) that includes playing an animation that simulates the randomization of a number of symbols in a number of columns accompanied by sounds and music as a way to inform a user of a race's results.

Once either "Bet" or "Don't Bet" is pressed, the terminal plays an animation simulating the randomization of symbols in a number of columns accompanied by sounds, music, lights that are generated by specialized peripheral devices such as lighting fixtures, solenoids and electric motors. After a specified period of time, the terminal displays the race video, if the customer has so configured his/her terminal to do such, see FIGS. 26A and 26B. If the player or customer configured the terminal to not play the video, then the terminal will display a screenshot, as illustrated in FIG. 27, that shows the results with the payoff to the user based on his or her selections and the balance in the pari-mutuel pools.

Figure 28:
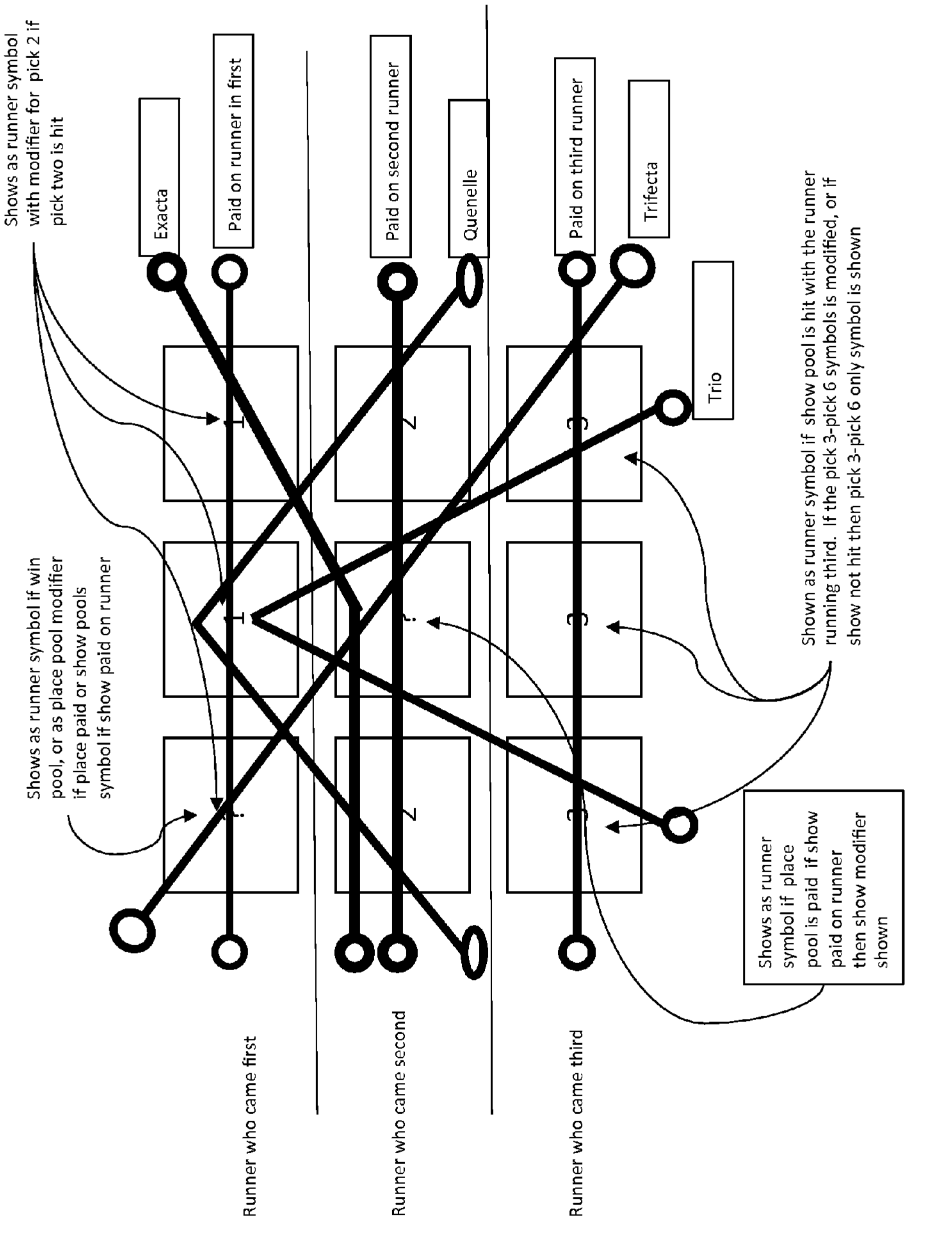
FIG. 28 is a three by three, alternative wagering screen showing an embodiment of an interface that is deterministic and communicative of the outcome of the underlying races.
Figure 29:
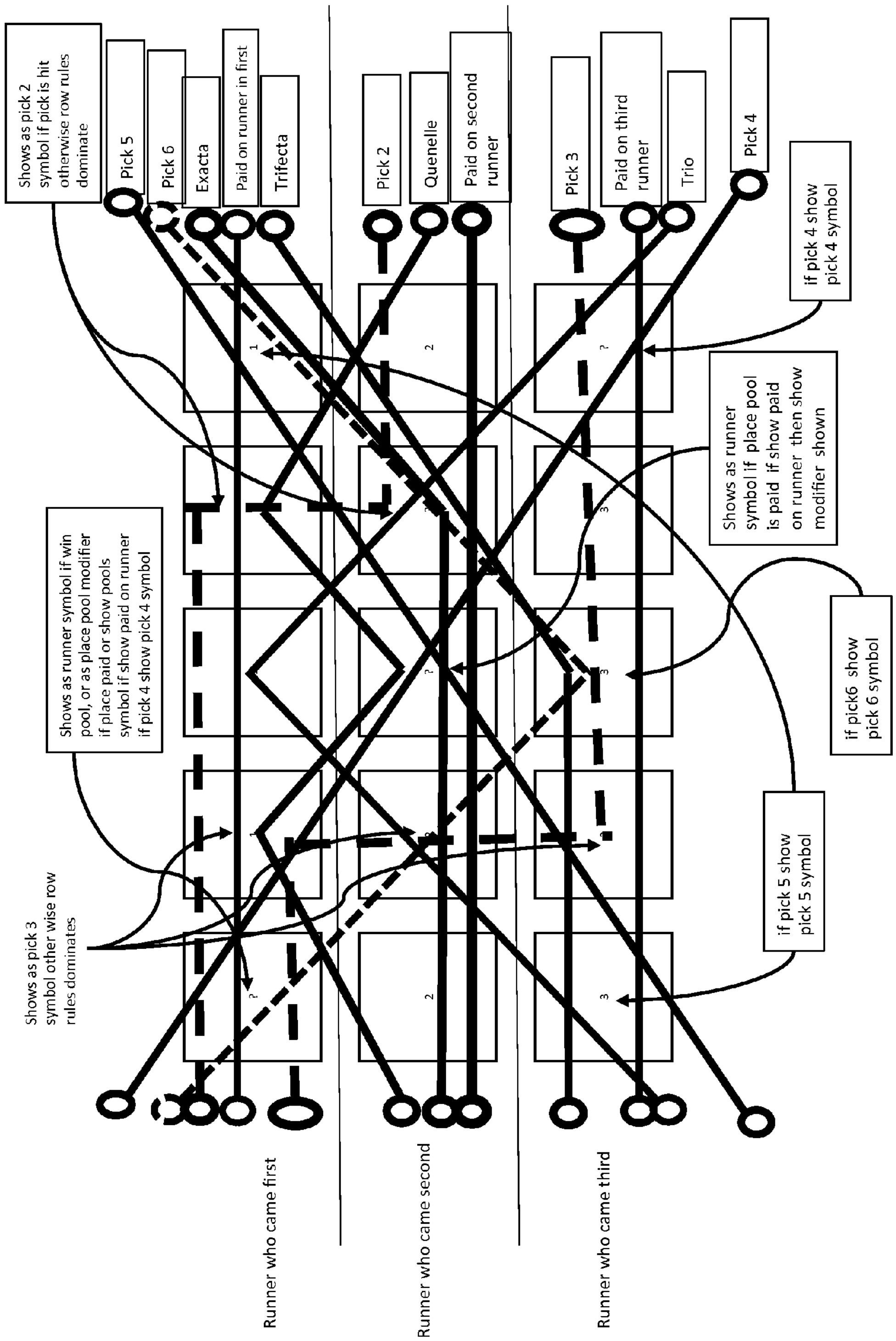
FIG. 29 is a five by three, alternative wagering screen showing an embodiment of an interface that is deterministic and communicative of the outcome of the underlying races.
Figure 30:
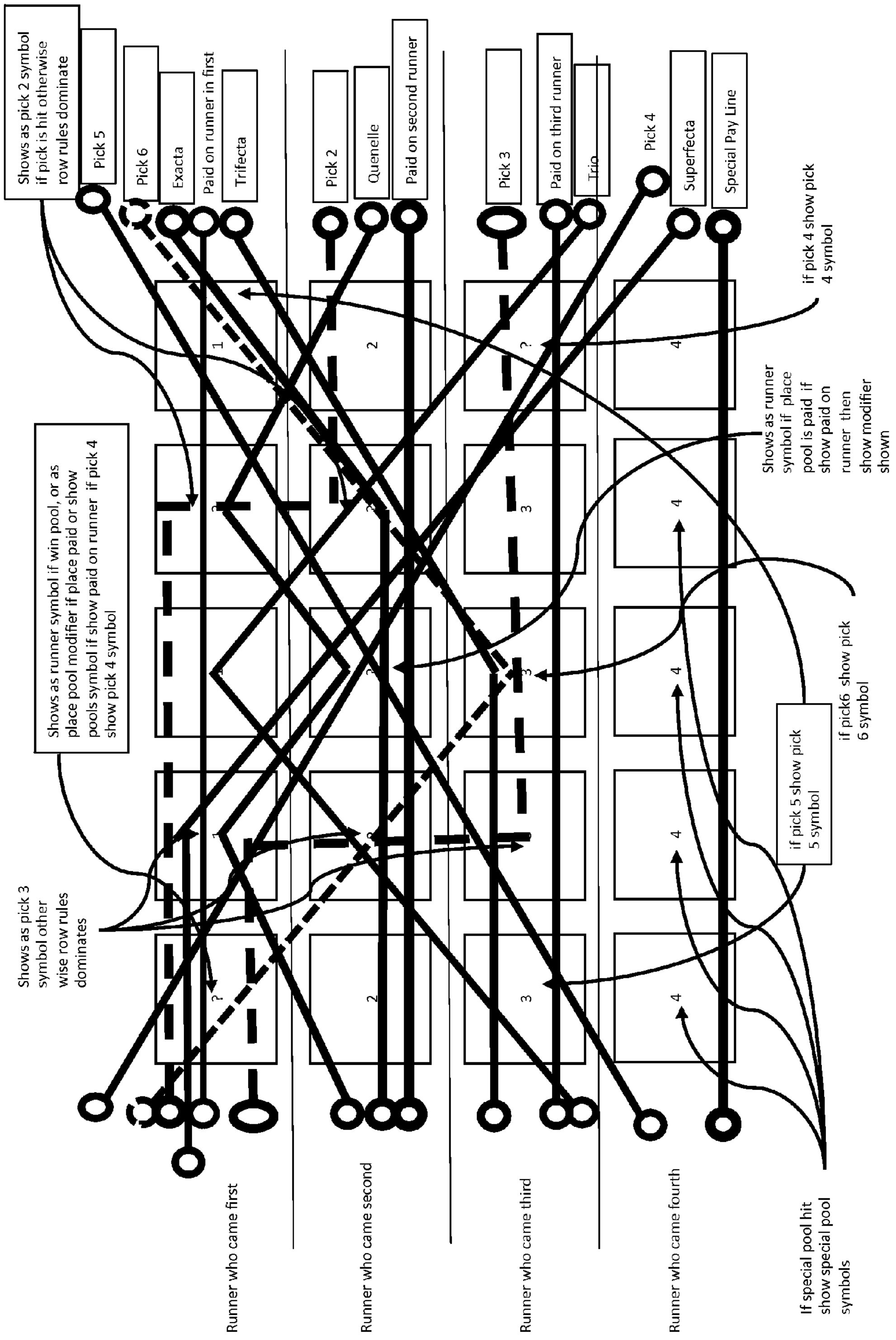
FIG. 30 is a five by four, alternative wagering screen showing an embodiment of an interface that is deterministic and communicative of the outcome of the underlying races.

For the user who has chosen to configure the user's terminal with an alternate, graphical-entertaining interface, the grouping of the interface's symbols (whether the same or different) represents the pool which the user has won by successfully determining the order of finish of the contest. The grouping of the symbols has no determination on outcome of the wager, it is only a pictorial representation used to display the outcome of the wagers made by the user. The symbols and columns are directly linked to the success of the wager based on whether the layout of the interface is 3 reels with one row, 3 reels with 3 rows, 5 reels with 3 rows, or 5 reels with 4 rows. See FIGS. 28-30.

This is an improvement over "instant racing" as the particulars of the success of the wagers can be communicated via the entertaining graphical interface and the presentation of the graphical interface is completely deterministic and is not random in any way. The deterministic outcome display allows a player to clearly see the mapping of the winning wagers and contest outcomes in relation to the wagers that the player placed on the underlying contests. The benefit of this to everyone (the player, the pari-mutuel licensee and the regulatory body(s)) is the elimination of any doubt regarding the mapping of the winning versus the player's PROOFC wagers, as can occur in "instant racing" that can appear to be a purely random outcome akin to a slot machine when specialized, "super exotic" PROOFC wagering pools (with random elements) are utilized.

Once the outcome of the play is completed the user is given the options of continuing to play by pressing next race or ending the wagering session by pressing the return voucher key which, in case of balances established with cash or voucher, will produce a tote voucher or, in the case of an account, will hang up the account.

The web browser version of the user's interface only exists for the self-service version of the present invention's terminal. The control software for the web browser version of the present invention is configured so that the web browser version differs from the physical self-service terminal in four ways: (a) the underlying technology used for a web browser complies with industry common practice for providing a user interface in a browser, (b) by providing a virtual game floor that allows a user to select which "track key" he or she wishes to play, (c) a change of the temporary accounts to permanent accounts which allows for the storage of personal identifying information and account funding information in a manner common to the advanced deposit wagering (ADW) implementations of pari-mutuel wagering, and (d) the web browser implementation accesses a function on the totalisator that will allow the user to transfer money from a financial institution to the permanent account on the totalisator.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

For example, when the present invention takes the form of an instruction-storing, non-transitory, computer-readable medium, these instructions are seen to enable a system (that includes a networked totalisator, a plurality of networked wagering terminals with screen interfaces, a database of race conditions pertaining to PROOFCs) to provide improved pari-mutuel, wagering services on PROOFCs when the instructions on the medium include the steps of enabling this system to:

(a) provide a system operator with the ability to: (i) access the database of race conditions pertaining to the PROOFCs and assemble a specified collection of PROOFCs upon which any one of a plurality of players may elect to wager or not wager on each of the PROOFCs in the collection, (ii) select the number of contestants and the race conditions applicable to each of the PROOFCs in the collection so as to yield a wagering experience for the player (with sufficiently variable wagering results and a financial return on the wagers of the player) which makes it likely that the player will again use this improved wagering service, and (b) establish a terminal-specified, pari-mutuel pool on which each of the players may wager, (c) receive from each of the players the contestant selection choices and wagers of a player, (d) provide that the operation of the wagering is conducted such that whether a player's selection, of a specific contestant as part of a given type of wager on a selected PROOFC, is determined to be a winner actually depends on the finishing place of the specific contestant/s in the selected PROOFC and the nature of the given type of wager, and (e) display to each of the players the pertinent PROOFC results and the appropriate payouts applicable to the player's contestant selection choices.

Furthermore, these instructions may also optionally enable this system to provide:

(f) for the ability of a player to configure and customize the appearance and operation of the interface of the terminal being used by the player according to the preferences of the player, (g) a system operator with the ability to mathematically model both the predicted financial return on the wagers of the player and the predicted variability in the wagering results of the player in utilizing a specified collection of PROOFCs that the operator has assembled and is considering for use on the system, (h) for the randomization of the order of the sequence in which the specified collection of PROOFCs are offered by the system to the player for wagering, (i) for the occasional and random reshuffling of the order of the sequence in which the specified collection of PROOFCs are offered by the system to the player for wagering, (j) for the ability for the player to wager in additional, optional pools, rather than solely in a mandatory pool, (k) for the ability for the player to configure the screen interface of a terminal so as to select between a "traditional" or a "graphically-entertaining" interface, (l) for the ability of the player to configure the screen interface of a terminal so as to optionally decide: (i) to view the race conditions pertaining to a specific PROOFC, (ii) to personally handicap a specific PROOFC on which the player is considering placing a wager, (iii) when the player chooses not to personally handicap, between utilizing any one of a plurality of automated contestant selection techniques that are provided to the player, and (m) that the number of contestants and the race conditions applicable to each of the PROOFCs in the collection are selected so as to yield a wagering experience for the player that is characterized by: (i) an average variability of wagering results which is in the range of 50%-200% of $X per round, and (ii) a financial return on the wagers of the player which is such that the absolute value of the monetary change in a player's balance is in the range of 6%-25% of $X per round, and where $X is defined to be the average amount being wagered per round.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is hereafter set forth in the claims to the invention.

I claim:

1. A process for allowing a plurality of players to form a pari-mutuel pool, by making pari-mutuel wagers on previously-run, order-of-finish contests (PROOFCs), each of which has a specified race condition, a plurality of contestants and an order-of-finish result, and wherein for each of a plurality of rounds of said wagering on said PROOFCs requires a first player of the plurality of players to make contestant selection choices and place wagers of a defined monetary amount from a balance of funds available to said first player, from which an appropriate payout is made to said first player whose contestant selections are correct, said process comprising the steps of:

providing a networked totalisator including a processor and a first memory device configured to store totalisator control software, executable by said processor;

providing a plurality of networked wagering terminals, each of the wagering terminals including a display device configured to display a screen interface, a terminal processor, and a second memory device configured to store terminal control software, executable by said terminal processor;

providing a database of said race conditions, the number of said plurality of contestants, and the order-of-finish results applicable to each of said PROOFCs;

wherein said terminal control software and said totalisator control software include instructions that cause said networked wagering terminals to: (a) provide to each of said players a PROOFC on which said players may wager, (b) establish a terminal-specified, pari-mutuel pool on which each of said players may wager, (c) receive from each of said players said contestant selection choices and said wagers, (d) display to each of said players a pertinent PROOFC order-of-finish result and said appropriate payout applicable to said contestant selection choices of said players, and (e) dispense, from said pari-mutuel pool, said appropriate payouts to each of said players; and providing a selected collection of said PROOFCs that yields a controlled wagering experience for said players which is defined as having an average variability of the wagering results achieved by said players for said selected collection and a financial return on the wagers of said players when wagering on said selected collection that are both within a range of acceptable values;

wherein said totalisator control software and said terminal control software further include instructions that cause said networked wagering terminals to provide said players with the ability to configure and customize the appearance and operation of said screen interfaces of the networked terminals being used by said players, wherein said customization includes providing said players with options including: (a) configuring said screen interface so as to select between a traditional or a graphically-entertaining interface, (b) electively placing a wager on each of said PROOFCs in said collection, (c) wagering in an additional, optional pool, rather than solely in a mandatory pool, (d) electively viewing said race conditions pertaining to a specific PROOFC, (e) personally handicapping a specific PROOFC on which said players are considering placing a wager, and (f) utilizing a third-party handicapping tool to assist said player in handicapping a PROOFC.

2. The process as recited in claim 1, wherein:

said terminal control software further includes instructions that cause said networked wagering terminals to randomize an order of a sequence in which said selected collection of PROOFCs are offered by said system to said players for wagering.

3. The process as recited in claim 2, wherein:

said terminal control software further includes instructions that cause said networked wagering terminals to provide for an occasional and random reshuffling of an order of a sequence in which said selected collection of PROOFCs are offered by said system to said first player for wagering.

4. The process as recited in claim 3, further comprising the step of:

providing a mathematical formula, stored in said first memory device, configured to predict, based on the race conditions and the number of said plurality of contestants in each of said PROOFCs in said selected collection, said financial return on the wagers of said first player and said average variability in the wagering results of said first player in utilizing said selected collection of PROOFCs.

5. The process as recited in claim 4, wherein:

said range of acceptable values for said controlled wagering experience for said first player is set so that:

said average variability of the wagering results achieved by said first player for said selected collection in the range of 50%-200% of $X, said financial return on the wagers of said first player when wagering on said selected collection is in the range of 6%-25% of $X per round, and wherein $X is defined to be the average amount being wagered per round by said first player.

6. The process as recited in claim 2, further comprising the step of:

providing a mathematical formula, stored in said first memory device, configured to predict, based on the race conditions and the number of said plurality of contestants in each of said PROOFCs in said selected collection, said financial return on the wagers of said first player and said average variability in the wagering results of said first player in utilizing said selected collection of PROOFCs.

7. The process as recited in claim 1, wherein:

said terminal control software further includes instructions that cause said networked wagering terminals to provide for an occasional and random reshuffling of an order of a sequence in which said selected collection of PROOFCs are offered by said system to said first player for wagering.

8. The process as recited in claim 7, further comprising the step of:

providing a mathematical formula, stored in said first memory device, configured to predict, based on the race conditions and the number of said plurality of contestants in each of said PROOFCs in said selected collection, said financial return on the wagers of said first player and said average variability in the wagering results of said first player in utilizing said selected collection of PROOFCs.

9. The process as recited in claim 1, further comprising the step of:

providing a mathematical formula, stored in said first memory device, configured to predict, based on the race conditions and the number of said plurality of contestants in each of said PROOFCs in said selected collection, said financial return on the wagers of said first player and said average variability in the wagering results of said first player in utilizing said selected collection of PROOFCs.

10. The process as recited in claim 1, wherein:

said range of acceptable values for said controlled wagering experience for said first player is set so that:

said average variability of the wagering results achieved by said first player for said selected collection is in the range of 50%-200% of $X, said financial return on the wagers of said first player when wagering on said selected collection is in the range of 6%-25% of $X per round, and wherein $X is defined to be the average amount being wagered per round by said first player.

11. A system for allowing a plurality of players to form a pari-mutuel pool, by making pari-mutuel wagers on previously-run, order-of-finish contests (PROOFCs), each of which has a specified race condition, a plurality of contestants and an order-of-finish result, and wherein for each of a plurality of rounds of said wagering on said PROOFCs requires a first player of the plurality of players to make contestant selection choices and place wagers of a defined monetary amount from a balance of funds available to said first player, from which an appropriate payout is made to said first player whose contestant selections are correct, said system comprising:

a networked totalisator including a processor and a first memory device configured to store totalisator control software, executable by said processor;

a plurality of networked wagering terminals, each of the wagering terminals including a display device configured to display a screen interface, a terminal processor, and a second memory device configured to store terminal control software, executable by said terminal processor; and a database storing said race conditions, the number of said plurality of contestants, and the order-of-finish results applicable to each of said PROOFCs;

wherein said terminal control software and said totalisator control software include instructions that cause said networked wagering terminals to: (a) provide to each of said players a PROOFC on which said players may wager, (b) establish a terminal-specified, pari-mutuel pool on which each of said players may wager, (c) receive from each of said players said contestant selection choices and said wagers, (d) display to each of said players a pertinent PROOFC order-of-finish result and said appropriate payout applicable to said contestant selection choices of said players, and (e) dispense, from said pari-mutuel pool, said appropriate payouts to each of said players;

wherein said database further stores a selected collection of said PROOFCs for use by said system that yields a controlled wagering experience for said players which is defined as having an average variability of the wagering results achieved by said players for said selected collection and a financial return on the wagers of said players when wagering on said selected collection that are both within a range of acceptable values; and wherein said totalisator control software and said terminal control software further include instructions that cause said networked wagering terminals to provide said players with the ability to configure and customize the appearance and operation of said screen interfaces of networked terminals being used by said players, wherein said customization includes providing said players with options including: (a) configuring said screen interface so as to select between a traditional or a graphically-entertaining interface, (b) electively placing a wager on each of said PROOFCs in said collection, (c) wagering in an additional, optional pool, rather than solely in a mandatory pool, (d) electively viewing said race conditions pertaining to a specific PROOFC, (e) personally handicapping a specific PROOFC on which said players are considering placing a wager, and (f) utilizing a third-party handicapping tool to assist said players in handicapping a PROOFC.

12. The system as recited in claim 11, wherein said terminal control software further includes instructions that cause said networked wagering terminals to randomize an order of a sequence in which said selected collection of PROOFCs are offered by said system to said first player for wagering.

13. The system as recited in claim 12, wherein said terminal control software further includes instructions that cause said networked wagering terminals to provide for an occasional and random reshuffling of an order of a sequence in which said selected collection of PROOFCs are offered by said system to said first player for wagering.

14. The system as recited in claim 13, further comprising:

said first memory device further stores a mathematical formula configured to predict, based on the race conditions and the number of said plurality of contestants in each of said PROOFCs in said selected collection, said financial return on the wagers of said first player and said average variability in the wagering results of said first player in utilizing said selected collection of PROOFCs.

15. The system as recited in claim 14, wherein:

said range of acceptable values for said controlled wagering experience for said first player is set so that:

said average variability of the wagering results achieved by said first player for said selected collection is in the range of 50%-200% of $X, said financial return on the wagers of said first player when wagering on said selected collection is in the range of 6%-25% of $X per round, and wherein $X is defined to be the average amount being wagered per round by said first player.

16. The system as recited in claim 12, wherein said first memory device further stores a mathematical formula configured to predict, based on the race conditions and the number of said plurality of contestants in each of said PROOFCs in said selected collection, said financial return on the wagers of said first player and said average variability in the wagering results of said first player in utilizing said selected collection of PROOFCs.

17. The system as recited in claim 11, wherein said terminal control software further includes instructions that cause said networked wagering terminals to provide for an occasional and random reshuffling of an order of a sequence in which said selected collection of PROOFCs are offered by said system to said first player for wagering.

18. The system as recited in claim 17, wherein said first memory device further stores a mathematical formula configured to predict, based on the race conditions and the number of said plurality of contestants in each of said PROOFCs in said selected collection, said financial return on the wagers of said first player and said average variability in the wagering results of said first player in utilizing said selected collection of PROOFCs.

19. The system as recited in claim 11, wherein said first memory device further stores a mathematical formula configured to predict, based on the race conditions and the number of said plurality of contestants in each of said PROOFCs in said selected collection, said financial return on the wagers of said first player and said average variability in the wagering results of said first player in utilizing said selected collection of PROOFCs.

20. The system as recited in claim 11, wherein:

said range of acceptable values for said controlled wagering experience for said first player is set so that:

said average variability of the wagering results achieved by said first player for said selected collection is in the range of 50%-200% of $X, said financial return on the wagers of said first player when wagering on said selected collection is in the range of 6%-25% of $X per round, and wherein $X is defined to be the average amount being wagered per round by said first player.

21. A non-transitory, computer-readable medium storing instructions that, when executed causes a network that includes a totalisator and a plurality of wagering terminals to allow a plurality of players to form a pari-mutuel pool, by making pari-mutuel wagers on previously-run, order-of-finish contests (PROOFCs), each of which has a specified race condition, a plurality of contestants and an order-of-finish result, and wherein for each of a plurality of rounds of said wagering on said PROOFCs requires a first player of the plurality of players to make contestant selection choices and place wagers of a defined monetary amount from a balance of funds available to said first player, from which an appropriate payout is made to said first player whose contestant selections are correct, said instructions on said medium comprising the steps of enabling said network to:

utilize a database of said race conditions, the number of said plurality of contestants, and the order-of-finish results applicable to each of said PROOFCs;

wherein said networked totalisator including said processor and a first memory device configured to store totalisator control software, executable by said processor;

wherein each of said plurality of networked wagering terminals including a display device configured to display a screen interface, a terminal processor, and a second memory device configured to store terminal control software, executable by said terminal processor;

utilize said terminal control software and said totalisator control software to cause said networked wagering terminals to: (a) provide to each of said players a PROOFC on which said players may wager, (b) establish a terminal-specified, pari-mutuel pool on which each of said players may wager, (c) receive from each of said players said contestant selection choices and said wagers, (d) display to each of said players a pertinent PROOFC order-of-finish result and said appropriate payout applicable to said contestant selection choices of said players, and (e) dispense, from said pari-mutuel pool, said appropriate payouts to each of said players;

assemble a selected collection of said PROOFCs that yields a controlled wagering experience for said players which is defined as having an average variability of the wagering results achieved by said players for said selected collection and a financial return on the wagers of said players when wagering on said selected collection that are both within a range of acceptable values; and further utilize said totalisator control software and said terminal control software to cause said networked wagering terminals to provide said players with the ability to configure and customize the appearance and operation of said screen interfaces of the networked terminals being used by said players, wherein said customization includes providing said players with options including: (a) configuring said screen interface so as to select between a traditional or a graphically-entertaining interface, (b) electively placing a wager on each of said PROOFCs in said collection, (c) wagering in an additional, optional pool, rather than solely in a mandatory pool, (d) electively viewing said race conditions pertaining to a specific PROOFC, (e) personally handicapping a specific PROOFC on which said players are considering placing a wager, and (f) utilizing a third-party handicapping tool to assist said player in handicapping a PROOFC.

22. The non-transitory, computer-readable medium storing instructions as recited in claim 21, said instructions further comprising the steps of enabling said network to:

utilize said terminal control software and said totalisator control software to cause said networked wagering terminals to randomize an order of a sequence in which said selected collection of PROOFCs are offered by said network to said first player for wagering.

23. The non-transitory, computer-readable medium storing instructions as recited in claim 22, said instructions further comprising the steps of enabling said network to:

utilize said terminal control software and said totalisator control software to cause said networked wagering terminals to provide for an occasional and random reshuffling of an order of a sequence in which said selected collection of PROOFCs are offered by said network to said first player for wagering.

24. The non-transitory, computer-readable medium storing instructions as recited in claim 23, said instructions further comprising the steps of enabling said network to:

utilize a mathematical formula, store in said first memory device, to predict, based on the race conditions and the number of said plurality of contestants in each of said PROOFCs in said selected collection, said financial return on the wagers of said first player and said average variability in the wagering results of said first player in utilizing said selected collection of PROOFCs.

25. The non-transitory, computer-readable medium storing instructions as recited in claim 24, wherein:

said range of acceptable values for said controlled wagering experience for said player is set so that:

said average variability of the wagering results achieved by said first played for said selected collection is set to be in the range of 50%-200% of $X, said financial return on the wagers of said first player when wagering on said selected collection is set so as to be in the range of 6%-25% of $X per round, and wherein $X is defined to be the average amount being wagered per round by said first player.

26. The non-transitory, computer-readable medium storing instructions as recited in claim 22, said instructions further comprising the steps of enabling said network to:

utilize a mathematical formula, store in said first memory device, to predict, based on the race conditions and the number of said plurality of contestants in each of said PROOFCs in said selected collection, said financial return on the wagers of said first player and said average variability in the wagering results of said first player in utilizing said selected collection of PROOFCs.

27. The non-transitory, computer-readable medium storing instructions as recited in claim 21, said instructions further comprising the steps of enabling said network to:

utilize said terminal control software and said totalisator control software to cause said networked wagering terminals to provide for an occasional and random reshuffling of an order of a sequence in which said selected collection of PROOFCs are offered by said network to said first player for wagering.

28. The non-transitory, computer-readable medium storing instructions as recited in claim 27, said instructions further comprising the steps of enabling said network to:

utilize a mathematical formula, store in said first memory device, to predict, based on the race conditions and the number of said plurality of contestants in each of said PROOFCs in said selected collection, said financial return on the wagers of said first player and said average variability in the wagering results of said first player in utilizing said selected collection of PROOFCs.

29. The non-transitory, computer-readable medium storing instructions as recited in claim 21, said instructions further comprising the steps of enabling said network to:

utilize a mathematical formula, store in said first memory device, to predict, based on the race conditions and the number of said plurality of contestants in each of said PROOFCs in said selected collection, said financial return on the wagers of said first player and said average variability in the wagering results of said first player in utilizing said selected collection of PROOFCs.

30. The non-transitory, computer-readable medium storing instructions as recited in claim 21, wherein:

said range of acceptable values for said controlled wagering experience for said first player is set so that:

said average variability of the wagering results achieved by said played for said selected collection is in the range of 50%-200% of $X, said financial return on the wagers of said first player when wagering on said selected collection is in the range of 6%-25% of $X per round, and wherein $X is defined to be the average amount being wagered per round by said first player.

* * * * *